United States Patent Office 3,598,703
Patented Aug. 10, 1971

3,598,703
MICROBIOLOGICAL Δ¹-DEHYDROGENATION
OF STEROIDS
Thomas H. Stoudt, Westfield, N.J., assignor to
Merck & Co., Inc., Rahway, N.J.
No Drawing. Continuation of application Ser. No. 258,976, Feb. 18, 1963, which is a continuation-in-part of application Ser. No. 211,821, July 23, 1962, which is a continuation-in-part of applications Ser. No. 535,279, Sept. 19, 1955, and Ser. No. 173,367, Feb. 15, 1962, which is a continuation-in-part of applications Ser. No. 500,273, Apr. 8, 1955, and Ser. No. 165,036, Jan. 8, 1962, which in turn is a continuation-in-part of applications Ser. No. 540,626, Oct. 14, 1955, now Patent No. 3,016,335, Ser. No. 709,798, Jan. 20, 1958, and Ser. No. 552,694, Dec. 13, 1955. This application Sept. 5, 1967, Ser. No. 665,644
Int. Cl. C07c *167/14*
U.S. Cl. 195—51
75 Claims

ABSTRACT OF THE DISCLOSURE

The invention disclosed herein relates to a novel microbiological process whereby unsaturation is introduced into Ring A of the nucleus of 3-oxygenated steroid compounds by reacting a 3-oxygenated steroid having a single bond connecting the C–1 and C–2 carbon atoms with a $\Delta^1$-dehydrogenating strain of Schizomycetes microorganisms, thereby forming the corresponding $\Delta^1$-steroid.

---

This is a continuation of application Ser. No. 258,976, filed Feb. 18, 1963, which is a continuation-in-part of applications Ser. No. 211,821, filed July 23, 1962, now abandoned which, in turn, is a continuation-in-part of Ser. No. 535,279, filed Sept. 19, 1955, now abandoned; Ser. No. 173,367, filed Feb. 15, 1962, now abandoned which, in turn, is a continuation-in-part of Ser. No. 500,273, filed Apr. 8, 1955, now abandoned; Ser. No. 165,036, filed Jan. 8, 1962, now abandoned which, in turn, is a continuation-in-part of Ser. No. 540,626, filed Oct. 14, 1955, now Pat. 3,016,335, issued Jan. 9, 1962; Ser. No. 709,798, filed Jan. 20, 1958, now abandoned, and Ser. No. 552,694, filed Dec. 13, 1955, now abandoned.

This invention is concerned generally with the production of valuable steroid compounds by fermentation. More particularly, it relates to a novel microbiological method for introducing unsaturation into Ring A of the nucleus of 3-oxygenated-steroid compounds by means of Schizomycetes microorganisms. In accordance with this invention 3-oxygenated-steroid having a saturated linkage in Ring A, which may be saturated or unsaturated at C–5, and in which the 3-oxygenated substituent may be singly or doubly bonded to the nucleus, are converted to the corresponding $\Delta^4$-3-keto-steroids and $\Delta^{1,4}$-3-keto-steroids; i.e., Ring A unsaturated 3-oxygenated-steroids having a double bond at C–5 are converted to $\Delta^4$-3-keto-steroids and $\Delta^{1,4}$-3-keto-steroids; and Ring A unsaturated 3-oxygenated-steroids having a double bond at C–2 are converted to $\Delta^1$-3-keto-steriods and $\Delta^{1,4}$-3-keto-steroids. As a preferred embodiment, $\Delta^4$-3-keto-steroids such as $\Delta^4$-pregnene-3,11,20-trione-17α,21-diol and $\Delta^4$-pregnene-3,20-dione-11β,17α,21-triol are converted to the corresponding $\Delta^{1,4}$-3-keto-steroids, $\Delta^{1,4}$-pregnadiene-3,11,20-trione-17α,21-diol and $\Delta^{1,4}$-pregnadiene-3,20-dione-11β,17α,21-triol, respectively. The latter compounds posses cortisone activity but differ from cortisone in being substantially free from undesired side effects such as edema since they do not possess any appreciable sodium or water retention action.

The preparation of $\Delta^{1,4}$-3-keto-steroids by chemical means has been unsatisfactory due to the fact that the chemical reactions involved give mixtures of several compounds. Separation of the desired intermediates and final products from such mixtures is costly and results in the obtainment of low yields of the desired $\Delta^{1,4}$-3-keto-steroid compounds.

It was an object of the present invention to discover a one-step method for introducing a $\Delta^1$ double bond into steroid compounds.

It was a further object to achieve this $\Delta^1$ unsaturation by a selective method which would result in the formation of the desired $\Delta^1$-steroid uncontaminated by unwanted by-products.

It was still a further object to discover a method whereby $\Delta^{1,4}$-3-keto-steroid of the pregnane series could be produced directly, and in high yield, from the corresponding $\Delta^4$-3-keto-pregnene compounds.

I have now discovered that the selective $\Delta^1$-dehydrogenation of steroid compounds of the pregnane series can be accomplished by a novel barteriological dehydrogenation procedure which comprises contacting a 3-oxygenated steroid compound having a saturated linkage in Ring A and which may be completely saturated in both Rings A and B, in particular a C–5 unsaturated 3-oxygenated steroid compound, e.g. a 3-keto (or hydroxy)-steroid, a 3-keto (or hydroxy)-$\Delta^4$-steroid or 3-hydroxy-$\Delta^5$-steroid, with the dehydrogenating activity of microorganisms of the class Schizomycetes, which includes microorganisms belonging to the orders Actinomycetales and Eubacteriales and preferably microorganisms of the genera Acetobacter, Aerobacter, Bacillus, Corynebacterium, Pseudomonas, Protaminobacter, Mycobacterium and Nocardia, which are all bacteria-like Schizomycetes characterized as lacking the ability to produce Aerial *mycelia* and Conidia. I particularly prefer to employ selected Eubacteriales and Nocardia microorganisms of the following species; namely, *Acetobacter xylinum, Aerobacter aerogenes, Bacillus sphaericus, Nocardia erythropolis, Nocardia blackwellii, Nocardia asteroides, Nocardia minima, Nocardia globerula, Nocardia leishmanii, Nocardia formica, Nocardia convoluta, Nocardia corrallina,* and *Mycobacterium smegmatis, Mycobacterium phlei, Mycobacterium lacticola, Mycobacterium tuberculosis, Corynebacterium hoagii, Corynebacterium simplex, Bacillus subtilis, Pseudomonas nov.* sp., *Protaminobacter rubrum* and *Protaminobacter alboflavum.* It will be noted that, included in this list of preferred Eubacteriales microorganisms, are the following Mycobacterium species: *Mycobacterium smegmatis, Mycobacterium phlei, Mycobacterium lactocola* and *Mycobacterium tuberculosis,* which identical disclosure appears in parent Ser. No. 258,976. Similarly, one of the parents of the latter application, namely Ser. No. 552,694, filed Dec. 13, 1955, states that the Order Eubacteriales includes the genus Mycobacterium and lists, as preferred microorganisms of the Order Eubacteriales, the species *Mycobacterium smegmatis*, *Mycobacterium phlei*, *Mycobacterium lacticola* and *Mycobacterium tuberculosis*. Thus, the specification and claims of these three applications, as filed, defined the order Eubacteriales as including Mycobacterium genus and species, such inclusion being in accord with the classification of Stanier and Van Niel, Journal Bacteriology 42, pages 461–462 (1941).

The classification system now relied upon in this specification and in the appended claims, however, is that set forth in Bergey's Manual for Determinative Bacteriology, Sixth edition, 1948, in which edition the genera Acetobacter, Aerobacter Bacillus Corynebacterium, Pseudomonas and Protaminobacter are all classified as belonging to the order Eubacteriales, whereas the genus Mycobacterium is there classified as belonging to the order Actinomycetales. Thus, the expression Eubacteriales and Mycobacterium is now employed in this specification and claims to include those microorganisms formerly included (herein and in earlier-filed Ser. Nos. 552,694 and 258,976) within the expression Eubacteriales. The species *Bacillus sphaericus*, as defined in Bergey's Manual for Determinative Bacteriology, Sixth edition, comprises several varieties such as the rotans variety, the fusiformis variety, etc. and, in some collections, these varieties are referred to by the species names *Bacillus rotans* and *Bacillus fusiformis;* other Bacillus species include *Bacillus pulvifaciens, Bacillus cereus, Bacillus megaterium, Bacillus pumilus, Bacillus brevis, Bacillus laterosporus, Bacillus alvei, Bacillus lentus, Bacillus licheniformis* and *Bacillus firmus*. These microorganisms of the Class Schizomycetes can be obtained from known sources such as the American Type Culture Collection, Washington, D.C., or they may be isolated from natural sources, such as soil, by known methods.

It is desired to emphasize that for any given species of Schizomycetes, the preferred $\Delta^1$-dehydrogenating strains can be selected by the following test method: a nutrient medium containing 1 g. of cerelose, 1 g. edamin, 0.25 ml. of cornsteep liquor, 0.05 g. of yeast extract, and sufficient distilled water to make 50 ml., is adjusted to pH 6.5, sterilized and inoculated with a culture of the particular microorganism strain to be tested for its $\Delta^1$ dehydrogenating activity. The resulting culture is incubated for a period of 24 hours at a temperature of 28° C., and a sample of the culture is transferred to a second 50 milliliter sample of the aforementioned nutrient medium which has likewise been adjusted to pH 6.5 and sterilized. The resulting inoculated culture is then incubated at a temperature of 28° C., with agitation, for a 24-hour period, and to the resulting culture is added a solution containing 10 mg. of hydrocortisone dissolved in 0.1 ml. of dimethyl-formamide. The culture containing the steroid compound is incubated, with agitation, for an additional period of about 10 hours at 28° C. The fermentation broth is repeatedly extracted with ethyl acetate, and the ethyl acetate extracts are combined and evaporated to dryness in vacuo. A portion of the residual material is dissolved in acetone and spotted on a paper chromatogram which is developed using formamide as the stationary phase and chloroform as the mobile phase. Two separate bands are ordinarily obtained, the lower band corresponding to unchanged hydrocortisone; the upper band corresponding to the $\Delta^1$-dehydro derivative. Both bands are cut off separately, eluted with methanol and each of the methanol eluants is subjected to ultra-violet absorption analysis. The efficiency of the microorganism strain being tested in effecting $\Delta^1$-dehydrogenation is indicated by the relative proportions of $\Delta^1$-dehydro derivative and unchanged hydrocortisone as measured by this ultra-violet absorption analysis.

In summary, the preferred $\Delta^1$-dehydrogenating strains of Schizomycetes microorganisms are selected by incubating 24-hour culture of the Schizomycetes test strain containing approximately 0.02% of hydrocortisone for about 10 hours at approximately 28° C., and subjecting the ethyl acetate-extractible components of the resulting fermentation broth to paper chromatographic analysis using a formamide-chloroform system; the presence of a band corresponding to the $\Delta^1$-dehydro derivative of hydrocortisone and having an ultraviolet absorption maximum of 242 m$\mu$ demonstrates that the test strain is a $\Delta^1$-dehydrogenating strain of Schizomycetes.

While the $\Delta^1$-dehydrogenating strains of Schizomycetes are utilized generally for the conversion of 3-keto-$\Delta^4$-steroids, 3-hydroxy-$\Delta^5$-steroids and 3-acyloxy-$\Delta^5$-steroids to the corresponding 3-keto-$\Delta^{1,4}$-steroids, these $\Delta^1$-dehydrogenating Schizomycetes, and particularly certain preferred strains thereof, are also utilized for converting 3-oxygenated steroids saturated in Ring A (and at C–5) to the corresponding 3-keto-$\Delta^{1,4}$-steroids. These preferred $\Delta^{1,4}$-dehydrogenating strains of Schizomycetes are conveniently selected employing the foregoing test method, but employing dihydrohydrocortisone (pregnane-11$\beta$,17$\alpha$, 21-triol-3,20-dione) as the substrate in place of the hydrocortisone substrate there employed and for an incubation time of about 24 hours at 28° C. The fermentation broth is extracted, the extractions subjected to paper chromatographic analysis, and the band, corresponding to the less mobile component, and showing an ultra-violet maximum at 242 m$\mu$, is eluted with methanol. The amount of $\Delta^{1,4}$-bisdehydro derivative of the steroid starting substrate contained in the methanol eluant is determined by ultra-violet absorption analysis and provides a measure of efficiency of the microorganism strain being tested in effecting the $\Delta^{1,4}$-dehydrogenation.

In accordance with the present invention and utilizing the preferred strains of Schizomycetes microorganisms, the dehydrogenation is effected by contacting the steroid compound of the pregnane series with the Schizomycetes microorganisms themselves or, if preferred, with enzyme systems of Schizomycetes microorganisms whereby the hydrogen attached to the C–1 and C–2 carbon atoms is selectively removed to produce the desired $\Delta^1$-steroid substantially uncontaminated by unwanted by-products. When the $\Delta^4$-3-keto-pregnene compound is subjected to the dehydrogenating activity of the preferred dehydrogenating strains of Schizomycetes microorganisms, the corresponding $\Delta^{1,4}$-3-keto pregnadiene compound is obtained directly and in high yield.

While this novel bacteriological dehydrogenation method is applicable for the $\Delta^1$ dehydrogenation of 3-keto-steroid compounds generally irrespective of the substituents attached to, or degree of unsaturation in, Rings B, C and D, it is ordinarily preferred to utilize, as starting materials in this method, C–4 unsaturated 3-oxygenated-steroid compounds of the pregnane series as for example $\Delta^4$-3-keto-pregnene compounds such as:

$\Delta^4$-pregnene-3,20-dione;
$\Delta^4$-pregnene-3,20-dione-17$\alpha$-ol;
$\Delta^4$-pregnene-3,20-dione-21-ol;
$\Delta^4$-pregnene-3,20-dione-21-ol 21-acylate;
$\Delta^4$-pregnene-3,20-dione-21-ol 21-acetate;
$\Delta^4$-pregnene-3,20-dione-17$\alpha$,21-diol;
$\Delta^4$-pregnene-3,20-dione-17$\alpha$,21-diol 21-acrylate;
$\Delta^4$-pregnene-3,20-dione-17$\alpha$,21-diol 21-acetate;
$\Delta^4$-pregnene-3,20-dione-17$\alpha$-ol-21-al;
$\Delta^4$-pregnene-3,11,20-trione;
$\Delta^4$-pregnene-3,11,20-trione-17$\alpha$-ol;
$\Delta^4$-pregnene-3,11,20-trione-21-ol;
$\Delta^4$-pregnene-3,11,20-trione-21-ol 21-acylate;
$\Delta^4$-pregnene-3,11,20-trione-21-ol 21-acetate;
$\Delta^4$-pregnene-3,11,20-trione-17$\alpha$,21-diol;
$\Delta^4$-pregnene-3,11,20-trione-17$\alpha$,21-diol 21-acrylate;
$\Delta^4$-pregnene-3,11,20-trione-17$\alpha$,21-diol 21-acetate;
$\Delta^4$-pregnene-3,11,20-trione-17$\alpha$-ol-21-al;
$\Delta^4$-pregnene-3,20-dione-11$\beta$-ol;
$\Delta^4$-pregnene-3,20-dione--11$\beta$,21-diol;

Δ⁴-pregnene-3,20-dione-11β,21-diol 21-acylate;
Δ⁴-pregnene-3,20-dione-11β,21-diol 21-acetate;
Δ⁴-pregnene-3,20-dione-11β-ol-21-al;
Δ⁴-pregnene-3,20-dione-11β,17α-diol;
Δ⁴-pregnene-3,20-dione-11β,17α,21-triol;
Δ⁴-pergnene-3,20-dione-11β,17α,21-triol 21-acylate;
Δ⁴-pregnene-3,20-dione-11β,17α-diol-21-al;
Δ⁴-pregnene-3,20-dione-11β,17α,21-triol-21-acetate;

9-halo-derivatives of these Δ⁴-3-keto-pregnene compounds such as:

9-halo-Δ⁴-pregnene-3,20-dione-17α,21-diol;
9-fluoro-Δ⁴-pregnene-3,20-dione-17α,21-diol;
9-halo-Δ⁴-pregnene-3,20-dione-17α,21-diol 21-acylate;
9-fluoro-Δ⁴-pregnene-3,20-dione-17α,21-diol 21-acetate;
9-halo-Δ⁴-pregnene-3,11,20-trione 17α,21-diol;
9-fluoro-Δ⁴-pregnene-3,11,20-trione-17α,21-diol;
9-halo-Δ⁴-pregnene-3,11,20-trione-17α,21-diol 21-acylate;
9-fluoro-Δ⁴-pregnene-3,11,20-trione-17α,21-diol 21-acetate;
9-halo-Δ⁴-pregnene-3,20-dione-11β,17α,21-triol;
9-fluoro-Δ⁴-pregnene-3,20-dione-11β,17α,21-triol;
9-halo-Δ⁴-pregnene-3,20-dione-11β,17α,21-triol 21-acylate;
9-fluoro-Δ⁴-pregnene-3,20-dione-11β,17α,21-triol 21-acetate; and the like.

Other suitable starting materials include the following compounds:

Δ⁴,⁶-pregnadiene-3,11,20-trione-17α,21-diol;
Δ⁴,⁶-pregnadiene-3,11,20-trione-17α,21-diol 21-acylate;
Δ⁴,⁶-pregnadiene-3,11,20-trione-17α,21-diol 21-acetate;
Δ⁴,⁶-pregnadiene-3,20-dione-11β,17α,21-triol;
Δ⁴,⁶-pregnadiene-3,20-dione-11β,17α,21-triol 21-acylate;
Δ⁴,⁶-pregnadiene-3,20-dione-11β,17α,21-triol 21-acetate;
16α-methyl-Δ⁴-pregnene-3,11,20-trione-17α,21-diol;
16α-methyl-Δ⁴-pregnene-3,11,20-trione-17α,21-diol 21-acylate;
16α-methyl-Δ⁴-pregnene-3,11,20-trione-17α,21-diol 21-acetate;
16α-methyl-Δ⁴-pregnene-3,20-dione-11β,17α,21-triol;
16α-methyl-Δ⁴-pregnene-3,20-dione-11β,17α,21-triol 21-acylate;
16α-methyl-Δ⁴-pregnene-3,20-dione-11β,17α,21-triol 21-acetate;
9α-fluoro-16α-methyl-Δ⁴-pregnene-3,20-dione-11β,17α,21-trol;
9α-fluoro-16α-methyl-Δ⁴-pregnene-3,20-dione-11β,17α,21-triol 21-acylate;
9α-fluoro-16α-methyl-Δ⁴-pregnene-3,20-dione-11β,17α,21-triol 21-acetate;
9α-fluoro-16α-methyl-Δ⁴-pregnene-3,11,20-trione-17α,21-diol;
9α-fluoro-16α-methyl-Δ⁴-pregnene-3,11,20-trione-17α,21-diol 21-acylate;
9α-fluoro-16α-methyl-Δ⁴-pregnene-3,11,20-trione-17α,21-diol 21-acetate;
16β-methyl-Δ⁴-pregnene-3,11,20-trione-17α,21-diol;
16β-methyl-Δ⁴-pregnene-3,11,20-trione-17α,21-diol 21-acylate;
16β-methyl-Δ⁴-pregnene-3,11,20-trione-17α,21-diol 21-acetate;
16β-methyl-Δ⁴-pregnene-3,20-dione-11β,17α-21-triol;
16β-methyl-Δ⁴-pregnene-3,20-dione-11β-17α,21-triol 21-acylate;
16β-methyl-Δ⁴-pregnene-3,20-dione-11β,17α,21-triol 21-acetate;
9α-fluoro-16β-methyl-Δ⁴-pregnene-3,20-dione-11β,17α,21-triol;
9α-fluoro-16β-methyl-Δ⁴-pregnene-3,20-dione-11β,17α,21-triol 21-acylate;
9α-fluoro-16β-methyl-Δ⁴-pregnene-3,20-dione-11β,17α,21-triol 21-acetate;
9α-fluoro-16β-methyl-Δ⁴-pregnene-3,11,20-trione-17α,21-diol;
9α-fluoro-16β-methyl-Δ⁴-pregnene-3,11,20-trione-17α,21-diol 21-acylate;
9α-fluoro-16β-methyl-Δ⁴-pregnene-3,11,20-trione-17α,21-diol 21-acetate;
6α-methyl-Δ⁴-pregnene-3,11,20-trione-17α-21-diol;
6α-methyl-Δ⁴-pregnene-3,11,20-trione-17α,21-diol 21-acylate;
6α-methyl-Δ⁴-pregnene-3,11,20-trione-17α,21-diol 21-acetate;
6α-methyl-Δ⁴-pregnene-3,20-dione-11β,17α,21-triol;
6α-methyl-Δ⁴-pregnene-3,20-dione-11β,17α,21-triol 21-acylate;
6α-methyl-Δ⁴-pregnene-3,20-dione-11β,17α,21-triol 21-acetate;
2α,16α-dimethyl-Δ⁴-pregnene-3,11,20-trione-17α,21-diol;
2α,16α-dimethyl-Δ⁴-pregnene-3,11,20-trione-17α,21-diol 21-acylate;
2α,16α-dimethyl-Δ⁴-pregnene3,11,20-trione-17α,21-diol 21-acetate;
2α,16α-dimethyl-Δ⁴-pregnene-3,20-dione-11β,17α,21-triol;
2α,16α-dimethyl-Δ⁴-pregnene-3,20-dione-11β,17α,21-triol 21-acylate;
2α,16α-dimethyl-Δ⁴-pregnene-3,20-dione-11β,17α,21-triol 21-acetate;
6,16α-dimethyl-Δ⁴,⁶-pregnadiene-3,11,20-trione-17α,21-diol;
6,16α-dimethyl-Δ⁴,⁶-pregnadiene-3,11,20-trione-17α,21-diol 21-acylate;
6,16α-dimethyl-Δ⁴,⁶-pregnadiene-3,11,20-trione-17α,21-diol 21-acetate;
6,16α-dimethyl-Δ⁴,⁶-pregnadiene-3,20-dione-11β,17α,21-triol;
6,16α-dimethyl-Δ⁴,⁶-pregnadiene-3,20-dione-11β,17α,21-triol 21-acylate;
6,16α-dimethyl-Δ⁴,⁶-pregnadiene-3,20-dione-11β,17α,21-triol 21-acetate;
9α-fluoro-6,16α-dimethyl-Δ⁴,⁶-pregnadiene,3,11,20-trione-17α,21-diol;
9α-fluoro-6,16α-dimethyl-Δ⁴,⁶-pregnadiene-3,11,20-trione-17α,21-diol 21-acylate;
9α-fluoro-6,16α-dimethyl-Δ⁴,⁶-pregnadiene-3,11,20-trione-17α,21-diol 21-acetate;
9α-fluoro-6,16α-dimethyl-Δ⁴,⁶-pregnadiene-3,20-dione-11β,17α,21-triol;
9α-fluoro-6,16α-dimethyl-Δ⁴,⁶-pregnadiene-3,20-dione-11β,17α,21-triol 21-acylate;
9α-fluoro-6,16α-dimethyl-Δ⁴,⁶-pregnadiene-3,20-dione-11β,17α,21-triol 21-acetate;
2-methyl-Δ⁴-pregnene-3,11,20-trione-17α,21-diol;
2-methyl-Δ⁴-pregnene-3,11,20-trione-17α,21-diol 21-acylate;
2-methyl-Δ⁴-pregnene-3,11,20-trione-17α,21-diol 21-acetate;
2-methyl-Δ⁴-pregnene-3,20-dione-11β,17a,21-triol;
2-methyl-Δ⁴-pregnene-3,20-dione-11β,17α,21-triol 21-acylate;
2-methyl-Δ⁴-pregnene-3,20-dione-11β,17α,21-triol 21-acetate;
9α-fluoro-2-methyl-Δ⁴-pregnene-3,11,20-trione-17α,21-diol;
9α-fluoro-2-methyl-Δ⁴-pregnene-3,11,20-trione-17α,21-diol 21-acylate;
9α-fluoro-2-methyl-Δ⁴-pregnene-3,11,20-trione-17α,21-diol 21-acetate;
9α-fluoro-2-methyl-Δ⁴-pregnene-3,20-dione-11β,17α,21-triol;
9α-fluoro-2-methyl-Δ⁴-pregnene-3,20-dione-11β,17α,21-triol 21-acylate;
9α-fluoro-2-methyl-Δ⁴-pregnene-3,20-dione-11β,17α,21-triol 21-acetate;
2-ethyl-Δ⁴-pregnene-3,20-dione-11β,17α,21-triol;
2-ethyl-Δ⁴-pregnene-3,20-dione-11β,17α,21-triol 21-acylate;

2-ethyl-Δ⁴-pregnene-3,20-dione-11β,17α,21-triol 21-acetate;
2-propyl-Δ⁴-pregnene-3,11,20-trione-17α,21-diol;
2-propyl-Δ⁴-pregnene-3,11,20-trione-17α,21-diol 21-acylate;
2-propyl-Δ⁴-pregnene-3,11,20-trione-17α,21-diol 21-acetate;
9α-fluoro-2-hexyl-Δ⁴-pregnene-3,20-dione-11β,17α,21-triol;
9α-fluoro-2-hexyl-Δ⁴-pregnene-3,20-dione-11β,17α,21-triol 21-acylate;
9α-fluoro-2-hexyl-Δ⁴-pregnene-3,20-dione-11β,17α,21-triol 21-acetate;
6α,16α-dimethyl-Δ⁴-pregnene-3,11,20-trione-17α,21-diol;
6α,16α-dimethyl-Δ⁴-pregnene-3,11,20-trione-17α,21-diol 21-acylate;
6α,16α-dimethyl-Δ⁴-pregnene-3,11,20-trione-17α,21-diol 21-acetate;
6α,16α-dimethyl-Δ⁴-pregnene-3,20-dione-11β,17α,21-triol;
6α,16α-dimethyl-Δ⁴-pregnene-3,20-dione-11β,17α,21-triol 21-acylate;
6α,16α-dimethyl-Δ⁴-pregnene-3,20-dione-11β,17α,21-triol 21-acetate;
9α-fluoro-6α,16α-dimethyl-Δ⁴-pregnene-3,11,20-trione-17α,21-diol;
9α-fluoro-6α,16α-dimethyl-Δ⁴-pregnene-3,11,20-trione-17α,21-diol 21-acylate;
9α-fluoro-6α,16α-dimethyl-Δ⁴-pregnene-3,11,20-trione-17α,21-diol 21-acetate;
9α-fluoro-6α,16α-dimethyl-Δ⁴-pregnene-3,20-dione-11β,17α,21-triol;
9α-fluoro-6α,16α-dimethyl-Δ⁴-pregnene-3,20-dione-11β,17α,21-triol 21-acylate;
9α-fluoro-6α,16α-dimethyl-Δ⁴-pregnene-3,20-dione-11β,17α,21-triol 21-acetate;

and the like.

Instead of the above compounds, I may employ as starting materials other C-5 unsaturated 3-oxygenated-steroid compounds as for example Δ⁵-3-hydroxy-pregnene compounds such as:

Δ⁵-pregnene-2-one-3-ol;
Δ⁵-pregnene-20-one3,17α-diol;
Δ⁵-pregnene-20-one-3,21-diol;
Δ⁵-pregnene-20-one-3,21-diol 21-acylate;
Δ⁵-pregnene-20-one-3,21-diol 21-acetate;
Δ⁵-pregnene-20-one3,17α,21-triol;
Δ⁵-pregnene-20-one-3,17α,21-triol 21-acylate;
Δ⁵-pregnene-20-one-3,17α,21-triol 21-acetate;
Δ⁵-pregnene-11,20-dione-3-ol;
Δ⁵-pregnene-11,20-dione-3,17α-diol;
Δ⁵-pregnene-11,20-dione-3,21-diol;
Δ⁵-pregnene-11,20-dione-3,21-diol 21-acylate;
Δ⁵-pregnene-11,20-dione-3,21-diol 21-acetate;
Δ⁵-pregnene-11,20-dione-3,17α,21-triol;
Δ⁵-pregnene-11,20-dione-3,17α,21-triol 21-acylate;
Δ⁵-pregnene-11,20-dione-3,17α,21-triol 21-acetate;
Δ⁵-pregnene-20-one-3,11β-diol;
Δ⁵-pregnene-20-one-3,11β,21-triol;
Δ⁵-pregnene-20-one-3,11β,21-triol 21-acylate;
Δ⁵-pregnene-20-one-3,11β,21-triol 21-acetate;
Δ⁵-pregnene-20-one-3,11β,17α-triol;
Δ⁵-pregnene-20-one-3,11β,17α,21-tetrol;
Δ⁵-pregnene-20-one-3,11β,17α,21-tetrol 21-acylate;
Δ⁵-pregnene-20-one-3,11β,17α,21-tetrol 21-acetate;
9-halo-derivatives of these Δ⁵-3-hydroxy-pregnene compounds such as:
9-halo-Δ⁵-pregnene-20-one-3,17α,21-triol;
9-fluoro-Δ⁵-pregnene-20-one,3-17α,21-triol;
9-halo-Δ⁵-pregnene-20-one-3,17α,21-triol 21-acylate;
9-fluoro-Δ⁵-pregnene-20-one-3,17α,21-triol 21-acetate;
9-halo-Δ⁵-pregnene-11,20-dione-3,17α,21-triol;
9-fluoro-Δ⁵-pregnene-11,20-dione-3,17α,21-triol;
9-halo-Δ⁵-pregnene-11,20-dione-3,17α,21-triol 21-acylate;
9-fluoro-Δ⁵-pregnene-11,20-dione-3,17α,21-triol 21-acetate;
9-halo-Δ⁵-pregnene-20-one,3,11β,17α-21-tetrol;
9-fluoro-Δ⁵-pregnene-20-one-3,11β,17α,21-tetrol;
9-halo-Δ⁵-pregnene-20-one-3,11β,17α,21-tetrol 21-acylate;
9-fluoro-Δ⁵-pregnene-20-one-3,11β,17α,21-tetrol 21-acetate; and Δ⁵-3-(lower alkanoyloxy) pregnene compounds such as:
Δ⁵-pregnene-20-one-3-ol 3-(lower alkanoate);
Δ⁵-pregnene-20-one-3-ol 3-acetate;
Δ⁵-pregnene-20-one-3,17α-diol 3-(lower alkanoate);
Δ⁵-pregnene-20-one-3,17α-diol 3-acetate;
Δ⁵-pregnene-20-one-3,1-diol 3-(lower alkanoate);
Δ⁵-pregnene-20-one-3,21-diol 3-acetate;
Δ⁵-pregnene-20-one-3,21-diol 3,21-bis(lower alkanoate);
Δ⁵-pregnene-20-one-3,21-diol 3,21-diacetate;
Δ⁵-pregnene-20-one-3,17α,21-triol 3-(lower alkanoate);
Δ⁵-pregnene-20-one-3,17α,21-triol 3-acetate;
Δ⁵-pregnene-20-one-3,17α,21-triol 3,21-bis(lower alkanoate);
Δ⁵-pregnene-20-one-3,17α,21-triol 3,21-diacetate;
Δ⁵-pregnene-11,20-dione-3-ol 3-(lower alkanoate);
Δ⁵-pregnene-11,20-dione-3-ol 3-acetate;
Δ⁵-pregnene-11,20-dione-3,17α-diol 3-(lower alkanoate);
Δ⁵-pregnene-11,20-dione-3,17α-diol 3-acetate;
Δ⁵-pregnene-11,20-dione-3,21-diol 3-(lower alkanoate);
Δ⁵-pregnene-11,20-dione-3,21-diol 3-acetate;
Δ⁵-pregnene-11,20-dione-3,21-diol 3,21-bis(lower alkanoate);
Δ⁵-pregnene-11,20-dione-3,21-diol 3,21-acetate;
Δ⁵-pregnene-11,20-dione-3,17α,21-triol 3-(lower alkanoate);
Δ⁵-pregnene-11,20-dione-3,17α,21-triol 3-acetate;
Δ⁵-pregnene-11,20-dione-3,17α,21-triol 3,21-bis(lower alkanoate);
Δ⁵-pregnene-11,20-dione-3,17α,21-triol 3,21-diacetate;
Δ⁵-pregnene-20-one-3,11β-diol 3-(lower alkanoate);
Δ⁵-pregnene-20-one-3,11β-diol 3-acetate;
Δ⁵-pregnene-20-one-3,11β,17α-triol 3-(lower alkanoate);
Δ⁵-pregnene-20-one-3,11β,17α-triol 3-acetate;
Δ⁵-pregnene-20-one-3,11β,21-triol 3-(lower alkanoate);
Δ⁵-pregnene-20-one-3,11β,21-triol 3-acetate;
Δ⁵-pregnene-20-one3,11β,21-triol 3,21-bis(lower alkanoate);
Δ⁵-pregnene-20-one-3,11β,21-triol 3,21-diacetate;
Δ⁵-pregnene-20-one-3,11β,17α,21-tetrol 3-(lower alkanoate);
Δ⁵-pregnene-20-one-3,11β,17α,21-tetrol 3-acetate;
Δ⁵-pregnene-20-one-3,11β,17α,21-tetrol 3,21-bis(lower alkanoate);
Δ⁵-pregnene-20-one-3,11β,17α,21-tetrol 3,21-diacetate;
9-halo-derivatives of these Δ⁵-3-(lower alkanyloxy)-pregnene compounds such as:
9-halo-Δ⁵-pregnene-20-one-3,17α,21-triol (3-lower alkanoate);
9-fluoro-Δ⁵-pregnene-20-one-3,17α,21-triol 3-acetate;
9-halo-Δ⁵-pregnene-11,20-dione-3,17α,21-triol (3-lower alkanoate);
9-fluoro-Δ⁵-pregnene-11,20-dione-3,17α,21-triol 3-acetate;
9-halo-Δ⁵-pregnene-11,20-dione-3,17α,21-triol 3,21-bis-lower alkanoate);
9-fluoro-Δ⁵-pregnene-11,20-dione-3,17α,21-triol-3,21-diacetate;
9-halo-Δ⁵-pregnene-20-one-3,11β,17α,21-tetrol 3-(lower alkanoate);
9-fluoro-Δ⁵-pregnene-20-one-3,11β,17α,21-tetrol 3-acetate;
9-halo-Δ⁵-pregnene-20-one-3,11β,17α,21-tetrol 3,21-diacetate; and the like.

These Δ⁵-3-oxygenated-pregnene compound starting materials are converted by the dehydrogenating activity of these Schizomycetes microorganisms directly to the corresponding Δ¹,⁴-3-keto pregnadiene compounds, which conversion may occur, it is believed, through the intermediate formation of the Δ⁴-3-keto compound. In the foregoing starting materials, the preferred ester substituent in the 3 and/or 21-position is ordinarily the acetate although other lower hydrocarbon carboxylic acid esters such as propionate, butyrate, tertiary butyl acetate, benzoate, and the like may be employed instead of the acetate, if desired. In addition to the foregoing $\Delta^5$-pregnene compounds, other $\Delta^5$ unsaturated steroids of the cholestene and androstene series may be employed as starting materials as for example: cholesterol; $\Delta^4$-cholestene-3-one; $\Delta^4$-cholestene-3,6-dione; $\Delta^4$-17-ethinyl androstene-17$\beta$-ol-3,11-dione; $\Delta^4$-androstene-3,17-dione; testosterone; androstenedione; and the like.

Instead of these C–5 unsaturated 3-oxygenated steroid compounds, I can also utilize as starting materials 3-oxygenated steroids saturated in Ring A as for example: 3-keto-pregnane compounds; 3 - hydroxy-pregnane compound; 3-keto-androstane compounds; 3-hydroxy-androstane compounds; 3-keto-cholestane compounds; 3-hydroxy-cholestane compounds; and the like, which are selectively dehydrogenated by the Schizomycetes microorganisms, and particularly the Eubacteriales and Nocardia microorganisms, to produce $\Delta^1$ and $\Delta^4$ unsautration (and in the case of the 3-hydroxy steroid compounds, oxidizing the 3-hydroxy radical to a 3-keto substituent), thereby forming the corresponding $\Delta^{1,4}$-3-keto-steroid compound. The oxygenated steroid compounds which I ordinarily employ as starting materials for this bacteriological dehydrogenation method using Schizomycetes microorganisms include:

pregnane-3,20-dione;
pregnane-3,20-dione-17$\alpha$-ol;
pregnane-3,20-dione-21-ol;
pregnane-3,20-dione-17$\alpha$,21-diol;
pregnane-3,11,20-trione;
pregnane-3,11,20-trione-17$\alpha$-ol;
pregnane-3,11,20-trione-21-ol;
pregnane-3,11,20-trione-17$\alpha$,21-diol;
pregnane-3,20-dione-11$\beta$-ol;
pregnane-3,20-dione-11$\beta$,17$\alpha$-diol;
pregnane-3,20-dione-11$\beta$,21-diol;
pregnane-3,20-dione-11$\beta$,17$\alpha$,21-triol;
pregnane-20-one-3-ol;
pregnane-20-one-3,17$\alpha$-diol;
pregnane-20-one-3,21-diol;
pregnane-20-one-3,17$\alpha$,21-triol;
pregnane-11,20-dione-3-ol;
pregnane-11,20-dione-3,17$\alpha$-diol;
pregnane-11,20-dione-3,21-diol;
pregnane-11,20-dione-3,17$\alpha$,21-triol;
pregnane-20-one-3,11$\beta$-diol;
pregnane-20-one-3,11$\beta$,17$\alpha$-triol;
pregnane-20-one-3,11$\beta$,21-triol;
pregnane-20-one-3,11$\beta$,17$\alpha$,21-tetrol;

the corresponding allopregnanes, as well as such compounds as:

cholestane-3$\beta$-ol;
cholestane-3-one;
cholestane-11$\alpha$-ol-7-one;
17$\beta$-hydroxy-17$\alpha$-methyl-3-androstanone;
androstane-3$\alpha$,17$\beta$-diol;

androsterone; and the like, and for those starting materials enumerated hereinabove which contain hydroxy radicals in the 3- and/or 21-positions, 3- and/or 21-esters thereof of lower hydrocarbon carboxylic acids such as acetic acid, propionic acid, tertiary butyl-acetic acid, benzoic acid, and the like.

Moreover, using the preferred Eubacteriales and Nocardia microorganisms, this microbiological procedure can be conducted utilizing not only these Ring A saturated 3-oxygenated steroid compounds, but also the corresponding C–5 unsaturated 3-oxygenated steroid compounds (e.g. 3-hydroxy-$\Delta^5$-steroids and 3-keto-$\Delta^4$-steroids) irrespective of the other substituents on the molecule, particularly substituents attached at C–17, whereby the corresponding 3-keto-$\Delta^{1,4}$-steroid product can be obtained without degradation of the side chain present at the 17-position.

The presently-invented microbiological dehydrogenation procedure is conducted by contacting the 3-oxygenated-steroid compound with the dehydrogenating activity of Schizomycetes microorganisms. This can be effected by adding the steroid compound as a solid, or as a solution in a solvent as for example a dialkyl ketone such as acetone, a dialkyl-formamide such as dimethyl-formamide, and the like, under sterile conditions to a culture of the microorganism in a nutrient medium and agitating the resulting mixture thereby bringing about growth of the microorganism and dehydrogenation of the steroid compound. The steroid can be added at the time the nutrient medium is inoculated with the culture of Schizomycetes microorganisms or, alternatively, may be added to an established culture. Instead of adding the steroid compound to the established culture in the nutrient medium, the cell growth from such established culture may be filtered from the broth, washed with distilled water, then suspended in buffered aqueous solution containing the 3-oxygenated-steroid compound, and the resulting mixture agitated thereby effecting dehydrogenation of the steroid compound to form the corresponding $\Delta^{1,4}$-3-oxygenated-steroid. The latter is more readily recovered from this medium than from the mixture obtained when the steroid is incubated with the microorganism in the original nutrient medium. Alternatively, the 3-oxygenated-steroid compound may be contacted with dehydrogenating enzyme preparations from the growth of Schizomycetes microorganisms, thereby forming the corresponding $\Delta^{1,4}$-3-oxygenated-steroid compounds.

The nutrient mediums used in carrying out this bacteriological dehydrogenation are those ordinarily utilized in the propagation of Schizomycetes microorganisms. The usual nutrients include a nitrogen and carbon source, inorganic salts and growth factors when required. The carbon can be provided by compounds such as acetates, lactates, and the like. The nitrogen can be provided by an ammonium salt, amino acids, or proteins such as soy beans, oats, yeast, yeast extracts, tryptic digest of casein, meat extract, blood meal, protein meat and bone scrap, salmon meal, fish meals, fish solubles, distillers solubles, and the like. If desired, the Schizomycetes microorganisms can be propagated using proteins (or amino acids) without any carbohydrate being present in the medium, in which case the proteins or amino acids serve as the source of both the carbon and nitrogen required by the microorganisms.

While, as noted hereinabove, the dehydrogenation of the 3-oxygenated-steroid compound may be carried out using dehydrogenating enzyme preparations from the growth of Schizomycetes microorganisms, or by contacting the steroid compound with a suspension of an established culture in distilled water, it is ordinarily preferred to add the 3-oxygenated-steroid compound to a nutrient medium containing a 24-hour growth of Schizomycetes microorganisms. The proportion of steroid compound which may be added to the medium varies depending upon the particular substrate being dehydrogenated, but it is ordinarily preferred to employ a concentration of about 0.005% to 0.2% of 3-oxygenated-steroid compound, although higher or lower concentration may be employed, if desired. The culture containing the added 3-oxygenated-steroid compound is then incubated, preferably with agitation and aeration for an additional period which ordinarily varies between about 10 hours and 50 hours although shorter or longer fermentation times may be advantageous for the dehydrogenation of particular 3-keto-steroid substrates. In view of the fact that prolonged fermentations may result in destruction of a portion of the $\Delta^{1,4}$-3-keto-steroid product, it is ordinarily preferred to employ a fermentation time of about 10 hours to 24 hours which, depending upon the steroid substrate, has been found to result in maximal yields of the $\Delta^1$-dehydrogenated steroid product.

After completion of the dehydrogenation process, the product is conveniently recovered from the fermented broth by extraction with a water-immisible solvent as for example a chlorinated hydrocarbon such a chloroform, a ketone such as methyl isobutyl ketone, an alkyl alkanoate such as ethyl acetate, and the like. The extract of $\Delta^1$-dehydrogenated steroid product and any unreacted starting material which may be present is conveniently purified by chromatography using silica gel, activated alumina, and the like or, if desired by means of descending paper chromatograms. After separation of the dehydrogenated product from unreacted starting material, the product can be purified further, if desired by recrystallization from a solvent such as ethyl acetate, ethyl acetate-petroleum ether, and the like.

In accordance with this bacteriological dehydrogenation method, and utilizing the C–5 unsaturated 3-oxygenated steroid compounds, 3-keto-pregnane compounds and 3-hydroxypregnane compounds enumerated hereinabove, there are obtained $\Delta^{1,4}$-3-keto pregnadiene compounds such as:

$\Delta^{1,4}$-pregnadiene-3,20-dione;
$\Delta^{1,4}$-pregnadiene-3,20-dione-17$\alpha$-ol;
$\Delta^{1,4}$-pregnadiene-3,20-dione-21-ol;
$\Delta^{1,4}$-pregnadiene-3,20-dione-17$\alpha$,21-diol;
$\Delta^{1,4}$-pregnadiene-3,20-dione-17$\alpha$-ol-21-al;
$\Delta^{1,4}$-pregnadiene-3,11,20-trione;
$\Delta^{1,4}$-pregnadiene-3,11,20-trione-17$\alpha$-ol;
$\Delta^{1,4}$-pregnadiene-3,11,20-trione-21-ol;
$\Delta^{1,4}$-pregnadiene-3,11,20-trione-17$\alpha$,21-diol;
$\Delta^{1,4}$-pregnadiene-3,11,20-trione-17$\alpha$-ol-21-al;
$\Delta^{1,4}$-pregnadiene-3,20-dione-11$\beta$-ol;
$\Delta^{1,4}$-pregnadiene-3,20-dione-11$\beta$-ol-21-al;
$\Delta^{1,4}$-pregnadiene-3,20-dione-11$\beta$,21-diol;
$\Delta^{1,4}$-pregnadiene-3,20-dione-11$\beta$,17$\alpha$-diol;
$\Delta^{1,4}$-3,20-dione-11$\beta$,17$\alpha$-21-triol;

9-halo-$\Delta^{1,4}$-3-keto-pregnadiene compounds such as:
9-halo-$\Delta^{1,4}$-pregnadiene-3,20-dione-17$\alpha$,21-diol;
9-fluoro-$\Delta^{1,4}$-pregnadiene-3,20-dione-17$\alpha$,21-diol;
9-halo-$\Delta^{1,4}$-pregnadiene-3,20-dione-11$\beta$,17$\alpha$,21-triol;
9-halo-$\Delta^{1,4}$-pregnadiene-3,11,20-trione-17$\alpha$,21-diol;
9-fluoro-$\Delta^{1,4}$-pregnadiene-3,11,20-trione-17$\alpha$,21-diol;
9-fluoro-$\Delta^{1,4}$-pregnadiene-3,20-dione-11$\beta$,17$\alpha$,21-triol;
$\Delta^{1,4,6}$-pregnatriene-3,11,20-trione-17$\alpha$,21-diol;
$\Delta^{1,4,6}$-pregnatriene-3,20-dione-11$\beta$,17$\alpha$,21-triol;
16$\alpha$-methyl-$\Delta^{1,4}$-pregnadiene-3,11,20-trione-17$\alpha$,21-diol;
16$\alpha$-methyl-$\Delta^{1,4}$-pregnadiene-3,20-dione-11$\beta$,17$\alpha$-21-triol;
9$\alpha$-fluoro-16$\alpha$-methyl-$\Delta^{1,4}$-pregnadiene-3,20-dione-11$\beta$,17$\alpha$,21-triol;
9$\alpha$-fluoro-16$\alpha$-methyl-$\Delta^{1,4}$-pregnadiene-3,11,20-trione-17$\alpha$,21-diol;
16$\beta$-methyl-$\Delta^{1,4}$-pregnadiene-3,11,20-trione-17$\alpha$,21-diol;
16$\beta$-methyl-$\Delta^{1,4}$-pregnadiene-3,20-dione-11$\beta$,17$\alpha$,21-triol;
9$\alpha$-fluoro-16$\beta$-methyl-$\Delta^{1,4}$-pregnadiene-3,20-dione-11$\beta$,17$\alpha$,21-triol;
9$\alpha$-fluoro-16$\beta$-methyl-$\Delta^{1,4}$-pregnadiene-3,11,20-trione-17$\alpha$,21-diol;
6$\alpha$-methyl-$\Delta^{1,4}$-pregnadiene-3,11,20-trione-17$\alpha$,21-diol;
6$\alpha$-methyl-$\Delta^{1,4}$-pregnadiene-3,20-dione-11$\beta$,17$\alpha$,21-triol;
2$\alpha$,16$\alpha$-dimethyl-$\Delta^{1,4}$-pregnadiene-3,11,20-trione-17$\alpha$,21-diol;
2$\alpha$,16$\alpha$-dimethyl-$\Delta^{1,4}$-pregnadiene-3,20-dione-11$\beta$,17$\alpha$,21-triol;
6,16$\alpha$-dimethyl-$\Delta^{1,4,6}$-pregnatriene-3,11,20-trione-17$\alpha$,21-diol;
6,16$\alpha$-dimethyl-$\Delta^{1,4,6}$-pregnatriene-3,20-dione-11$\beta$,17$\alpha$,21-triol;
9$\alpha$-fluoro-6,16$\alpha$-dimethyl-$\Delta^{1,4,6}$-pregnatriene-3,11,20-trione-17$\alpha$,21-diol;
9$\alpha$-fluoro-6,16$\alpha$-dimethyl-$\Delta^{1,4,6}$-pregnatriene-3,20-dione-11$\beta$,17$\alpha$,21-triol;
2-methyl-$\Delta^{1,4}$-pregnadiene-3,11,20-trione-17$\alpha$,21-diol;
2-methyl-$\Delta^{1,4}$-pregnadiene-3,20-dione-11$\beta$,17$\alpha$,21-triol;
9$\alpha$-fluoro-2-methyl-$\Delta^{1,4}$-pregnadiene-3,11,20-trione-17$\alpha$,21-diol;
9$\alpha$-fluoro-2-methyl-$\Delta^{1,4}$-pregnadiene-3,20-dione-11$\beta$,17$\alpha$21-triol;
2-ethyl-$\Delta^{1,4}$-pregnadiene-3,20-dione-11$\beta$,17$\alpha$,21-triol;
2-propyl-$\Delta^{1,4}$-pregnadiene-3,11,20-trione-17$\alpha$,21-diol;
9$\alpha$-fluoro-2-hexyl-$\Delta^{1,4}$-pregnadiene-3,20-dione-11$\beta$,17$\alpha$,21-triol;
6$\alpha$,16$\alpha$-dimethyl-$\Delta^{1,4}$-pregnadiene-3,11,20-trione-17$\alpha$,21-diol;
6$\alpha$,16$\alpha$-dimethyl-$\Delta^{1,4}$-pregnadiene-3,20-dione-11$\beta$,17$\alpha$,21-triol;
9$\alpha$-fluoro-6$\alpha$,16$\alpha$-dimethyl-$\Delta^{1,4}$-pregnadiene-3,11,20-trione-17$\alpha$,21-diol;
9$\alpha$-fluoro-6$\alpha$,16$\alpha$-dimethyl-$\Delta^{1,4}$-pregnadiene-3,20-dione-11$\beta$,17$\alpha$,21-triol;
$\Delta^{1,4}$-cholestadiene-3-one;
$\Delta^{1,4}$-cholestadiene-3,6-dione;
$\Delta^{1,4}$-ethinyl-androstadiene-17$\beta$-ol-3,11-dione;
$\Delta^{1,4}$-androstadiene-3,17-dione;
$\Delta^{1}$-testosterone;
$\Delta^{1,4}$-androstadienedione;
$\Delta^{1,4}$-cholestadiene-11$\alpha$-ol-7-one;
$\Delta^{1,4}$-androstadiene-17$\alpha$-methyl-17$\beta$-ol-3-one;
$\Delta^{1,4}$-androstadiene-17$\beta$-ol-3-one;
$\Delta^{1,4}$-androstadiene-3-one;

and the like. Thus, when a steroid starting compound having a single bond connecting the C–1 and C–2 carbon atoms is contacted with the dehydrogenating activity of a $\Delta^1$-dehydrogenating strain of Schizomycetes microorganisms, the resulting $\Delta^1$-dehydro derivative (or $\Delta^{1,4}$-bisdehydro derivative when the steroid starting compound is saturated in Ring A *and* at C–5) is referred to as a $\Delta^1$-steroid compound, which expression embraces compounds which may contain, in addition to the double bond connecting C–1 and C–2, other unsaturated linkages, such as $\Delta^4$ and/or $\Delta^6$, in the molecule.

Under controlled conditions and wherein 21-ester starting material is utilized, it is possible to conduct the $\Delta^1$-dehydrogenation process in such a manner as to minimize hydrolyzing the 21-ester group, thereby forming the 21-free alcohol. That is to say, whereas deacylation most readily occurs at a temperature range of from about 26°–29° C., when the fermentation is caired out at a temperature range of from about 32°–40° C., and preferably from 36°–38° C., hydrolysis of the 21-ester group is materially curtailed. Likewise, while deacylation occurs most readily in the pH range of from about 6.8–7.1, it is desirable though not essential that the fermentation be carried out outside this range when hydrolysis of the 21-ester group is to be avoided.

The following examples illustrate methods of carrying out the present invention, but it is to be understood that these examples are given for purposes of illustration and not of limitation.

EXAMPLE 1

Fifty milliliters of a nutrient medium are prepared having the following composition:

Cerelose—1 g.
Edamin—1 g.
Cornsteep liquor—0.25 ml.
Yeast extract—0.05 g.
Distilled water to make 50 ml.

This medium is adjusted to pH 6.5 with KOH, sterilized and inoculated with about 2.5 to 5 ml. of a culture, obtained by incubating *Bacillus sphaericus* (MB 431; ATCC 12488) microorganisms in the same medium for 24 hours at 28° C.; the inoculated culture is then incubated at a temperature of 28° C., with agitation, for a 24-hour period. To the resulting culture is added a solution containing 10 mg. of hydrocortisone ($\Delta^4$-pregnene-11$\beta$,17$\alpha$,21-triol-3,20-dione) dissolved in 0.1 ml. of dimethylformamide. The culture containing the steroid compound is incubated, with agitation, for an additional period of about 10 hours at 28° C.

The fermentation broth is extracted with three 50 ml.-portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and chloroform as the mobile liquid phase. Two bands are secured, one of which (corresponding to the more mobile component) shows the ultra-violet absorption maximum characteristic of hydrocortisone, and the other (the less mobile component) shows an ultra-violet absorption maximum at about 242 m$\mu$. The paper chromatogram is dried, and the band corresponding to the 242 m$\mu$. Absorption is cut off and extracted with methanol. The material extracted with methanol is again subjected to streak-paper chromatography, using paper which has been extracted for 48 hours with methanol, and employing the chloroform-formamide system previously employed. The resulting chromatogram shows only a trace band corresponding to the hydrocortisone starting material with the major band having an ultra-violet absorption maximum of 242 m$\mu$. The paper chromatogram is thoroughly dried, and the band corresponding to the 242 m$\mu$. absorption maximum is cut off and extracted with methanol. The methanol extract is evaporated to dryness in vacuo to give $\Delta^{1,4}$-pregnadiene-11$\beta$,17$\alpha$,21-triol-3,20-dione.

EXAMPLE 2

Twenty liters of a nutrient medium are prepared having the following composition:

Cerelose—400 g.
Edamin—400 g.
Cornsteep liquor—100 ml.
Yeast extract—20 g.
Distilled water to make 20 l.

This medium is adjusted to pH 6.5 with KOH, sterilized and inoculated with about one liter of a 24-hour growth of the microorganism *Bacillus sphaericus* (MB 431; ATCC 12488). The inoculated culture is incubated at a temperature of 28° C., with agitation, for a period of about 24 hours, and to the resulting culture is added a solution of four grams of hydrocortisone in 40 ml. of dimethylformamide. The culture containing the steroid compound is incubated, with agitation, for an additional period of about 10 hours at 28° C.

The fermentation broth is repeatedly extracted with ethyl acetate, and the ethyl acetate extracts are combined and evaporated to dryness in vacuo. A sample of the residual material is dissolved in acetone and spotted on a paper chromatogram which is developed using formamide as the stationary phase and chloroform as the mobile phase. Two separate bands are obtained; the lower band, corresponding to unchanged hydrocortisone, is cut off; the other band, corresponding to the $\Delta^1$-dehydro derivative, is likewise cut off and eluted with methanol. Ultra-violet absorption analysis of this methanol eluant shows that the upper band contains an amount of $\Delta^{1,4}$-pregnadiene-11$\beta$,17$\alpha$,21-triol-3,20-dione corresponding to a total yield of approximately one gram based on the four grams of hydrocortisone starting material.

The main part of the residual material obtained after evaporation of the ethyl acetate extract is subjected to partition between 70% aqueous methanol and petroleum ether thereby removing oily impurities in the petroleum ether phase. The methanol is evaporated from the aqueous methanol phase in vacuo, and the residual aqueous slurry is extracted with ethyl acetate. The ethyl acetate extract is evaporated to dryness in vacuo, and the residual material is dissolved in acetone and subjected to streak-paper chromatography utilizing formamide as the stationary phase and choloroform as the mobile phase. The upper band, corresponding to the $\Delta^1$-dehydro derivative, is cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized from ethyl acetate-petroleum ether to give approximately 200 mg. of substantially pure $\Delta^{1,4}$-pregnadiene-11$\beta$,17$\alpha$,21-triol-3,20-dione.

EXAMPLE 3

Twenty liters of a nutrient medium are prepared having the following composition:

Cerelose—400 g.
Edamin—400 g.
Cornsteep liquor—100 ml.
Yeast extract—20 g.
Distilled water make 20 l.

This medium is adjusted to pH 6.5 with KOH, sterilized and inoculated with about one liter of a 24-hour growth of the microorganism *Bacillus sphaericus* (MB 431; ATCC 12488). The inoculated culture is incubated at a temperature of 28° C., with agitation, for a period of about 24 hours, and to the resulting culture is added a solution containing four grams of cortisone dissolved in 40 ml. of dimethylformamide. The culture containing the steroid compound is inculated with agitation, for an additional period of about 10 hours at 28° C.

The fermentation broth is repeatedly extracted with ethyl acetate, and the ethyl acetate extracts are combined and evaporated to dryness in vacuo. Analysis of a sample of this residual material by paper chromatography, followed by a measurement of the ultraviolet absorption of the material contained in the two separate bands developed in the chromatogram, shows that the residual material contains approximately three grams of unchanged cortisone and about one gram of $\Delta^{1,4}$-pregnadiene-17$\alpha$,21-diol-3,11,20-trione.

The main part of the residual material obtained after evaporation of the ethyl acetate extract is subjected to partition between 70% aqueous methanol and petroleum ether thereby removing oily impurities in the petroleum ether phase. The methanol is evaporated from the aqueous methanol phase in vacuo, and the residual aqueous slurry is extracted with ethyl acetate. The ethyl acetate extract is evaporated to dryness in vacuo, and the residual material is subjected to streak-paper chromatography (using acetone as the solvent for transferring said material in the form of streaks on the paper chromatograms) and utilizing formamide as the stationary phase and benzene as the mobile phase for developing the chromatogram. The upper band, corresponding to the $\Delta^1$-dehydro derivative, is cut off, extracted with methanol and the methanol-extracted material is again subjected to streak-paper chromatography. The upper band is again cut off, thoroughly dried, extracted with methanol, and the methanol extract is evaporated to dryness in vacuo. The residual material is recrystallized from ethyl acetate-petroleum ether to give approximately 250 mg. of substantially pure $\Delta^{1,4}$-pregnadiene-17$\alpha$,21-diol-3,11,20-trione.

EXAMPLE 4

Twenty liters of a nutrient medium are prepared having the following composition:

Cerelose—400 g.
Edamin—400 g.
Corn steep liquor—100 ml.
Yeast extract—20 g.
Distilled water to make 20 l.

This medium is adjusted to pH 6.5 with KOH, sterilized and inoculated with about one liter of a 24-hour growth of the microorganisms *Bacillus sphaericus* (MB 431; ATCC 12488). The inoculated culture is incubated at a temperature of 28° C., with agitation, for a period of about 24 hours, and to the resulting culture is added a solution of four grams of $\Delta^4$-pregnene-17$\alpha$,21-diol-3,20-dione in 40 ml. of dimethyl formamide. The culture containing the steroid compound is incubated, with agitation, for about 10 hours at a temperature of 28° C.

The fermentation broth is repeatedly extracted with ethyl acetate, and the ethyl acetate extracts are combined and evaporated to dryness in vacuo. The residual material is subjected to partition between 70% aqueous methanol and petroleum ether, thereby removing oily impurities soluble in the petroleum ether phase. The methanol is evaporated from the aqueous methanol phase in vacuo, and the residual aqueous slurry is extracted with ethyl acetate. The ethyl acetate extract is evaporated to dryness in vacuo, and the residual material is dissolved in acetone and streaked on paper chromatograms which are developed using formamide as the stationary phase and benzene as the mobile phase. The upper bands for each chromatogram, corresponding to the $\Delta^1$-dehydro derivative, are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized from ethyl acetate-petroleum ether to give substantially pure $\Delta^{1,4}$-pregnadiene-17$\alpha$,21-diol-3,20-dione.

EXAMPLE 5

Twenty liters of a nutrient medium are prepared having the following composition:

Cerelose—400 g.
Edamin—400 g.
Cornsteep liquor—100 ml.
Yeast extract—20 g.
Distilled water to make 20 l.

This medium is adjusted to pH 6.5 with KOH, sterilized and inoculated with about one liter of 24-hour growth of the microorganism *Bacillus sphaericus* (MB 431; ATCC 12488). The inoculated culture is incubated at a temperature of 28° C., with agitation, for a period of about 24 hours, and to the resulting culture is added a solution of four grams of 9$\alpha$-fluoro-$\Delta^4$-pregnene-11$\beta$,17$\alpha$,21-triol-3,20-dione in 40 ml. of dimethylformamide. The culture containing the steroid compound is incubated, with agitation, for about 10 hours at a temperature of 28° C.

The fermentation broth is repeatedly extracted with ethyl acetate, and the ethyl acetate extracts are combined and evaporated to dryness in vacuo. The residual material is subjected to partition between 70% aqueous methanol and petroleum ether, thereby removing oily impurities soluble in the petroleum ether phase. The methanol is evaporated from the aqueous methanol phase in vacuo, and the residual aqueous slurry is extracted with ethyl acetate. The ethyl acetate extract is evaporated to dryness in vacuo, and the residual material is dissolved in acetone and streaked on paper chromatograms which are developed using formamide as the stationary prase and chloroform as the mobile phase. The upper bands for each chromatogram, corresponding to the $\Delta^1$-dehydro derivative, are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized from ethyl acetate-petroleum ether to give substantially pure 9$\alpha$-fluoro-$\Delta^{1,4}$-pregnadiene-11$\beta$,17$\alpha$,21-triol-3,20-dione; acetylation of this material using acetic anhydride in pyridine gives substantially pure 9$\alpha$ - fluoro-$\Delta^{1,4}$-pregnadiene-11$\beta$,17$\alpha$,21-triol-3,20-dione 21-acetate.

EXAMPLE 6

Twenty liters of a nutrient medium are prepared having the following composition:

Cerelose—400 g.
Edamin—400 g.
Cornsteep liquor—100 ml.
Yeast extract—20 g.
Distilled water to make 20 l.

This medium is adjusted to pH 6.5 with KOH, sterilized an inoculated with about one liter of a 24-hour growth of the microorganism *Bacillus sphaericus* (MB 431; ATCC 12488). The inoculated culture is incubated at a temperature of 28° C., with agitation, for a period of about 24 hours, and to the resulting culture is added a solution of four grams of $\Delta^4$-pregnene-11$\beta$,21-diol-3,20-dione in 40 ml. of dimethylformamide. The culture containing the steroid compound is incubated, with agitation, for about 10 hours at a temperature of about 28° C.

The $\Delta^{1,4}$-steroid formed by the dehydrogenating activity of the *Bacillus sphaericus* microorganisms is extracted from the fermentation broth with ethyl acetate and is purified using substantially the same purification method as that set forth in Example 4 hereinabove, including (1) partition between petroleum ether and methanol to remove petroleum ether-soluble oily impurities; (2) paper-streak chromatography using formamide as the stationary phase and benzene as the mobile phase; and (3) recrystallization from ethyl acetate-petroleum ether to give substantially pure $\Delta^{1,4}$-pregnadiene-11$\beta$,21-diol-3,20-dione.

EXAMPLE 7

Twenty liters of a nutrient medium are prepared having the following composition:

Cerelose—400 g.
Edamin—400 g.
Cornsteep liquor—100 ml.
Yeast extract—20 g.
Distilled water to make 20 l.

This medium is adjusted to pH 6.5 with KOH, sterilized and inoculated with about one liter of a 24-hour growth of the microorganism *Bacillus sphaericus* (MB 431; ATCC 12488). The inoculated culture is incubated at a temperature of 28° C., with agitation, for a period of about 24 hours, and to the resulting culture is added a solution of four grams of $\Delta^4$-pregnene-21-ol-3,20-dione in 40 ml. of dimethylformamide. The culture containing the steroid compound is incubated, with agitation, for a period of about 10 hours at a temperature of approximately 28° C.

The fermentation broth is repeatedly extracted with ethyl acetate, and the ethyl acetate extracts are combined and evaporated to dryness in vacuo. The residual material is subjected to partition between 70% aqueous methanol and petroleum ether, thereby removing oily impurities soluble in the petroleum ether phase. The methanol is evaporated from the aqueous methanol phase in vacuo, and the residual aqueous slurry is extracted with ethyl acetate. The ethyl acetate extract is evaporated to dryness in vacuo, and the residual material is dissolved in acetone and streaked on paper chromatograms which are developed using 50% methanolformamide as the stationary phase and 50% benzene-cyclohexane as the mobile phase. The upper bands for each chromatogram, corresponding to the $\Delta^1$-dehydro derivative, are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized from ethyl acetate-petroleum ether to give substantially pure $\Delta^{1,4}$-pregnadiene-21-ol-3,20-dione.

EXAMPLE 8

Fifty milliliters of a nutrient medium are prepared having the following composition:

Cerelose—1 g.
Edamin—1 g.
Cornsteep liquor—0.25 ml.
Yeast extract—0.05 g.
Distilled water to make 50 ml.

This medium is adjusted to pH 6.5 with KOH, sterilized and inoculated with about 2.5 to 5 ml. of a culture, obtained by incubating *Bacillus sphaericus* (MB 431; ATCC 12488) microorganisms in the same medium for 24 hours at 28° C.; the inoculated culture is then incubated at a temperature of 28° C., with agitation, for a 24-hour period. To the resulting culture is added a solution containing 10 mg. of $\Delta^4$-pregnene-11$\beta$-ol-3,20-dione in 0.1 ml of dimethylformamide. The culture containing the steroid compound is incubated, with agitation, for a period of about 10 hours at 28° C.

The fermentation broth is extracted with three 50 ml.-portions of ethyl acetate, and the ethyl acetate extracts are combined and evaporated in vacuo to a volume of about 5 ml. The concentrated solution is then used to prepare streak-paper chromatograms which are developed utilizing 50% methanol-formamide as the stationary liquid phase and 50% benzene-cyclohexane as the mobile liquid phase. Two bands are secured, one of which (corresponding to the more mobile component) shows the ultra-violet absorption maximum characteristic of 11$\beta$-hydroxy-progesterone, and the other (the less mobile component) shows an ultra-violet absorption maximum at about 241 m$\mu$. The paper chromatogram is dried and the band corresponding to the less mobile component is cut off and extracted with methanol. The material extracted with methanol is again subjected to streak-paper chromatography employing the solvent system previously utilized. The resulting chromatogram shows only a trace band corresponding to the 11$\beta$-hydroxy-progesterone starting material. The paper chromatogram is thoroughly dried, the major band having an ultra-violet absorption maximum of 241 m$\mu$ is cut off and extracted with methanol. The methanol extract is evaporated to dryness in vacuo to give $\Delta^{1,4}$-pregnadiene 11$\beta$-ol-3,20-dione.

EXAMPLE 9

Twenty liters of a nutrient medium are prepared having the following composition:

Cerelose—400 g.
Edamin—400 g.
Cornsteep liquor—100 ml.
Yeast extract—20 g.
Distilled water to make 20 l.

This medium is adjusted to pH 6.5 with KOH, sterilized and inoculated with about one liter of a 24-hour growth of the microorganism *Bacillus sphaericus* (MB 431; ATCC 12488). The inoculated culture is incubated at a temperature of 28° C., with agitation, for a period of about 24 hours, and to the resulting culture is added a solution of four grams of $\Delta^4$-pregnene-3,20-dione in 40 ml. of dimethylformamide. The culture containing the steroid compound is incubated, with agitation, for a period of about 10 hours at a temperature of approximately 28° C.

The fermentation broth is repeatedly extracted with ethyl acetate, and the ethyl acetate extracts are combined and evaporated to dryness in vacuo. The residual material is subjected to partition between 70% aqueous methanol and petroleum ether, thereby removing oily impurities soluble in the petroleum ether phase. The methanol is evaporated from the aqueous methanol phase in vacuo, and the residual aqueous slurry is extracted with ethyl acetate. The ethyl acetate extract is evaporated to dryness in vacuo, and the residual material is dissolved in acetone and streaked on paper chromatograms which are developed using 50% methanolformamide as the stationary phase and 50% benzene-cyclohexane as the mobile phase. The upper bands for each chromatogram, corresponding to the $\Delta^1$-dehydro derivatives, are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized from ethyl acetate-petroleum ether to give substantially pure $\Delta^{1,4}$-pregnadiene-3,20-dione.

EXAMPLE 10

Twenty liters of a nutrient medium are prepared having the following composition:

Cerelose—400 g.
Edamin—400 g.
Cornsteep liquor—100 ml.
Yeast extract—20 g.
Distilled water to make 20 l.

This medium is adjusted to pH 6.5 with KOH, sterilized and inoculated with about one liter of a 24-hour growth of the microorganism *Bacillus sphaericus* (MB 431; ATCC 12488). The inoculated culture is incubated at a temperature of 28° C., with agitation, for a period of about 24 hours, and to the resulting culture is added a solution of four grams of $\Delta^5$-pregnene-3-ol-20-one in 40 ml. of dimethylformamide. The culture containing the steroid compound is incubated, with agitation, for a period of about 10 hours at a temperature of approximately 28° C.

The fermentation broth is repeatedly extracted with ethyl acetate, and the ethyl acetate extracts are combined and evaporated to dryness in vacuo. The residual material is subjected to partition between 70% aqueous methanol and petroleum ether, thereby removing oily impurities soluble in the petroleum ether phase. The methanol is evaporated from the aqueous methanol phase in vacuo, and the residual aqueous slurry is extracted with ethyl acetate. The ethyl acetate extract is evaporated to dryness in vacuo, and the residual material is dissolved in acetone and streaked on paper chromatograms which are developed using 50% methanolformamide as the stationary phase and 50% benzene-cyclohexane as the mobile phase. The upper bands for each chromatogram, corresponding to the $\Delta^1$-dehydro derivative, are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized from ethyl acetate-petroleum ether to give substantially pure $\Delta^{1,4}$-pregnadiene-3,20-dione.

EXAMPLE 11

Fifty milliliters portions of each of seven different nutrient mediums, which have the compositions set forth in the table in column 19, lines 11–22, are adjusted to pH 7, sterilized by heating for 15 minutes in an autoclave at about 120° C., and each medium is inoculated with a culture of *Bacillus sphaericus* microorganisms (MB 431; ATCC 12488). The inoculated cultures are incubated at a temperature of 28° C., with agitation, for a period of about 24 hours, and to each of the resulting cultures is added a solution of 10 mg. of hydrocortisone in 0.1 ml. of dimethylformamide. The cultures containing the hydrocortisone are then incubated, with agitation, for an additional period of about 24 hours at 28° C.

Each of the fermentation broths thus obtained is individually extracted with three 50 ml.-portions of ethyl acetate, and the ethyl acetate extracts corresponding to each broth and derived from a particular medium are combined and evaporated to dryness in vacuo. Each of the seven residual products thus obtained is assayed for its content of $\Delta^{1,4}$-pregnadiene-11β,17α,21-triol-3,20-dione by polarographic analysis measuring the half-wave at 1.52 volts. The compositions of the mediums used, and the amount of $\Delta^{1,4}$-pregnadiene-11β,17α,21-triol-3,20 - dione ($\Delta^1$-hydrocortisone) obtained with each such medium, expressed as a percentage of the amount theoretically obtainable from the 10 mg. of hydrocortison starting material, is reported in the following table:

| Composition of medium | Yield of $\Delta^1$-hydro-cortisone percent of theory |
|---|---|
| Number: | |
| 1 ......... Same as Example 1 | 37 |
| 2 ......... 2% distillers solubles | 37 |
| 3 ......... 2% HCl casein hydrolysate | 44 |
| 4 ......... 1% cornsteep liquor, 1% soy bean meal | 31 |
| 5 ......... 2% fish meal | 30 |
| 6 ......... 2% cornsteep liquor | 34 |
| 7 ......... 2% tankage | 26 |

EXAMPLE 12

A ten milligram portion of $\Delta^4$-pregnene-11α,17α,21-triol-3,20-dione is contacted with the dehydrogenating activity of *Bacillus sphaericus* (MB 431; ATCC 12488) microorganisms and the dehydrogenated product is isolated in accordance with the procedure described for the dehydrogenation of $\Delta^4$ - pregnene-11β-ol-3,20-dione in Example 8 hereinabove, thereby producing $\Delta^{1,4}$-pregnadiene-11α,17α,21-triol-3,20-dione.

EXAMPLE 13

A ten milligram portion of $\Delta^4$-androstene-3,20-dione is contacted with the dehydrogenating activity of *Bacillus sphaericus* (MB 431; ATCC 12488) microorganisms and the dehydrogenated product is isolated in accordance with the procedure described for the dehydrogenation of $\Delta^4$-pregnene-11β-ol-3,20-dione in Example 8 hereinabove, thereby producing $\Delta^{1,4}$-androstadiene-3,20-dione.

EXAMPLE 14

A 50 ml.-portion of the edamin medium described in Example 8 hereinabove is adjusted to pH 7, sterilized by heating for 15 minutes in an autoclave at about 120° C., and the sterilized medium is inoculated with *Bacillus sphaericus* microorganisms (ATCC 245). The inoculated culture is incubated at a temperature of 28° C., with agitation, for a period of about 24 hours, and to the resulting culture is added a solution of 10 mg. of hydrocortisone in 0.1 ml. of dimethylformamide. The culture containing the hydrocortison are then incubated, with agitation, for an additional period of about 10 hours at 28° C.

The fermentation broth thus obtained is extracted with three 50 ml.-portions of ethyl acetate, and the ethyl acetate extracts are combined and evaporated to dryness in vacuo. The residual product thus obtained is assayed by polarographic analysis measuring the half-wave at 1.52 volts, and is found to contain an amount of $\Delta^{1,4}$-pregnadiene-11β,17α,21-triol-3,20-dione corresponding to a yield of over 50% of that theoretically obtainable from the 10 mg. of hydrocortisone starting material.

EXAMPLE 15

A 50 ml.-portion of the edamin medium described in Example 8 hereinabove is adjusted to pH 7, sterilized by heating for 15 minutes in an autoclave at about 120° C., and the sterilized medium is inoculated with *Bacillus sphaericus* microorganisms (ATCC 7054), which is a fusiformis variety of *B. sphaericus*, sometimes referred to as *Bacillus fusiformis*. The inoculated culture is incubated at a temperature of 28° C., with agitation, for a period of about 24 hours, and to the resulting culture is added a solution of 10 mg. of hydrocortisone in 0.1 ml. of dimethylformamide. The culture containing the hydrocortisone is then incubated, with agitation, for an additional period of about 10 hours at 28° C.

The fermentation broth thus obtained is extracted with three 50 ml.-portions of ethyl acetate, and the ethyl acetate extracts are combined and evaporated to dryness in vacuo. The residual product thus obtained is assayed by polarographic analysis measuring the half-wave at 1.52 volts, and is found to contain an amount of $\Delta^{1,4}$-pregnadiene-11β,17α,21-triol-3,20-diene corresponding to a yield of over 50% of that theoretically obtainable from the 10 mg. of hydrocortisone starting material.

EXAMPLE 16

A 50 ml.-portion of the edamin medium described in Example 8 hereinabove is adjusted to pH 7, sterilized by heating for 15 minutes in an autoclave at about 120° C., and the sterilized medium is inoculated with *Bacillus sphaericus* microorganisms (ATCC 7055), which is a fusiformis variety of *B. sphaericus*, sometimes referred to as *Bacillus fusiformis*. The inoculated culture is incubated at a temperature of 28° C., with agitation, for a period of about 24 hours, and to the resulting culture is added a solution of 10 mg. of 9α-fluoro-$\Delta^4$-pregnene-11β,17α,21-triol-3,20-dione in 0.1 ml. of dimethylformamide. The culture containing the steroid compound is incubated, with agitation, for a period of about 10 hours at 28° C.

The fermentation broth thus obtained is extracted with three 50 ml.-portions of ethyl acetate, and the ethyl acetate extracts are combined and evaporated to dryness in vacuo. The residual product thus obtained is assayed by polarographic analysis measuring the half-wave at 1.52 volts, and is found to contain an amount of 9α-fluoro-$\Delta^{1,4}$-pregnadiene-11β,17α,21 - triol - 3,20 - dione corresponding to a yield of over 50% of that theoretically obtainable from the 10 mg. of 9α-fluoro-$\Delta^4$-pregnene-11β,17α,21-triol-3,20-dione starting material.

EXAMPLE 17

Several 50 ml.-portions of the edamin medium described in Example 8 hereinabove are adjusted to pH 7, sterilized by heating for 15 minutes in an autoclave at about 120° C., and each of the sterilized mediums is inoculated with a culture of *Bacillus sphaericus* microorganisms (MB 834; ATCC 12634); this culture was isolated from a soil from a Texas oil field and is designated as Bacterial Isolate 246E₂X. The inoculated cultures are incubated at a temperature of 28° C., with agitation, for a period of about 24 hours, and to each of these resulting cultures is added a solution of 10 mg. of a different 3-hydroxy- or 3-keto-steroid compound in 0.1 ml. of dimethylformamide. The cultures containing the 3-keto-steroid compounds are then incubated, with agitation, for an additional period of about 10 hours.

Each of the fermentation broths thus obtained is individually extracted with three 50 ml.-portions of ethyl acetate, and the ethyl acetate extracts corresponding to each broth and derived from a particular 3-keto-steroid substrate are combined and evaporated to dryness in vacuo. Each of the residual products thus obtained is dissolved in acetone and streaked on paper chromatograms each of which is developed using the solvent system indicated for the particular substrate starting material in the table hereinbelow. The upper bands for each chromatogram, corresponding to the $\Delta^1$-dehydro derivatives, are cut off, individually extracted with methanol and the methanol-extracted material is again subjected to streak-paper chromatography. The upper band is again cut off, then dried, extracted with methanol, and the methanol extract is evaporated to dryness in vacuo to give, for each substrate used as starting material, the particular $\Delta^{1,4}$-3-ketosteroid compound indicated in the following table:

extract is evaporated to dryness in vacuo to give $\Delta^{1,4}$-pregnadiene-11β,17α,21-triol-3,20-dione.

SOLVENT SYSTEM USED FOR STREAK PAPER CHROMATOGRAPHY

| Experiment Number | Substrate | Stationary phase | Mobile phase | $\Delta^{1,4}$-3-ketosteroid obtained |
|---|---|---|---|---|
| 1 | $\Delta^4$-pregnene-21-ol-3, 20-dione (desoxycorticosterone, also called DOC). | 1:1 methanol-formamide. | 1:1 benzene-cyclohexane. | $\Delta^{1,4}$-pregnadiene-21-ol-3, 20-dione. |
| 2 | $\Delta^4$-pregnene-3, 20-dione (progesterone) | do | do | $\Delta^{1,4}$-pregnadiene-3,20-dione. |
| 3 | $\Delta^5$-pregnene-3-ol-20-one (pregnenolone) | do | do | Do. |
| 4 | $\Delta^4$-pregnene-17α, 21-diol-3, 20-dione | Formamide | Benzene | $\Delta^{1,4}$-pregnadiene-17α, 21-diol-3, 20-dione. |
| 5 | $\Delta^4$-pregnene-17α, 21-diol-3, 20-dione-21-acetate (substance S'acetate). | do | do | Do. |
| 6 | $\Delta^4$-pregnene-17α, 21-diol-3, 11, 20-trione | do | do | $\Delta^{1,4}$-pregnadiene-17α,21-diol-3,11,20-trione. |
| 7 | $\Delta^4$-pregnene-11β, 17α, 21-triol-3, 20-dione | do | Chloroform | $\Delta^{1,4}$-pregnadiene-11β, 17α, 21-triol-3, 20-dione. |
| 8 | 9α-fluoro-$\Delta^4$-pregnene-11β, 17α, 21-triol-3, 20-dione. | do | do | 9α-fluoro-$\Delta^{1,4}$-pregnadiene-11β, 17α, 21-triol-3, 20-dione. |
| 9 | $\Delta^4$-androstene-3, 17-dione | 1:1 methanol-formamide. | 1:1 benzene cyclohexane. | $\Delta^{1,4}$-androstadiene-3, 17-dione. |
| 10 | $\Delta^4$-cholestene-3β-ol | do | Cyclohexane | $\Delta^{1,4}$-cholestadiene-3-one. |
| 11 | $\Delta^4$-cholestene-3-one | do | do | $\Delta^{1,4}$-cholestadiene-3-one-11α-ol. |
| 12 | $\Delta^4$-cholestene-11α-ol-7-one | do | do | $\Delta^{1,4}$-cholestadiene-11α-ol-7-one. |
| 13 | $\Delta^{5(6)}$-cholestene-3β-ol (cholesterol) | do | do | $\Delta^{1,4}$-cholestadiene-3-one. |
| 14 | $\Delta^4$-cholestene-3-one | do | do | Do. |
| 15 | $\Delta^4$-cholestene-3, 6-dione | do | do | $\Delta^{1,4}$-cholestadiene-3,6-dione. |
| 16 | 17β-hydroxy-17α-methyl-$\Delta^4$-androstene-3-one | do | do | 17α-methyl-$\Delta^{1,4}$-androstadiene-17β-ol-3-one. |
| 17 | Pregnane-3, 17α, 21-triol-11,20-dione-21-acetate | Formamide | Benzene | $\Delta^{1,4}$-pregnadiene-17α,21-diol-3,11,20-trione. |
| 18 | Pregnane-17α, 21-diol-3, 11, 20-trione 21-acetate | do | do | Do. |
| 19 | Pregnane-3, 17α, 21-triol-20-one-21-acetate | do | do | $\Delta^{1,4}$-pregnadiene-17α, 21-diol-3, 20-dione. |
| 20 | Pregnane-17α, 21-diol-3, 20-dione-21-acetate | do | do | Do. |

EXAMPLE 18

Fifty milliliters of a nutrient medium are prepared having the following composition:

Cerelose—1 g.
Edamin—1 g.
Cornsteep liquor—0.25 ml.
Distilled water to make 50 ml.

This medium is adjusted to pH 6.5 with KOH, sterilized and inoculated with about 2.5 to 5 ml. of a culture of *Nocardia asteroides* (MA 272; ATCC 9970) microorganisms, and the inoculated culture is then incubated at a temperature of 28° C., with agitation, for a 48-hour period. To the resulting culture is added a solution containing 10 mg. of hydrocortisone ($\Delta^4$-pregnene-11β,17α,21-triol-3,20-dione) dissolved in 0.1 ml. of dimethylformamide. The culture containing the steroid compound is incubated, with agitation, for an additional period of about 24 hours at 28° C.

The fermentation broth is extracted with four 50 ml.-portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and chloroform as the mobile liquid phase. Two bands are secured, one of which (corresponding to the more mobile component) shows the ultra-violet absorption maximum characteristic of hydrocortisone, and the other (the less mobile component) shows an ultra-violet absorption maximum at about 242 mμ. The paper chromatogram is dried, and the band corresponding to the 242 mμ absorption is cut off and extracted with methanol. The material extracted with methanol is again subjected to streak-paper chromatography, using paper which has been extracted for 48 hours with methanol, and employing the chloroform-formamide system previously employed. The resulting chromatogram shows only a trace band corresponding to the hydrocortisone starting material with the major band having an ultra-violet absorption maximum at 242 mμ. The paper chromatogram is thoroughly dried, and the band corresponding to the 242 mμ absorption maximum is cut off and extracted with methanol. The methanol extract is evaporated to dryness in vacuo to give $\Delta^{1,4}$-pregnadiene-11β,17α,21-triol-3,20-dione.

EXAMPLE 19

Fifty milliliters of a nutrient medium are prepared having the following composition:

Cerelose—1 g.
Edamin—1 g.
Cornsteep liquor—0.25 ml.
Distilled water to make 50 ml.

This medium is adjusted to pH 6.5 with KOH, sterilized and inoculated with about 2.5 to 5 ml. of a culture of *Nocardia minima* (MA 292; ATCC 8674) microorganisms, and the inoculated culture is then incubated at a temperature of 28° C., with agitation, for a 48-hour period. To the resulting culture is added a solution containing 10 mg. of hydrocortisone ($\Delta^4$-pregnene-11β,17α,21-triol-3,20-dione) dissolved in 0.1 ml. of dimethylformamide. The culture containing the steroid compound is incubated, with agitation, for an additional period of about 24 hours at 28° C.

The fermentation broth is extracted with four 50 ml.-portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and chloroform as the mobile liquid phase. Two bands are secured, one of which (corresponding to the more mobile component) shows the ultra-violet absorption maximum characteristic of hydrocortisone, and the other (the less mobile component) shows an ultra-violet absorption maximum at about 242 mμ. The paper chromatogram is dried, and the band corresponding to the 242 mμ absorption is cut off and extracted with methanol. The material extracted with methanol is again subjected to streak-paper chromatography, using paper which has been extracted for 48 hours with methanol, and employing the chloroform-formamide system previously employed. The resulting chromatogram shows only a trace band corresponding to the hydrocortisone starting material with the major band having an ultra-violet absorption maximum at 242 mμ. The paper chromatogram is thoroughly dried, and the band corresponding to the 242 mμ absorption maximum is cut off and extracted with methanol. The methanol extract is evaporated to dryness in vacuo to give $\Delta^{1,4}$-pregnadiene-11β,17α,21-triol-3,20-dione.

EXAMPLE 20

Fifty milliliters of a nutrient medium are prepared having the following composition:

Cerelose—1 g.
Edamin—1 g.
Cornsteep liquor—0.25 ml.
Distilled water to make 50 ml.

This medium is adjusted to pH 6.5 with KOH, sterilized and inoculated with about 2.5 to 5 ml. of a culture of *Nocardia asteroides* (MA 289; ATCC 10904) microorganisms, and the inoculated culture is then incubated at a temperature of 28° C., with agitation, for a 48-hour period. To the resulting culture is added a solution containing 10 mg. of hydrocortisone ($\Delta^4$-pregnene-11$\beta$,17$\alpha$,21-triol-3,20-dione) dissolved in 0.1 ml. of dimethylformamide. The culture containing the steroid compound is incubated, with agitation, for an additional period of about 24 hours at 28° C.

The fermentation broth is extracted with four 50 ml.-portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and chloroform as the mobile liquid phase. Two bands are secured, one of which (corresponding to the more mobile component) shows the ultra-violet absorption maximum characteristic of hydrocortisone, and the other (the less mobile component) shows an ultra-violet absorption maximum at about 242 m$\mu$. The paper chromatogram is dried, and the band corresponding to the 242 m$\mu$ absorption is cut off and extracted with methanol. The material extracted with methanol is again subjected to streak-paper chromatography, using paper which has been extracted for 48 hours with methanol, and employing the chloroform-formamide system previously employed. The resulting chromatogram shows only a trace band corresponding to the hydrocortisone starting material with the major band having an ultra-violet absorption maximum at 242 m$\mu$. The paper chromatogram is thoroughly dried, and the band corresponding to the 242 m$\mu$ absorption maximum is cut off and extracted with methanol. The methanol extract is evaporated to dryness in vacuo to give $\Delta^{1,4}$-pregnadiene-11$\beta$,17$\alpha$,21-triol-3,20-dione.

EXAMPLE 21

Fifty milliliters of a nutrient medium are prepared having the following composition:

Cerelose—1 g.
Edamin—1 g.
Cornsteep liquor—0.25 ml.
Distilled water to make 50 ml.

This medium is adjusted to pH 6.5 with KOH, sterilized and inoculated with about 2.5 to 5 ml. of a culture of *Nocardia globerula* (MA 280; ATCC 9356) microorganisms, and the inoculated culture is then incubated at a temperature of 28° C., with agitation, for a 48-hour period. To the resulting culture is added a solution containing 10 mg. of hydrocortisone ($\Delta^4$-pregnene-11$\beta$,17$\alpha$,21-triol-3,20-dione) dissolved in 0.1 ml. of dimethylformamide. The culture containing the steroid compound is incubated, with agitation, for an additional period of about 24 hours at 28° C.

The fermentation broth is extracted with four 50 ml.-portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and chloroform as the mobile liquid phase. Two bands are secured, one of which (corresponding to the more mobile component) shows the ultra-violet absorption maximum characteristic of hydrocortisone, and the other (the less mobile component) shows an ultra-violet absorption maximum at about 242 m$\mu$. The paper chromatogram is dried, and the band corresponding to the 242 m$\mu$ absorption is cut off and extracted with methanol. The material extracted with methanol is again subjected to streak-paper chromatography, using paper which has been extracted for 48 hours with methanol, and employing the coloroform-formamide system previously employed. The resulting chromatogram shows only a trace band corresponding to the hydrocortisone starting material with the major band having an ultra-violet absorption maximum at 242 m$\mu$. The paper chromatogram is thoroughly dried, and the band corresponding to the 242 m$\mu$ absorption maximum is cut off and extracted with methanol. The methanol extract is evaporated to dryness in vacuo to give $\Delta^{1,4}$-pregnadiene-11$\beta$,17$\alpha$,21-triol-3,20-dione.

EXAMPLE 22

Fifty milliliters of a nutrient medium are prepared having the following composition:

Cerelose—1 g.
Edamin—1 g.
Cornsteep liquor—0.25 ml.
Distilled water to make 50 ml.

This medium is adjusted to pH 6.5 with KOH, sterilized and inoculated with about 2.5 to 5 ml. of a culture of *Nocardia leishmanii* (MA 281; ATCC 6855) microorganisms, and the inoculated culture is then incubated at a temperature of 28° C., with agitation, for a 48-hour period. To the resulting culture is added a solution containing 10 mg. of hydrocortisone ($\Delta^4$-pregnene-11$\beta$,17$\alpha$,21-triol-3,20-dione) dissolved in 0.1 ml. of dimethylformamide. The culture containing the steroid compound is incubated, with agitation, for an additional period of about 24 hours at 28° C.

The fermentation broth is extracted with four 50 ml.-portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and chloroform as the mobile liquid phase. Two bands are secured, one of which (corresponding to the more mobile component) shows the ultra-violet absorption maximum characteristic of hydrocortisone and the other (the less mobile component) shows an ultra-violet absorption maximum at about 242 m$\mu$. The paper chromatogram is dried, and the band corresponding to the 242 m$\mu$ absorption is cut off and extracted with methanol. The material extracted with methanol is again subjected to streak-paper chromatography, using paper which has been extracted for 48 hours with methanol, and employing the chloroform-formamide system previously employed. The resulting chromatogram shows only a trace band corresponding to the hydrocortisone starting material with the major band having an ultra-violet absorption maximum at 242 m$\mu$. The paper chromatogram is thoroughly dried, and the band corresponding to the 242 m$\mu$ absorption maximum is cut off and extracted with methanol. The methanol extract is evaporated to dryness in vacuo to give a $\Delta^{1,4}$-pregnadiene-11$\beta$,17$\alpha$,21-triol-3,20-dione.

EXAMPLE 23

Fifty milliliters of a nutrient medium are prepared having the following composition:

Cerelose—1 g.
Edamin—1 g.
Cornsteep liquor—0.25 ml.
Distilled water to make 50 ml.

This medium is adjusted to pH 6.5 with KOH, sterilized and inoculated with about 2.5 to 5 ml. of a culture of *Nocardia formica* (MA 143; NRRL 2470) microorganisms, and the inoculated culture is then incubated at a temperature of 28° C., with agitation, for a 48-hour period. To the resulting culture is added a solution containing 10 mg. of hydrocortisone ($\Delta^4$-pregnene-11$\beta$,17$\alpha$,21-triol-3,20-dione) dissolved in 0.1 ml. of dimethylformamide. The culture containing the steroid compound is incubated, with agitation, for an additional period of about 24 hours at 28° C.

The fermentation broth is extracted with four 50 ml.-portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and chloroform as the mobile liquid phase. Two bands are secured, one of which (corresponding to the more mobile component) shows the ultra-violet absorption maximum characteristic of hydrocortisone, and the other (the less mobile component) shows an ultra-violet absorption maximum at about 242 m$\mu$. The paper chromatogram is dried, and the band corresponding to the 242 m$\mu$ absorption is cut off and extracted with methanol. The material extracted with methanol is again subjected to streak-paper chromatography, using paper which has been extracted for 48 hours with methanol, and employing the chloroform-formamide system previously employed. The resulting chromatogram shows only a trace band corresponding to the hydrocortisone starting material with the major band having an ultra-violet absorption maximum at 242 m$\mu$. The paper chromatogram is thoroughly dried, and the band corresponding to the 242 m$\mu$ absorption maximum is cut off and extracted with methanol. The methanol extract is evaporated to dryness in vacuo to give $\Delta^{1,4}$-pregnadiene-11$\beta$,17$\alpha$,21-triol-3,20-dione.

EXAMPLE 24

Fifty milliliters of a nutrient medium are prepared having the following composition:

Cerelose—1 g.
Edamin—1 g.
Cornsteep liquor—0.25 ml.
Distilled water to make 50 ml.

This medium is adjusted to pH 6.5 with KOH, sterilized and inoculated with about 2.5 to 5 ml. of a culture of *Nocardia convoluta* (MA 275; ATCC 4275) microorganisms, and the inoculated culture is then incubated at a temperature of 28° C., with agitation, for a 48-hour period. To the resulting culture is added a solution containing 10 mg. of hydrocortisone ($\Delta^4$-pregnene-11$\beta$,17$\alpha$,21-triol-3,20-dione) dissolved in 0.1 ml. of dimethylformamide. The culture containing the steroid compound is incubated, with agitation, for an additional period of about 24 hours at 28° C.

The fermentation broth is extracted with four 50 ml.-portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and chloroform as the mobile liquid phase. Two bands are secured, one of which (corresponding to the more mobile component) shows the ultra-violet absorption maximum characteristics of hydrocortisone, and the other (the less mobile component) shows an ultra-violet absorption maximum at about 242 m$\mu$. The paper chromatogram is dried, and the band corresponding to the 242 m$\mu$ absorption is cut off and extracted with methanol. The material extracted with methanol is again subjected to streak-paper chromatography, using paper which has been extracted for 48 hours with methanol, and employing the chloroform-formamide system previously employed. The resulting chromatogram shows only a trace band corresponding to the hydrocortisone starting material with the major band having an ultra-violet absorption maximum at 242 m$\mu$. The paper chromatogram is thoroughly dried, and the band corresponding to the 242 m$\mu$ absorption maximum is cut off and extracted with methanol. The methanol extract is evaporated to dryness in vacuo to give $\Delta^{1,4}$-pregnadione-11$\beta$,17$\alpha$,21-triol-3,20-dione.

EXAMPLE 25

Fifty milliliters of a nutrient medium are prepared having the following composition:

Cerelose—1 g.
Edamin—1 g.
Cornsteep liquor—0.25 ml.
Distilled water to make 50 ml.

This medium is adjusted to pH 6.5 with KOH, sterilized and inoculated with about 2.5 to 5 ml. of a culture of *Nocardia corallina* (MA 277; ATCC 4273) microorganisms, and the inoculated culture is then incubated at a temperature of 28° C., with agitation, for a 48-hour period. To the resulting culture is added a solution containing 10 mg. of hydrocortisone ($\Delta^4$-pregnene-11$\beta$,17$\alpha$,21-triol-3,20-dione) dissolved in 0.1 ml. of dimethylformamide. The culture containing the steroid compound is incubated, with agitation, for an additional period of about 24 hours at 28° C.

The fermentation broth is extracted with four 50 ml.-portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and chloroform as the mobile liquid phase. Two bands are secured, one of which (corresponding to the more mobile component) shows the ultra-violet absorption maximum characteristic of hydrocortisone, and the other (the less mobile component) shows an ultra-violet absorption maximum at about 242 m$\mu$. The paper chromatogram is dried, and the band corresponding to the 242 m$\mu$ absorption is cut off and extracted with methanol. The material extracted with methanol is again subjected to streak-paper chromatography, using paper which has been extracted for 48 hours with methanol, and employing the chloroform-formamide system previously employed. The resulting chromatogram shows only a trace band corresponding to the hydrocortisone starting material with the major band having an ultra-violet absorption maximum at 242 m$\mu$. The paper chromatogram is thoroughly dried, and the band corresponding to the 242 m$\mu$ absorption maximum is cut off and extracted with methanol. The methanol extract is evaporated to dryness in vacuo to give $\Delta^{1,4}$-pregnadiene-11$\beta$,17$\alpha$,21-triol-3,20-dione.

EXAMPLE 26

Several 50 ml.-portions of the edamin medium described in Examples 18 to 25 hereinabove are adjusted to pH 6.5, sterilized by heating for 15 minutes in an autoclave at about 120° C., and each of the sterilized mediums is inoculated with a culture of *Nocardia blackwellii* microorganisms (ATCC 6846). The inoculated cultures are incubated at a temperature of 28° C., with agitation, for a period of about 48 hours, and to each of the six resulting cultures is added a solution of 10 mg. of a different 3-keto-steroid compound in 0.1 ml. of dimethylformamide. The cultures containing the 3-keto-steroid compounds are then incubated, with agitation, for an additional period of about 24 hours.

Each of the fermentation broths thus obtained is individually extracted with four 50 ml.-portions of ethyl acetate, and the ethyl acetate extracts corresponding to each broth and derived from a particular 3-keto-steroid substrate are combined and evaporated to dryness in vacuo. Each of the residual products thus obtained is dissolved in acetone and streaked on paper chromatograms each of which is developed using the solvent system indicated for the particular substrate starting material in the table hereinbelow. The upper bands for each chromatogram, corresponding to the $\Delta^1$-dehydro derivatives, are cut off, individually extracted with methanol and the methanol-extracted material is again subjected to streak-paper chromatography. The upper band is again cut off, then dried, extracted with methanol, and the methanol extract is evaporated to dryness in vacuo to give for each substrate used as starting material, the particular $\Delta^{1,4}$-3-keto-steroid compound indicated in the following table:

This medium is adjusted to pH 6.5 with KOH, sterilized and inoculated with about 2.5 to 5 ml. of a culture of *Mycobacterium phlei* (MB 481; ATCC 12,298) microorganisms, and the inoculated culture is then incubated at a temperature of 28° C., with agitation, for a 24-hour

SOLVENT SYSTEM USED FOR STREAK PAPER CHROMATOGRAPHY

| Experiment Number | Substrate | Stationary phase | Mobile phase | $\Delta^{1,4}$-3-ketosteroid obtained |
|---|---|---|---|---|
| 1 | Androstane-3α,17β-diol | 1:1 methanol-formamide | Cyclohexane | $\Delta^{1,4}$-androstadiene-17β-ol-3-one. |
| 2 | Androsterone | do | do | $\Delta^{1,4}$-androstadiene-3,17-dione. |
| 3 | Testosterone | do | do | $\Delta^{1}$-testosterone. |
| 4 | Androstenedione | do | do | $\Delta^{1,4}$-androstadiene-3,17-dione. |
| 5 | $\Delta^{4}$-pregnene-11β,17α,21-triol-3,20-dione | Formamide | do | $\Delta^{1,4}$-pregnadiene-11β,17α,21-triol-3,20-dione. |
| 6 | Pregnane-11β,17α,21-triol-3,20-dione | do | do | Do. |
| 7 | Pregnane-17α,21-diol-3,11,20-trione-21-acetate | do | 1:1 chloroform toluene. | $\Delta^{1,4}$-pregnadiene-17α,21-diol-3,11,20-trione. |
| 8 | Allopregnane-17α,21-diol-3,11,20-trione-21-acetate | do | do | Do. |
| 9 | Pregnane-17α,21-diol-3,20-dione | do | Benzene | $\Delta^{1,4}$-pregnadiene-17α,21-diol-3,20-dione. |
| 10 | Allopregnane-17α,21-diol-3,11-dione-21-acetate | do | do | $\Delta^{1,4}$-pregnadiene-17α,21-diol-3,20-dione. |
| 11 | $\Delta^{4}$-androstene-9α-ol-3,17-dione | 1:1 methanol-formamide | Cyclohexane | $\Delta^{1,4}$-androstadiene-9α-ol-3,17-dione. |
| 12 | $\Delta^{16}$-androstene-3α-ol | do | do | $\Delta^{1,4,16}$-androstatriene-3-one. |
| 13 | 6α-chloro-$\Delta^{4}$-cholestene-3-one | do | do | 6α-chloro-$\Delta^{1,4}$-cholestadiene-3-one. |
| 14 | Cholestane-3β-ol-7-one | do | do | $\Delta^{1,4}$-cholestadiene-3,7-dione. |
| 15 | $\Delta^{1}$-cholestene | do | do | $\Delta^{1,4}$-cholestadiene. |

EXAMPLE 27

Fifty milliliters of a nutrient medium are prepared having the following composition:

Cerelose—1 g.
Edamin—1 g.
Cornsteep liquor—0.25 ml.
Distilled water to make 50 ml.

This medium is adjusted to pH 6.5 with KOH, sterilized and inoculated with about 2.5 to 5 ml. of a culture of *Mycobacterium smegmatis* (MB 81; NRRL B–1667) microorganisms, and the inoculated culture is then incubated at a temperature of 28° C., with agitation, for a 24-hour period. To the resulting culture is added a solution containing 10 mg. of hydrocortisone ($\Delta^{4}$-pregnene-11β,17α, 21-triol-3,20-dione) dissolved in 0.1 ml. of dimethylformamide. The culture containing the steroid compound is incubated, with agitation, for an additional period of about 24 hours at 28° C.

The fermentation broth is extracted with three 50 ml.-portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and chloroform as the mobile liquid phase. Two bands are secured, one of which (corresponding to the more mobile component) shows the ultra-violet absorption maximum characteristic of hydro-cortisone, and the other (the less mobile component) shows an ultra-violet absorption maximum at about 242 mμ. The paper chromatogram is dried, and the band corresponding to the 242 mμ absorption is cut off and extracted with methanol. The material extracted with methanol is again subjected to streak-paper chromatography, using paper which has been extracted for 48 hours with methanol, and employing the chloroform-formamide system previously employed. The resulting chromatogram shows only a trace band corresponding to the hydrocortisone starting material with the major band having an ultra-violet absorption maximum of 242 mμ. The paper chromatogram is thoroughly dried, and the band corresponding to the 242 mμ absorption maximum is cut off and extracted with methanol. The methanol extract is evaporated to dryness in vacuo to give $\Delta^{1,4}$-pregnadiene-11β,17α,21-triol-2,20-dione.

EXAMPLE 28

Fifty milliliters of a nutrient medium are prepared having the following composition:

Cerelose—1 g.
Edamin—1 g.
Cornsteep liquor—0.25 ml.
Distilled water to make 50 ml.

This medium is adjusted to pH 6.5 with KOH, sterilized and inoculated with about 2.5 to 5 ml. of a culture of *Mycobacterium phlei* (MB 481; ATCC 12,298) microorganisms, and the inoculated culture is then incubated at a temperature of 28° C., with agitation, for a 24-hour period. To the resulting culture is added a solution containing 10 mg. of hydrocortisone ($\Delta^{4}$-pregnene-11β,17α,21-triol-3,20-dione) dissolved in 0.1 ml. of dimethylformamide. The culture containing the steroid compound is incubated, with agitation, for an additional period of about 24 hours at 28° C.

The fermentation broth is extracted with three 50 ml.-portions of ethyl acetate, and the ethyl acetate extracts are combined and evaporaed in vacuo to a volume of about 5 ml. The concentrated solution is then used to prepare streak-paper chromatograms which are developed utilizing formamide as the stationary liquid phase and chloroform as the mobile liquid phase. Two bands are secured, one of which (corresponding to the more mobile component) shows the ultra-violet absorption maximum characteristic of hydrocortisone, and the other (the less mobile component) shows an ultra-violet absorption maximum at about 242 mμ. The paper chromatogram is dried, and the band corresponding to the 242 mμ absorption is cut off and extracted with methanol. The material extracted with methanol is again subjected to streak-paper chromatography, using paper which has been extracted for 48 hours with methanol, and employing the chloroform-formamide system previously employed. The resulting chromatogram shows only a trace band corresponding to the hydrocortisone starting material with the major band having an ultra-violet absorption maximum of 242 mμ. The paper chromatogram is thoroughly dried, and the band corresponding to the 242 mμ absorption maximum is cut off and extracted with methanol. The methanol extract is evaporated to dryness in vacuo to give $\Delta^{1,4}$-pregnadiene-11β,17α,21-triol-3,20-dione.

EXAMPLE 29

Fifty milliliters of a nutrient medium are prepared having the following composition:

Cerelose—1 g.
Edamin—1 g.
Cornsteep liquor—0.25 ml.
Distilled water to make 50 ml.

This medium is adjusted to pH 6.5 with KOH, sterilized and inoculated with about 2.5 to 5 ml. of a culture of *Mycobacterium lactiocla* (MB 466; ATCC 12,297) microorganisms, and the inoculated culture is then incubated at a temperature of 28° C., with agitation, for a 24-hour period. To the resulting culture is added a solution containing 10 mg. of hydrocortisone ($\Delta^{4}$-pregnene-11β,17α, 21-triol-3,20-dione) dissolved in 0.1 ml. of dimethylformamide. The culture containing the steroid compound is incubated, with agitation, for an additional period of about 24 hours at 28° C.

The fermentation broth is extracted with three 50 ml.-portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and chloroform as the mobile liquid phase. Two bands are secured, one of which (corresponding to the more mobile component) shows the ultra-violet absorption maximum characteristic of hydrocortisone, and the other (the less mobile component) shows an ultra-violet absorption maximum at about 242 m$\mu$. The paper chromatogram is dried, and the band corresponding to the 242 m$\mu$ absorption is cut off and extracted with methanol. The material extracted with methanol is again subjected to streak-paper chromatography, using paper which has been extracted for 48 hours with methanol, and employing the chloroform-formamide system previously employed. The resulting chromatogram shows only a trace band corresponding to the hydrocortisone starting material with the major band having an ultra-violet absorption maximum of 242 m$\mu$. The paper chromatogram is thoroughly dried, and the band corresponding to the 242 m$\mu$ absorption maximum is cut off the extracted with methanol. The methanol extract is evaporated to dryness in vacuo to give $\Delta^{1,4}$-pregnadiene-11$\beta$,17$\alpha$,21-triol-3,20-dione.

EXAMPLE 30

Fifty milliliters of a nutrient medium are prepared having the following composition:

Cerelose—1 g.
Edamin—1 g.
Cornsteep liquor—0.25 ml.
Distilled water to make 50 ml.

This medium is adjusted to pH 6.5 with KOH, sterilized and inoculated with about 2.5 to 5 ml. of a culture of *Mycobacterium tuberculosis* (MB 83; ATCC 12,296) microorganisms, and the inoculated culture is then incubated at a temperature of 28° C., with agitation, for a 24-hour period. To the resulting culture is added a solution containing 10 mg. of hydrocortisone ($\Delta^4$-pregnene-11$\beta$,17$\alpha$,21-triol-3,20-dione) dissolved in 0.1 ml. of dimethylformamide. The culture containing the steroid compound is incubated, with agitation, for an additional period of about 24 hours at 28° C.

The fermentation broth is extracted with three 50 ml.-portions of ethyl acetate, and the ethyl acetate extracts are combined and evaporaed in vacuo to a volume of about 5 ml. The concentrated solution is then used to prepare streak-paper chromatograms which are developed utilizing formamide as the stationary liquid phase and chloroform as the mobile liquid phase. Two bands are secured, one of which (corresponding to the more mobile component) shows the ultra-violet absorption maximum characteristic of hydrocortisone, and the other (the less mobile component) shows an ultraviolet absorption maximum at about 242 m$\mu$. The paper chromatogram is dried, and the band corresponding to the 242 m$\mu$ absorption is cut off and extracted with methanol. The material extracted with methanol is again subjected to streak-paper chromatography, using paper which has been extracted for 48 hours with methanol, and employing the chloroform-formamide system previously employed. The resulting chromatogram shows only a trace band corresponding to the hydrocortisone starting material with the major band having an ultra-violet absorption maximum of 242 m$\mu$. The paper chromatogram is thoroughly dried, and the band corresponding to the 242 m$\mu$ absorption maximum is cut off and extracted with methanol. The methanol extract is evaporated to dryness in vacuo to give $\Delta^{1,4}$-pregnadiene-11$\beta$,17$\alpha$,21-triol-3,20-dione.

EXAMPLE 31

Fifty milliliters of a nutrient medium are prepared having the following composition:

Cerelose—1 g.
Edamin—1 g.
Cornsteep liquor—0.25 ml.
Distilled water to make 50 ml.

This medium is adjusted to pH 6.5 with KOH, sterilized and inoculated with about 2.5 to 5 ml. of a culture of *Mycobacterium smegmatis* (MB 81; NRRL B–1667) microorganisms, and the inoculated culture is then incubated at a temperature of 28° C., with agitation, for a 24-hour period. To the resulting culture is added a solution containing 10 mg. of pregnane-11$\beta$,17$\alpha$,21-triol-3,20-dione dissolved in 0.1 ml. of dimethylformamide. The culture containing the steroid compound is incubated, with agitation, for an additional period of about 24 hours at 28° C.

The fermentation broth is extracted with three 50 ml.-portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and chloroform as the mobile liquid phase. The paper chromatogram is dried, and the band corresponding to the component which shows an ultra-violet absorption maximum at almost 242 m$\mu$. is cut off and extracted with methanol. The material extracted with methanol is again subjected to streak-paper chromatography, using paper which has been extracted for 48 hours with methanol, and employing the chloroform-formamide system previously employed. The paper chromatogram is thoroughly dried, and the band corresponding to the 242 m$\mu$. absorption maximum is cut off and extracted with methanol. The methanol extract is evaporated to dryness in vacuo to give $^{1,4}$-pregnadiene-11$\beta$,17$\alpha$,21-triol-3,20-dione.

EXAMPLE 32

Fifty milliliters of a nutrient medium are prepared having the following composition:

Cerelose—1 g.
Edamin—1 g.
Cornsteep liquor—0.25 ml.
Distilled water to make—50 ml.

This medium is adjusted to pH 6.5 with KOH, sterilized and inoculated with about 2.5 to 5 ml. of a culture of *Mycobacterium phlei* (MB 481; ATCC 12,298) microorganisms, and the inoculated culture is then incubated at a temperature of 28° C., with agitation, for a 24-hour period. To the resulting culture is added a solution containing 10 mg. of pregnane-11$\beta$,17$\alpha$,21-triol-3,20-dione dissolved in 0.1 ml. of dimethylformamide. The culture containing the steroid compound is incubated, with agitation, for an additional period of about 24 hours at 28° C.

The fermentation broth is extracted with three 50 ml.-portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and chloroform as the mobile liquid phase. The paper chromatogram is dried, and the band corresponding to the component which shows an ultra-violet absorption maximum at almost 242 m$\mu$. is cut off and extracted with methanol. The material extracted with methanol is again subjected to streak-paper chromatography, using paper which has been extracted for 48 hours with methanol, and employing the chloroform-formamide system previously employed. The paper chromatogram is thoroughly dried, and the band corresponding to the 242 m$\mu$. absorption maximum is cut off and extracted with methanol. The methanol extract is evaporated to dryness in vacuo to give $\Delta^{1,4}$-pregnadiene-11$\beta$,17$\alpha$,21-triol-3,20-dione.

EXAMPLE 33

Fifty milliliters of a nutrient medium are prepared having the following composition:

Cerelose—1 g.
Edamin—1 g.
Cornsteep liquor—0.25 ml.
Distilled water to make 50 ml.

This medium is adjusted to pH 6.5 with KOH, sterilized and inoculated with about 2.5 to 5 ml. of a culture of *Mycobacterium lacticola* (MB 466; ATCC 12,297) microorganisms, and the inoculated culture is then incubated at a temperature of 28° C., with agitation, for a 24-hour period. To the resulting culture is added a solution containing 10 mg. of pregnane-11$\beta$,17$\alpha$,21-triol-3,20-dione dissolved in 0.1 ml. of dimethylformamide. The culture containing the steroid compound is incubated, with agitation, for an additional period of about 24 hours at 28° C.

The fermentation broth is extracted with three 50 ml.-portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and chloroform as the mobile liquid phase. The paper chromatogram is dried, and the band corresponding to the component which shows an ultra-violet absorption maximum at almost 242 m$\mu$. is cut off and extracted with methanol. The material extracted with methanol is again subjected to streak-paper chromatography, using paper which has been extracted for 48 hours with methanol, and employing the chloroform-formamide system previously employed. The paper chromatogram is thoroughly dried, and the band corresponding to the 242 m$\mu$. absorption maximum is cut off and extracted with methanol. The methanol extract is evaporated to dryness in vacuo to give $\Delta^{1,4}$-pregnadiene-11$\beta$,17$\alpha$,21-triol-3,20-dione.

EXAMPLE 34

Fifty milliliters of a nutrient medium are prepared having the following composition:

Cerelose—1 g.
Edamin—1 g.
Cornsteep liquor—0.25 ml.
Distilled water to make 50 ml.

This medium is adjusted to ph 6.5 with KOH, sterilized and inoculated with about 2.5 to 5 ml. of a culture of *Bacillus sphaericus* (MB 431; ATCC 12,488) microorganisms and the inocluated culture is then incubated at a temperature of 28° C., with agitation, for a 24-hour period. To the resulting culture is added a solution containing 10 mg. of dehydroepiandosterone (5-androstene-3-ol-17-one) dissolved in 10 ml. of ethanol. The culture containing the steriod compound is incubated with agitation for an additional period of 24 hours.

The fermentation broth is extracted with three 50 ml.-portions of chloroform and the chloroform extracts are combined and evaporated in vacuo to a volume of about 5 ml. The concentrated solution is then used to prepare streak-paper chromatograms which are developed using propylene glycol as the stationary phase and 1:1 benzene: cyclohexane as the mobile phase. After descending development the chromatograms are dried and viewed with an ultra-violet scanner. The band which corresponds to a steroidal $\alpha,\beta$-unsaturated ketone is cut out and eluted with methanol. The methanol eluate is evaporated to dryness in vacuo to give $\Delta^4$-androstene-3,17-dione.

EXAMPLE 35

Fifty milliliters of a medium, prepared as described in Example 34, is inoculated with 2.5 to 5 ml. of a culture of *Bacillus sphaericus* microorganisms and incubated with agitation at a temperature of 28° C. for a 24-hour period. To the resulting culture is added a solution containing 10 mg. of dehydroepiandrosterone ($\Delta^5$-androstene-3-ol-17-one) dissolved in 10 ml. of ethanol. The culture containing the steroid compound is incubated with agitation for an additional period of 96 hours.

The fermentation broth is extracted with three 50 ml.-portions of chloroform and the chloroform extracts are combinded and evaporated in vacuo to a volume of about 5 ml. The concentrated solution is then used to prepare streak-paper chromatograms which are developed using propylene glycol as the stationary phase and 1:1 benzene: cyclohexane as the mobile phase. After descending development the chromatograms are dried and viewed with an ultra-violet scanner. A band is detected corresponding to a product having a mobility of approximately 0.8 that of $\Delta^4$-androstene - 3,17 - dione. This product is recovered by cutting out the band and eluting with methanol. The methanol eluate is evaporated in vacuo to dryness to give $\Delta^{1,4}$-androstadiene - 3,17 - dione which has an ultra-violet absorption maxima at 245 m$\mu$.

EXAMPLE 36

Six hundred milliliters of a nutrient medium are prepared having the following composition:

Cerelose—12 g.
Edamin—12 g.
Cornsteep liquor—3 ml.
Cornsteep liquor—3 ml.

This medium is adjusted to pH 6.5 with KOH, sterilized and inoculated with about 2.5 to 5 ml. of a culture, obtained by incubating *Bacillus sphaericus* (MB 431: ATCC 12,488) microorganisms in the same medium for 24 hours at 28° C., the inoculated culture is then incubated at a temperature of 28° C., with agitation, for a 24-hour period. To the resulting culture is added a solution containing 250 mg. of 6-dehydrocortisone acetate (4,6-pregnadiene-17$\alpha$,21-diol-3,11,20 - trione 21 - acetate) dissolved in 1.2 ml. of dimethylformamide. The culture containing the steroid compound is incubated, with agitation, for an additional period of about 24 hours at 28° C.

The fermentation broth is extracted with two 600 ml.-portions of ethyl acetate, and the ethyl acetate extracts are combined, washed with saturated aqueous sodium sulfate solution, dried and evaporated to give an oil. From this oil, by direct crystallization is obtained a crude 1,4,6-pregnatriene-17$\alpha$,21-diol-3,11,20-trione contaminated by some starting material. This material is subjected to streak-paper chromatography to give substantially pure, 1,4-6-pregnatriene-17$\alpha$,21-diol-3,11,20-trione.

In accordance with the above procedure, but substituting *Nocardia asteroides* (ATCC 9970) as the $\Delta^1$-dehydrogenating microorganism, there is likewise obtained 1,4,6-pregnatriene-17$\alpha$,21-diol-3,11,20-trione.

EXAMPLE 37

A 250 milligram portions of 4,6-pregnadiene-17$\beta$,17$\alpha$-21-trione-3,20-dione 21-acetate is contacted with the dehydrogenating activity of *Basillus sphaericus* (MB 431; ATCC 12,488) microorganisms, and the dehydrogenated product is isolated, in accordance with the detailed procedure described for the dehydrogenation of 6-dehydrocortisone steroid in Example 36 hereinabove, thereby producing 1,4,6-pregnatriene-11β,-17α,21-triol-3,20-dione.

In accordance with the above procedure, but substituting *Nocardia minima* (ATCC 8674) as the Δ¹-dehydrogenating microorganism, there is likewise obtained 1,4,6-pregnatriene-11β,17α,21-triol-3,20-dione.

EXAMPLE 38

Fifty milliliters of a nutrient medium are prepared having the following composition:

Cerelose—1 g.
Edamin—1 g.
Cornsteep liquor—0.25 ml.
Distilled water to make 50 ml.

This medium is adjusted to pH 6.5 with KOH, sterilized and inoculated with about 2.5 to 5 ml. of a culture of *Bacillus sphaericus* (ATCC 245) microorganisms, and the inoculated culture is then incubated at a temperature of 28° C., with agitation, for a 24-hour period. To the resulting culture is added a solution containing 10 mg. of 16α-methyl-4-pregnene-17α,21 - diol -3,11,20 - trione dissolved in 0.2 ml. of dimethylformamide. The culture containing the steroid compound is incubated, with agitation, or an additional period of about 24 hours at 28° C.

The fermentation broth is extracted with four 50 ml.-portions of ethyl acetate, and the ethyl acetate extracts are combined and evaporated in vacuo to a volume of about 5 ml. The concentrated solution is then streaked on paper chromatograms which are developed using dimethylformamide as the stationary phase and 50% benzene-50% chloroform as the mobile phase. After 8 hours development in a descending system, the upper bands for each chromatogram, corresponding to the Δ¹-dehydro derivative, are cut off, extracted with methanol, and the methanol extracted material is again subjected to streak-paper chromatography. The upper band is again cut off, thoroughly dried, extracted with methanol, and the methanol extract is evaporated to dryness in vacuo. The residual material is recrystallized from ethyl acetate-petroleum ether to give 16α-methyl-1,4-pregnadiene-17α,21-diol-3,11,20-trione.

In accordance with the above procedure, but substituting *Protaminobacter rubrum* as the Δ¹-dehydrogenating microorganism, there is likewise obtained 16α-methyl-1,4-pregnadiene-17α,21-diol-3,11,20-trione.

EXAMPLE 39

Fifty milliliters of a nutrient medium are prepared having the following composition:

Cerelose—1 g.
Edamin—1 g.
Cornsteep liquor—0.25 ml.
Distilled water to make 50 ml.

This medium is adjusted to pH 6.5 KOH sterilized and inoculated with about 2.5 to 5 ml. of a culture of *Nocardia asteroides* (ATCC 9970) microorganisms, and the inoculated culture is then incubated at room temperature of 28° C., with agitation, for a 24-hour period. To the resulting culture is added a solution containing 10 mg. of 16α-methyl - 4 - pregnene - 11β,17α,21 - triol - 3,20-dione dissolved in 0.2 ml. of dimethylformamide. The culture containing the steroid compound is incubated, with agitation, for an additional period of about 24 hours at 28° C.

The fermentation broth is extracted with four 50 ml. portions of ethyl acetate, and the ethyl acetate extracts are combined and evaporated in vacuo to a volume of about 5 ml. The concentrated solution is then streaked on paper chromatograms which are developed using dimethylformamide as the stationary phase and 50% benzene-50% chloroform as the mobile phase. The upper bands for each chromatogram corresponding to the Δ¹-dehydro-derivative are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized from ethyl acetate-petroleum ether to give 16α-methyl-1,4-pregnadiene-11β,17α,21-triol-3,20-dione.

In accordance with the above procedure, but substituting *Protaminobacter alboflavum* as the Δ¹-dehydrogenating microorganisms, there is likewise obtained 16α-methyl-1,4-pregnadiene-11β,17α,21-triol-3,20-dione.

EXAMPLE 40

Fifty milliliters of a nutrient medium are prepared having the following composition:

Cerelose—1 g.
Edamin—1 g.
Cornsteep liquor—0.25 ml.
Distilled water to make 50 ml.

This medium is adjusted to pH 6.5 wtih KOH, sterilized and inoculated with about 2.5 to 5 ml. of a culture of *Mycobacterium smegmatis* (NRRL B–1667) microorganisms, and the inoculated culture is then incubated at a temperature of 28° C., with agitation, for a 24-hour period. To the resulting culture is added a solution containing 10 mg. of 16α-methyl-9α-fluoro-4-pregnene-11β,17α,21-triol-3,20-dione dissolved in 0.2 ml. of dimethylformamide. The culture containing the steroid compound is incubated, with agitation, for an additional period of about 24 hours at 28° C.

The fermentation broth is extracted with three 50 ml.-portions of ethyl acetate, and the ethyl acetate extracts are combined and evaporated in vacuo to a volume of about 5 ml. The concentrated solution is then used to prepare streak-paper chromatograms which are developed utilizing dimethylformamide as the stationary liquid phase and 50% benzene–50% chloroform as the mobile liquid phase. Two bands are secured, one of which (corresponding to the more mobile component) shows the ultra-violet absorption maximum characteristic of the 16α-methyl-9α-fluoro-4-pregnene-11β,17α,21-triol-3,20-dione starting material and the other (the less mobile component) shows an ultra-violet absorption maximum at about 245 mμ. The paper chromatogram is dried, and the band corresponding to the 245 mμ absorption is cut off and extracted with methanol. The material extracted with methanol, is again subjected to streak-paper chromatography, using paper which has been extracted for 48 hours with methanol, and employing the chloroform-formamide system previously employed. The resulting chromatogram shows only a trace band corresponding to the starting material with the major band having an ultra-violet absorption maximum of 245 mμ. The paper chromatogram is thoroughly dried, and the band corresponding to the 245 mμ absorption maximum is cut off and extracted with methanol. The methanol extract is evaporated to dryness in vacuo to give 16α-methyl - 9α-fluoro-1,4-pregnadiene-11β,17α,21-triol-3,20-dione.

EXAMPLE 41

The fermentation procedures of Examples 38, 39 and 40 are repeated but using in place of the microorganisms and the 16α - methyl-11-oxygenated-4-pregnene-17α,21-diol-3,20-dione starting material employed in those examples, the microorganisms strains and steroid starting compounds indicated in the table hereinbelow. The resulting fermentation broths are treated in accordance with the isolation methods described in Examples 38, 39 and 40 to give, for the particular microorganism strain and steroid substrate used, the 16α - methyl-11-oxygenated-1,4- pregnadiene - 17α,21-diol-3,20-dione indicated in the following table:

11β,17α,21-trihydroxy - 16β - methyl-1,4-pregnadiene-3,20-dione.

| Experiment Number | Substrate | *Bacillus sphaericus* microorganisms | 16-methyl-11-oxygenated-1,4-pregnadiene-17α,21-diol-3,20-dione product |
|---|---|---|---|
| 1 | 16α-methyl-4-pregnene-17α,21-diol-3,11,20-trione | ATCC-7054 | 16α-methyl-1,4-pregnadiene-17α,21-diol-3,11,20-trione |
| 2 | 16α-methyl-4-pregnene-11β,17α,21-triol-3,20-dione | ATCC-245 | 16α-methyl-1,4-pregnadiene-11β,17α21-triol-3,20-dione |
| 3 | 16-methyl-4-pregnene-11β,17α,21-triol-3,20-dione 21-acetate | ATCC-4525 | Do. |
| 4 | 16α-methyl-4-pregnene-17α,21-diol-3,11,20-trione | ATCC-7055 | 16α-methyl-1,4-pregnadiene-17α,21-diol-3,11,20-trione |
| 5 | 16α-methyl-9α-fluoro-4-pregnene-17α,21-diol-3,11,20-trione 21-acetate | ATCC-7055 | 16α-methyl-9α-fluoro-1,4-pregnadiene-17α,21-diol-3,11,20-trione |
| 6 | 16α-methyl-9α-fluoro-4-pregnene-11β,17α,21-triol-3,20-dione | ATCC-245 | 16α-methyl-9α-fluoro-1,4-pregnadiene-11β,17α,21-triol-3,20-dione |
| 7 | 16α-methyl-9α-fluoro-4-pregnene-11β,17α,21-triol-3,20-dione 21-acetate | ATCC-7063 | Do. |
|  |  | Nocardia microorganisms |  |
| 8 | 16α-methyl-4-pregnene-11β,17α21-triol-3,20-dione | *N. blackwellii* ATCC-6846 | 16α-methyl-1,4-pregnadiene-11β,17α,21-triol-3,20-dione |
| 9 | 16α-methyl-4-pregnene-17α,21-diol-3,11,20-trione | *N. globerula* ATCC-9356 | 16α-methyl-1,4-pregnadiene-17α,21-diol-3,11,20-trione |
| 10 | 16α-methyl-9α-fluoro-4-pregnene-17α,21-diol-3,11,20-trione | *N. leishmannii* ATCC-6855 | 16α-methyl-9α-fluoro-1,4-pregnadiene-17α,21-diol-3,11,20-trione |
| 11 | 16α-methyl-9α-fluoro-4-pregnene-11β,17α,21-triol-3,20-dione | *N. formica* NRRL-2470 | 16α-methyl-9α-fluoro-1,4-pregnadiene-11β,17α,21-triol-3,20-dione |
|  |  | Mycobacterium microorganisms |  |
| 12 | 16α-methyl-4-pregnene-11β,17α,21-triol-3,20-dione | *M. phlei* ATCC-12,298 | 16α-methyl-1,4-pregnadiene-11β,17α,21-triol-3,20-dione |
| 13 | 16α-methyl-4-pregnene-17α,21-diol-3,11,20-trione | *M. lacticola* ATCC-12,297 | 16α-methyl-1,4-pregnadiene-17α,21-diol-3,11,20-trione |
| 14 | 16α-methyl-9α-fluoro-4-pregnene-17α,21-diol-3,11,20-trione | *M. tuberculosis* ATCC-12,296 | 16α-methyl-9α-fluoro-1,4-pregnadiene-17α,21-diol-3,11,20-trione |

EXAMPLE 42

Twenty liters of a nutrient medium are prepared having the following composition:

Cerelose—400 g.
Edamin—400 g.
Cornsteep liquor—100 g.
Yeast extract—20 g.
Distilled water to make 20 l.

This medium is adjusted to pH 6.5 with KOH, sterilized and inoculated with about one liter of a 24-hour growth of the microorganism *Bacillus sphaericus* (MB 431; ATCC 12488). The inoculated culture is incubated at a temperature of 28° C., with agitation, for a period of about 24 hours, and to the resulting culture is added a solution of four grams of 11β,17α,21-trihydroxy-16β-methyl-4-pregnene-3,20-dione 21-acetate in 40 ml. of dimethylformamide. The culture containing the steroid compound is incubated, with agitation, for about 10 hours at a temperature of 28° C.

The fermentation broth is repeatedly extracted with ethyl acetate, and the ethyl acetate extracts are combined and evaporated to dryness in vacuo. The residual material is subjected to partition between 70% aqueous methanol and petroleum ether, thereby removing oily impurities soluble in the petroleum ether phase. The methanol is evaporated from the aqueous methanol phase in vacuo, and the residual aqueous slurry is extracted with ethyl acetate. The ethyl acetate extract is evaporated to dryness in vacuo, and the residual material is dissolved in acetone and streaked on paper chromatograms which are developed using formamide as the stationary phase and benzene as the mobile phase. The upper bands for each chromatogram, corresponding to the Δ¹-dehydro derivative, are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized from ethyl acetate-petroleum ether to give substantially pure 11β,17α,21-trihydroxy-16β-methyl-1,4-pregnadiene-3,20-dione.

In accordance with the above procedure, but substituting *Nocardia asteroides* (ATCC 10904) as the Δ¹-dehydrogenating microorganism, there is likewise obtained

EXAMPLE 43

Twenty liters of a nutrient medium are prepared having the following composition:

Cerelose—400 g.
Edamin—400 g.
Cornsteep liquor—100 ml.
Yeast extract—20 g.
Distilled water to make 20 l.

This medium is adjusted to pH 6.5 with KOH, sterilized and inoculated with about one liter of a 24-hour growth of the microorganism *Bacillus sphaericus* (MB 431; ATCC 12488). The inoculated culture is incubated at a temperature of 28° C., with agitation, for a period of about 24 hours, and to the resulting culture is added a solution of four grams of 9α-fluoro-11β,17α,21-trihydroxy-16β-methyl-4-pregnene-3,20-dione 21-acetate in 40 ml. of dimethylformamide. The culture containing the steroid compound is incubated, with agitation, for about 10 hours at a temperature of 28° C.

The fermentation broth is repeatedly extracted with ethyl acetate, and the ethyl acetate extracts are combined and evaporated to dryness in vacuo. The residual material is subjected to partition between 70% aqueous methanol and petroleum ether, thereby removing oily impurities soluble in the petroleum ether phase. The methanol is evaporated from the aqueous methanol phase in vacuo, and the residual aqueous slurry is extracted with ethyl acetate. The ethyl acetate extract is evaporated to dryness in vacuo, and the residual material is dissolved in acetone and streaked on paper chromatograms which are developed using formamide as the stationary phase and benzene as the mobile phase. The upper bands for each chromatogram, corresponding to the Δ¹-dehydro derivative, are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized from ethyl acetate-petroleum ether to give substantially pure 9α-fluoro-11β,17α,21-trihydroxy - 16β-methyl-1,4-pregnadiene-3,20-dione.

In accordance with the above procedure, but substituting *Nocardia globerula* (ATCC 9356) as the Δ¹-dehydrogenating microorganism, there is likewise obtained 9α-fluoro-11β,17α,21-trihydroxy - 16β - methyl-1,4-pregnadiene-3,20-dione.

EXAMPLE 44

Fifty milliliters of a nutrient medium are prepared having the following composition:

Cerelose—1 g.
Edamin—1 g.
Cornsteep liquor—0.25 ml.
Distilled water to make 50 ml.

This medium is adjusted to pH 6.5 with KOH, sterilized and inoculated with about 2.5 to 5 ml. of a culture of *Bacillus sphaericus* (ATCC 12488) microorganisms, and the inoculated culture is then incubated at a temperature of 28° C., with agitation, for a 24-hour period. To the resulting culture is added a solution containing 10 mg. of 6α-methyl-4-pregnene-17α,21-diol-3,11,20-trione dissolved in 0.2 ml. of dimethylformamide. The culture containing the steroid compound is incubated, with agitation, for an additional period of about 24 hours at 28° C.

The fermentation broth is extracted with four 50 ml.-portions of ethyl acetate, and the ethyl acetate extracts are combined and evaporated in vacuo to a volume of about 5 ml. The concentrated solution is then streaked on paper chromatograms which are developed using dimethylformamide as the stationary phase and 50% benzene–50% chloroform as the mobile phase. After 8 hours development in a descending system, the upper bands for each chromatogram, corresponding to the Δ$^1$-dehydro derivative, are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized from ethyl acetate-petroleum ether to give 6α-methyl-1,4-pregnadiene-17α, 21-diol-3,11,20-trione.

In accordance with the above procedure, but substituting *Nocardia leishmanii* (ATCC 6855) as the Δ$^1$-dehydrogenating microorganism, there is likewise obtained 6α-methyl-1,4-pregnadiene-17α,21-diol-3,11,20-trione.

EXAMPLE 45

Fifty milliliters of a nutrient medium are prepared having the following composition:

Cerelose—1 g.
Edamin—1 g.
Cornsteep liquor—0.25 ml.
Distilled water to make 50 ml.

This medium is adjusted to pH 6.5 with KOH, sterilized and inoculated with about 2.5 to 5 ml. of a culture of *Bacillus sphaericus* (ATCC 12488) microorganisms, and the inoculated culture is then incubated at a temperature of 28° C., with agitation, for a 24-hour period. To the resulting culture is added a solution containing 10 mg. of 6α-methyl-4-pregnene-11β,17α,21-triol-3,20-dione dissolved in 0.2 ml. of dimethylformamide. The culture containing the steroid compound is incubated, with agitation, for an additional period of about 24 hours at 28° C.

The fermentation broth is extracted with four 50 ml.-portions of ethyl acetate, and the ethyl acetate extracts are combined and evaporated in vacuo to a volume of about 5 ml. The concentrated solution is then streaked on paper chromatograms which are developed using dimethylformamide as the stationary phase and 50% benzene-50% chloroform as the mobile phase. The upper bands for each chromatogram corresponding to the Δ$^1$-dehydro derivative are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized from ethyl acetate-petroleum ether to give 6α-methyl-1,4-pregnadiene-11β, 17α,21-triol-3,20-dione.

In accordance with the above procedure, but substituting *Nocardia formica* (NRRL 2470) as the Δ$^1$-dehydrogenating microorganism, there is likewise obtained 6α-methyl-1,4-pregnadiene-11β,17α,21-triol-3,20-dione.

EXAMPLE 46

Fifty milliliters of a nutrient medium are prepared having the following composition:

Dextrose—1 g.
Edamin—1 g.
Cornsteep liquor—0.25 ml.
Distilled water to make 50 ml.

This medium is adjusted to pH 6.5 with KOH, sterilized and inoculated with about 2.5 to 5 ml. of a culture of the microorganism *Bacillus sphaericus* (ATCC 12488); and the inoculated culture is then incubated at a temperature of 28° C., with agitation, for a 24-hour period. To the resulting culture is added a solution containing 10 mg. of 2α,16α - dimethyl - 17α,21 - dihydroxy-4-pregnene-3,11,20-trione dissolved in 0.2 ml. of dimethylformamide. The culture containing the steroid compound is incubated, with agitation, for an additional period of about 24 hours at 28° C.

The fermentation broth is extracted with four 50 ml.-portions of ethyl acetate, and the ethyl acetate extracts are combined and evaporated in vacuo to a volume of about 5 ml. The concentrated solution is then streaked on paper chromatograms which are developed using dimethylformamide as the stationary phase. After eight hours development in a descending system, the upper bands for each chromatogram, corresponding to the Δ$^1$-dehydro derivative, are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized from ethyl acetate-petroleum ether to give 2,16-α-dimethyl-17α,21-dihydroxy-1,4,-pregnadiene-3,11,20-dione.

In accordance with the above procedure, the compound 2α,16α - dimethyl - 11β,17α,21 - trihydroxy - 4 - pregnene-3,20-dione is converted to 2,16α - dimethyl - 11β, 17α,21 - trihydroxy - 1,4 - pregnadiene - 3,20-dione. Other 2α,16α-dimethyl substituted 4-pregnenes which are converted to the corresponding 2,16α-dimethyl substituted 1,4-pregnadienes in accordance with the above procedure are 2α,16α - dimethyl - 9α - fluoro - 17α,21 - dihydroxy - 4 - pregnene - 3,11,20 - trione and 2α,16α - dimethyl - 9α - fluoro - 11β,17α,21 - trihydroxy - 4 - pregnene-3,20-dione, which converted to 2,16α - dimethyl-9α - fluoro - 17α,21 - dihydroxy - 1,4 - pregnadiene-3,11,20 - trione and 2,16α - dimethyl - 9α - fluoro - 11β, 17α,21 - trihydroxy - 1,4 - pregnadiene - 3,20 - dione, respectively.

EXAMPLE 47

Twenty liters of a nutrient medium are prepared having the following composition:

Cerelose—400 g.
Edamin—400 g.
Cornsteep liquor—100 ml.
Yeast extract—20 g.
Distilled water to make 20 l.

This medium is adjusted to pH 6.5 with KOH, sterilized and inoculated with about one liter of a 24-hour growth of the microorganism *Bacillus sphaericus* (MB 431;

ATCC 12488). The inoculated culture is incubated at a temperature of 28° C., with agitation, for a period of about 24 hours, and to the resulting culture is added a solution of four grams of 17α,21 - dihydroxy - 6,16α-dimethyl - 4,6 - pregnadiene - 3,11,20 - trione 21-acetate in 40 ml. of dimethylformamide. The culture containing the steroid compound is incubated, with agitation, for about 10 hours at a temperature of 28° C.

The fermentation broth is repeatedly extracted with ethyl acetate, and the ethyl acetate extracts are combined and evaporated to dryness in vacuo. The residual material is subjected to partition between 70% aqueous methanol and petroleum ether, thereby removing oily impurities soluble in the petroleum ether phase. The methanol is evaporated from the aqueous methanol phase in vacuo, and the residual aqueous slurry is extracted with ethyl acetate. The ethyl acetate extract is evaporated to dryness in vacuo, and the residual material is dissolved in acetone and streaked on paper chromatograms which are developed using formamide as the stationary phase and benzene as the mobile phase. The upper bands for each chromatogram, corresponding to the $\Delta^1$-dehydro derivative, are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized from ethyl acetate-petroleum ether to give substantially pure 17α,21-dihydroxy-6,16α-dimethyl-1,4,6-pregnadiene-3,11,20-trione.

In accordance with the above procedure, but substituting *Mycobacterium smegmatis* (NRRL B–1667) as the $\Delta^1$-dehydrogenating microorganism, there is likewise obtained 17α,21 - dihydroxy - 6,16α - dimethyl - 1,4,6-pregnadiene-3,11,20-trione.

EXAMPLE 48

Twenty liters of a nutrient medium are prepared having the following composition:

Cerelose—400 g.
Edamin—400 g.
Cornsteep liquor—100 ml.
Yeast extract—20 g.
Distilled water to make 20 l.

This medium is adjusted to pH 6.5 with KOH, sterilized and inoculated with about one liter of a 24-hour growth of the microorganism *Bacillus sphaericus* (MB 431; ATCC 12488). The inoculated culture is incubated at a temperature of 28° C., with agitation, for a period of about 24 hours, and to the resulting culture is added a solution of four grams of 11β,17α,21 - trihydroxy - 6,16α-dimethyl - 4,6 - pregnadiene - 3,20-dione 21-acetate in 40 ml. of dimethylformamide. The culture containing the steroid compound is incubated, with agitation, for about 10 hours at a temperature of 28° C.

The fermentation broth is repeatedly extracted with ethyl acetate, and the ethyl acetate extracts are combined and evaporated to dryness in vacuo. The residual material is subjected to partition between 70% aqueous methanol and petroleum ether, thereby removing oily impurities soluble in the petroleum ether phase. The methanol is evaporated from the aqueous methanol phase in vacuo, and the residual aqueous slurry is extracted with ethyl acetate. The ethyl acetate extract is evaporated to dryness in vacuo, and the residual material is dissolved in acetone and streaked on paper chromatograms which are developed using formamide as the stationary phase and benzene as the mobile phase. The upper bands for each chromatogram, corresponding to the $\Delta^1$-dehydro derivative, are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized from ethyl acetate petroleum ether to give substantially pure 11β,17α,21 - trihydroxy - 6,16α-dimethyl-1,4,6-pregnatriene-3,20-dione.

In accordance with the above procedure, but substituting *Mycobacterium phlei* (ATCC 12,298) as the $\Delta^1$-dehydrogenating microorganism, there is likewise obtained 11β,17α,21-trihydroxy-6,16α-dimethyl - 1,4,6 - pregnatriene-3,20-dione.

EXAMPLE 49

Twenty liters of a nutrient medium are prepared having the following composition:

Cerelose—400 g.
Edamin—400 g.
Cornsteep liquor—100 ml.
Yeast extract—20 g.
Distilled water to make 20 l.

This medium is adjusted to pH 6.5 with KOH, sterilized and inoculated with about one liter of a 24-hour growth of the microorganism *Bacillus sphaericus* (MB 431; ATCC 12488). The inoculated culture is incubated at a temperature of 28° C., with agitation, for a period of about 24 hours, and to the resulting culture is added a solution of four grams of 9α-fluoro-11β,17α,21-trihydroxy-6,16α-dimethyl-4,6-pregnadiene-3,20-dione 21-acetate in 40 ml. of dimethyl-formamide. The culture containing the steroid compound is incubated, with agitation, for about 10 hours at a temperature of 28° C.

The fermenation broth is repeatedly extracted with ethyl acetate, and the ethyl acetate extracts are combined and evaporated to dryness in vacuo. The residual material is subjected to partition between 70% aqueous methanol and petroleum ether, thereby removing oily impurities soluble in the petroleum ether phase. The methanol is evaporated from the aqueous methanol phase in vacuo, and the residual aqueous slurry is extracted with ethyl acetate. The ethyl acetate extract is evaporated to dryness in vacuo, and the residual material is dissolved in acetone and streaked on paper chromatograms which are developed using formamide as the stationary phase and benzene as the mobile phase. The upper bands for each chromatogram, corresponding to the $\Delta^1$-dehydro derivative, are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized from ethyl acetate-petroleum ether to give substantially pure 9α-fluoro-11β,17α,21-trihydroxy-6,16α-dimethyl-1,4,6-pregnatriene-3,20-dione.

In accordance with the above procedure, but substituting *Mycobacterium lacticola* (ATCI 12,297) as the $\Delta^1$-dehydrogenating microorganism, there is likewise obtained 9α-fluoro-11β,17α,21-trihydroxy-6,16α-dimethyl-1,4,6 - pregnatriene-3,20-dione.

EXAMPLE 50

Twenty liters of a nutrient medium are prepared having the following composition:

Cerelose—400 g.
Edamin—400 g.
Cornsteep liquor—100 ml.
Yeast extract—20 g.
Distilled water to make 20 l.

This medium is adjusted to pH 6.5 with KOH, sterilized and inoculated with about one liter of a 24-hour growth of the microorganism *Bacillus sphaericus* (MB 431; ATCC 12488). The inoculated culture is incubated at a temperature of 28° C., with agitation, for a period of about 24 hours, and to the resulting culture is added a solution of four grams of 17-ethinyl-4-androstene-17β-ol-3,11-dione in 40 ml. of dimethylformamide. The culture containing the steroid compound is incubated, with agitation, for about 10 hours at a temperature of 28° C.

The fermentation broth is repeatedly extracted with ethyl acetate, and the ethyl acetate extracts are combined and evaporated to dryness in vacuo. The residual material is subjected to partition between 70% aqueous methanol and petroleum ether, thereby removing oily impurities soluble in the petroleum ether phase. The methanol is evaporated from the aqueous methanol phase in vacuo, and the residual aqueous slurry is extracted with ethyl acetate. The ethyl acetate extract is evaporated to dryness in vacuo, and the residual material is dissolved in acetone and streaked on paper chromatograms which are developed using formamide as the stationary phase and benzene as the mobile phase. The upper bands for each chromatogram, corresponding to the $\Delta^1$-dehydro derivative, are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized from ethyl acetate-petroleum ether to give substantially pure 17-ethinyl-1,4-androstadiene-17$\beta$-ol-3,11-dione.

In accordance with the above procedure, but substituting *Mycobacterium tuberculosis* (ATCC 12,296) as the $\Delta^1$-dehydrogenating microorganism, there is likewise obtained 17-ethinyl-1,4-androstadiene-17$\beta$-ol-3,11-dione.

EXAMPLE 51

Fifty milliliters of a nutrient medium are prepared having the following composition:

Cerelose—1 g.
Edamin—1 g.
Cornsteep liquor—0.25 ml.
Distilled water to make 50 ml.

This medium is adjusted to pH 6.5 with KOH, sterilized and inoculated with about 2.5 to 5 ml. of a culture of *Bacillus sphaericus* (ATCC 245) microorganisms, and the inoculated culture is then incubated at a temperature of 28° C., with agitation, for a 24-hour period. To the resulting culture is added a solution containing 10 mg. of 2 - methyl-4-pregnene-17$\alpha$,21-diol-3,11,20-trione dissolved in 0.2 ml. of dimethylformamide. The culture containing the steroid compound is incubated, with agitation, for an additional period of about 24 hours at 28° C.

The fermentation broth is extracted with four 50 ml. portions of ethyl acetate, and the ethyl acetate extracts are combined and evaporated in vacuo to a volume of about 5 ml. The concentrated solution is then streaked on paper chromatograms which are developed using dimethylformamide as the stationary phase and 50% benzene–50% chloroform as the mobile phase. After 8 hours development in a descending system, the upper bands for each chromatogram, corresponding to the $\Delta^1$-dehydro derivative, are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized from ethyl acetate-petroleum ether to give 2-methyl-1,4-pregnadiene-17$\alpha$,21-diol-3,11,20-trione.

In accordance with the above procedure, but substituting *Protaminobacter rubrum* as the $\Delta^1$-dehydrogenating microorganism, there is likewise obtained 2-methyl-1,4-pregnadiene-17$\alpha$,21-diol-3,11,20-trione.

EXAMPLE 52

Fifty milliliters of a nutrient medium are prepared having the following composition:

Cerelose—1 g.
Edamin—1 g.
Cornsteep liquor—0.25 ml.
Distilled water to make 50 ml.

This medium is adjusted to pH 6.5 with KOH, sterilized and inoculated with about 2.5 to 5 ml. of a culture of *Norcardia asteroides* (ATCC 9970) microorganisms, and the inoculated culture is then incubated at a temperature of 28° C., with agitation, for a 24-hour period. To the resulting culture is added a solution containing 10 mg. of 2 - methyl-4-pregnene-11$\beta$,17$\alpha$,21-triol-3,20-dione dissolved in 0.2 ml. of dimethylformamide. The culture containing the steroid compound is incubated, with agitation, for an additional period of about 24 hours at 28° C.

The fermentation broth is extracted with four 50 ml. portions of ethyl acetate, and the ethyl acetate extracts are combined and evaporated in vacuo to a volume of about 5 ml. The concentrated solution is then streaked on paper chromatograms which are developed using dimethylformamide as the stationary phase and 50% benzene–50% chloroform as the mobile phase. The upper bands for each chromatogram corresponding to the $\Delta^1$-dehydro derivative are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized from ethyl acetate-petroleum ether to give 2-methyl-1,4-pregnadiene-11$\beta$,17$\alpha$,21-triol-3,20-dione.

In accordance with the above procedure, but substituting *Protaminobacter alboflavum* as the $\Delta^1$-dehydrogenating microorganism, there is likewise obtained 2-methyl-1,4-pregnadiene-11$\beta$,17$\alpha$,21-triol-3,20-dione.

EXAMPLE 53

Fifty milliliters of a nutrient medium are prepared having the following composition:

Cerelose—1 g.
Edamin—1 g.
Cornsteep liquor—0.25 ml.
Distilled water to make 50 ml.

This medium is adjusted to pH 6.5 with KOH, sterilized and inoculated with about 2.5 to 5 ml. of a culture of *Mycobacterium smegmatis* (NRRL B–1667) microorganisms, and the inoculated culture is then incubated at a temperature of 28° C., with agitation, for a 24-hour period. To the resulting culture is added a solution containing 10 mg. of 2 - methyl-9$\alpha$-fluoro-4-pregnene-11$\beta$,17$\alpha$,21-triol-3,20-dione dissolved in 0.2 ml. of dimethylformamide. The culture containing the steroid compound is incubated, with agitation, for an additional period of about 24 hours at 28° C.

The fermentation broth is extracted with three 50 ml. portions of ethyl acetate, and the ethyl acetate extracts are combined and evaporated in vacuo to a volume of about 5 ml. The concentrated solution is then used to prepare streak-paper chromatograms which are developed utilizing dimethylformamide as the stationary liquid phase and 50% benzene–50% chloroform as the mobile liquid phase. Two bands are secured, one of which (corresponding to the more mobile component) shows the ultra-violet absorption maximum characteristic of 2-methyl-9$\alpha$-fluoro-hydrocortisone, and the other (the less mobile component) shows an ultra-violet absorption maximum at about 245 m$\mu$. The paper chromatogram is dried, and the band corresponding to the 245 m$\mu$ absorption is cut off and extracted with methanol. The material extracted with methanol is again subjected to streak-paper chromatography, using paper which has been extracted for 48 hours with methanol, and employing the chloroform-formamide system previously employed. The resulting chromatogram shows only a trace band corresponding to the starting material with the major band having an ultra-violet absorption maximum of 245 mμ. The paper chromatogram is thoroughly dried, and the band corresponding to the 245 mμ absorption maximum is cut off and extracted with methanol. The methanol extract is evaporated to dryness in vacuo to give 2-methyl-9α-fluoro-1,4-pregnadiene-11β,17α,21-triol-3,20-dione.

EXAMPLE 54

The fermentation procedures of Examples 51, 52 and 53 are repeated but using, in place of the microorganisms and the 2-methyl-11-oxygenated-4-pregnene-17α,21-diol-3,20-dione starting materials employed in those examples, the microorganism strains and steroid starting compounds indicated in the table hereinbelow. The resulting fermentation broths are treated in accordance with the isolation methods described in Examples 51, 52 and 53 to give, for the particular microorganism strain and steroid substrate used, the 2-alkyl-11-oxygenated-1,4-pregnadiene-17α,21-diol-3,20-dione product indicated in the following table:

chromatogram, corresponding to the Δ¹-dehydro derivative, are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized to give 6α,16α-dimethyl-1,4-pregnadiene-17α,21-diol-3,11,20-trione.

In accordance with the above procedure, but substituting *Protaminobacter rubrum* as the Δ¹-dehydrogenating microorganism, there is likewise obtained 6α,16α-dimethyl-1,4-pregnadiene-17α,21-diol-3,11,20-trione.

EXAMPLE 56

Fifty milliliters of a nutrient medium are prepared having the following composition:

Cerelose—1 g.
Edamin—1 g.
Cornsteep liquor—0.25 ml.
Distilled water to make 50 ml.

| Experiment Number | Substrate | *Bacillus sphaericus* microorganisms | 2-alkyl-11-oxygenated-1,4-pregnadiene-17α,21-diol-3,20-dione product |
|---|---|---|---|
| 1 | 2-propyl-4-pregnene-17α,21-diol-3,11,20-trione | ATCC-7054 | 2-propyl-1,4-pregnadiene-17α,21-diol-3,11,20-trione. |
| 2 | 2-methyl-4-pregnene-11β,17α,21-triol-3,20-dione | ATCC-245 | 2-methyl-1,4-pregnadiene-11β,17α,21-triol-3,20-dione. |
| 3 | 2-ethyl-4-pregnene-11β,17α,21-triol-3,20-dione 21-acetate | ATCC-4525 | 2-ethyl-1,4-pregnadiene-11β,17α,21-triol-3,20-dione. |
| 4 | 2-methyl-4-pregnene-17α,21-diol-3,11,20-trione | ATCC-7055 | 2-methyl-1,4-pregnadiene-17α,21-diol-3,11,20-trione. |
| 5 | 2-methyl-9α-fluoro-4-pregnene-17α,21-diol-3,11,20-trione-21-acetate | ATCC-7055 | 2-methyl-9α-fluoro-1,4-pregnadiene-17α,21-diol-3,11,20-trione. |
| 6 | 2-methyl-9α-fluoro-4-pregnene-11β,17α,21-triol-3,20-dione | ATCC-245 | 2-methyl-9α-fluoro-1,4-pregnadiene-11β,17α,21-triol-3,20-dione. |
| 7 | 2-hexyl-9α-fluoro-4-pregnene-11β,17α,21-triol-3,20-dione-21-acetate | ATCC-7063 | 2-hexyl-9α-fluoro-1,4-pregnadiene-11β,17α,21-triol-3,20-dione. |
| | | *Nocardia* microorganisms | |
| 8 | 2-methyl-4-pregnene-11β,17α,21-triol-3,20-dione | *N. blackwellii* ATCC-6846 | 2-methyl-1,4-pregnadiene-11β,17α,21-triol-3,20-dione. |
| 9 | 2-methyl-4-pregnene-17α,21-diol-3,11,20-trione | *N. globerula* ATCC-9356 | 2-methyl-1,4-pregnadiene-17α,21-diol-3,11,20-trione. |
| 10 | 2-methyl-9α-fluoro-4-pregnene-17α,21-diol-3,11,20-trione | *N. leishmanii* ATCC-6855 | 2-methyl-9α-fluoro-1,4-pregnadiene-17α,21-diol-3,11,20-trione. |
| 11 | 2-methyl-9α-fluoro-4-pregnene-11β,17α,21-triol-3,20-dione | *N. formica* NRRL-2470 | 2-methyl-9α-fluoro-1,4-pregnadiene-11β,17α,21-triol-3,20-dione. |
| | | *Mycobacterium* microorganisms | |
| 12 | 2-methyl-4-pregnene-11β,17α,21-triol-3,20-dione | *M. phlei* ATCC-12,298 | 2-methyl-1,4-pregnadiene-11β,17α,21-triol-3,20-dione. |
| 13 | 2-methyl-4-pregnene-17α,21-diol-3,11,20-trione | *M. lacticola* ATCC-12,297 | 2-methyl-1,4-pregnadiene-17α,21-diol-3,11,20-trione. |
| 14 | 2-methyl-9α-fluoro-4-pregnene-17α,21-diol-3,11,20-trione | *M. tuberculosis* ATCC-12,296 | 2-methyl-9α-fluoro-1,4-pregnadiene-17α,21-diol-3,11,20-trione. |

EXAMPLE 55

Fifty milliliters of a nutrient medium are prepared having the following composition:

Cerelose—1 g.
Edamin—1 g.
Cornsteep liquor—0.25 ml.
Distilled water to make 50 ml.

This medium is adjusted to pH 6.5 with KOH, sterilized and inoculated with about 2.5 to 5 ml. of a culture of *Bacillus sphaericus* (ATCC 245) microorganisms, and the inoculated culture is then incubated at a temperature of 28° C., with agitation, for a 24-hour period. To the resulting culture is added a solution containing 10 mg. of 6α,16α-dimethyl - 4 - pregnene-17α,21-diol - 3,11,20 - trione dissolved in 0.2 ml. of dimethylformamide. The culture containing the steroid compound is incubated, with agitation, for an additional period of about 24 hours at 28° C.

The fermentation broth is extracted with four 50 ml.-portions of ethylacetate, and the ethyl acetate extracts are combined and evaporated in vacuo to a volume of about 5 ml. The concentrated solution is then streaked on paper chromatograms which are developed using formamide as the stationary phase and 50% benzene–50% chloroform as the mobile phase. After 8 hours development in a descending system, the upper bands for each This medium is adjusted to pH 6.5 with KOH, sterilized and inoculated with about 2.5 to 5 ml. of a culture of *Nocardia asteroides* (ATCC 9970) microorganisms, and the inoculated culture is then incubated at a temperature of 28° C., with agitation, for a 24-hour period. To the resulting culture is added a solution containing 10 mg. of 6α,16α-dimethyl - 4 - pregnene - 11β,17α,21-triol-3,20-dione dissolved in 0.2 ml. of dimethylformamide. The culture containing the steroid compound is incubated, with agitation, for an additional period of about 24 hours at 28° C.

The fermentation broth is extracted with four 50 ml.-portions of ethyl acetate, and the ethyl acetate extracts are combined and evaporated in vacuo to a volume of about 5 ml. The concentrated solution is then streaked on paper chromatograms which are developed using formamide as the stationary phase and 50% benzene–50% chloroform as the mobile phase. The upper bands for each chromatogram corresponding to the Δ¹-dehydro derivative are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized to give 6α,16α-dimethyl-1,4-pregnadiene-11β,17α,21-triol-3,20-dione.

EXAMPLE 57

Fifty milliliters of a nutrient medium are prepared having the following composition:

Cerelose—1 g.
Edamin—1 g.
Cornsteep liquor—0.25 ml.
Distilled water to make 50 ml.

This medium is adjusted to pH 6.5 with KOH, sterilized and inoculated with about 2.5 to 5 ml. of a culture of *Mycobacterium smegmatis* (NRRL B–1667) microorganisms, and the inoculated culture is then incubated at a temperature of 28° C., with agitation, for a 24-hour period. To the resulting culture is added a solution containing 10 mg. of 6α,16α-dimethyl-9α-fluoro-4-pregnene-11β,17α,21-triol-3,20-dione dissolved in 0.2 ml. of dimethylformamide. The culture containing the steroid compound is incubated, with agitation, for an additional period of about 24 hours at 28° C.

The fermentation broth is extracted with three 50 ml. portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and 50% benzene–50% chloroform as the mobile liquid phase. Two bands are secured, one of which corresponds to the more mobile component, the 6α,16α - dimethyl-9α - fluoro - 4 - pregnene - 11β,17α,21 - triol - 3,20 - dione starting material, and the other corresponds to the less mobile component, the Δ¹-dehydro derivative. The paper chromatogram is dried, and the latter band is cut off and extracted with methanol. The material extracted with methanol is again subjected to streak-paper chromatography, using paper which has been extracted for 48 hours with methanol, and employing the chloroform-formamide system previously employed. The resulting chromatogram shows only a trace band corresponding to the starting material with the major band that corresponds to the less mobile component, the Δ¹-dehydro derivative. The paper chromatogram is thoroughly dried, and the band corresponding to the less mobile component is cut off and extracted with methanol. The methanol extract is evaporated to dryness in vacuo to give 6α,16α-dimethyl-9α-fluoro-1,4-pregnadiene-11β,17α,21-triol-3,20-dione.

EXAMPLE 58

The fermentation procedures of Examples 55, 56 and 57 are repeated but using, in place of the microorganisms and the 6α,16α-dimethyl - 11 - oxygenated - 4 - pregnene-17α,21-diol-3,20-dione starting material employed in those examples, the microorganism strains and steroid starting compounds indicated in the table hereinbelow. The resulting fermentation broths are treated in accordance with the isolation methods described in Examples 55, 56 and 57 to give, for the particular microorganism strain and steroid substrate used, the 6α,16α - dimethyl - 11-oxygenated - 1,4 - pregnadiene - 17α,21 - diol - 3,20-dione indicated in the following table:

EXAMPLE 59

Six liters of a nutrient medium are prepared having the following composition:

Yeast extract (Difco)—60 g.
Potassium dehydrogen phosphate—26.5 g.
Disodium hydrogen phosphate—53 g.
Tap water to make 6 l.

Several 100 ml.-portions of this medium, adjusted to a pH of about 7.0, are sterilized by heating for 15 minutes in an autoclave at about 120° C., and each of the sterilized mediums is inoculated with a culture of *Corynebacterium simplex* (ATCC 6946). The inoculated cultures are incubated at a temperature of 28° C. with agitation, for about 24 hours, and to each of these resulting cultures is added a solution of 150 mg. of a different 3-keto steroid compound. The flasks and contents are then sterilized for 15 minutes at a temperature of about 120° C. To each flask is then added 5.0 ml. of ethanol. The 24-hour bacterial cultures containing the 3-keto steroid are then incubated, with agitation, for a period of about 48 hours.

When the starting material contains a 21-ester group, hydrolysis of this ester grouping may be controlled in whatever manner desired in order either to accelerate or to suppress deacylation, depending upon the incubation temperature selected for the incubation of the combined starting material and bacterial culture. Thus, as indicated in the table below, when the incubation is carried out at about 28° C., the 21-ester group is removed thus forming the corresponding 21-free alcohol; while at a higher temperature range of from about 32–40° C., and preferably at about 36–38° C., the aforesaid hydrolysis is suppressed and the 21-ester grouping is retained.

Each of the fermentation broths thus obtained is then individually extracted with three 100 ml.-portions of chloroform and the chloroform extracts corresponding to each broth and derived from a particular 3-keto steroid substrate are combined and evaporated to dryness in vacuo. Each of the residual products thus obtained is dissolved in acetone and streaked on paper chromatograms, each of which is developed using a selected solvent system for the particular substrate starting material. Formamide or 1:1 mixtures of formamide and methanol may be employed for the stationary phase of the solvent system while such solvents as chloroform. benzene or 1:1 mixtures of benzene and cyclohexane are conveniently employed for the mobile phase solvent system.

The upper bands for each chromatogram, corresponding to the Δ¹-dehydro derivative, are cut off, individually extracted with methanol and the methanol-extracted material is again subjected to streak-paper chromatography. The upper band is again cut off, then dried, extracted with methanol, and the methanol extract is evaporated to dryness in vacuo to give, for each substrate used as

| Experiment Number | Substrate | Microorganism | 6α, 16α-dimethyl-11-oxygenated-1,4-pregnadiene-17α, 21-diol-3,20-dione product |
|---|---|---|---|
| 1 | 6α, 16α-dimethyl-9α-fluoro-4-pregnene-17α, 21-diol-3, 11, 20-trione 21-acetate. | *Bacillus sphaericus* ATCC–7055. | 6α, 16α-dimethyl-9α-fluror-1,4-pregnadiene-17α, 21-diol-3,11,20-trione. |
| 2 | 6α, 16α-dimethyl-9α-fluoro-4-pregnene-11β, 17α, 21-triol-3,20-dione 21-acetate. | *Bacillus sphaericus* ATCC–7063. | 6α, 16α-dimethyl-9α-fluoro-1,4-pregnadiene-11β, 17α,21-triol-3,20-dione. |
| 3 | 6α,16α-dimethyl-9α-fluoro-4-pregnene-17α,21-diol-3, 11,20-trione. | *Nocardia leishmanii* ATCC–6855. | 6α, 16α-dimethyl-9α-fluoro-1,4-pregnadiene-17α, 21-diol-3,11,20-trione. |
| 4 | 6α, 16α-dimethyl-9α-fluoro-4-pregnene-11β, 17α, 21-triol-3,20-dione. | *Nocardia formica* NRRL–2470. | 6α, 16α-dimethyl-9α-fluoro-1,4-pregnadiene-11β, 17α, 21-triol-3,20-dione. |
| 5 | 6α, 16α-dimethyl-4-pregnene-11β, 17α, 21-triol-3,20-dione. | *Mycobacterium phlei* ATCC–12,298. | 6α, 16α-dimethyl-1,4-pregnadiene-11β, 17α, 21-triol-3,20-dione. |
| 6 | 6α, 16α-dimethyl-4-pregene-17α, 21-diol-3,11,20-trione. | *Mycobacterium lacticola* ATCC–12,297. | 6α, 16α-dimethyl-1,4-pregnadiene-17α,21-diol-3, 11,20-trione. | starting material, the particular $\Delta^{1,4}$-3-keto steroid compound indicated in the following table:

| Experiment Number | Substrate | Incubation temperature, °C | 3-keto-$\Delta^{1,4}$-steroid obtained |
|---|---|---|---|
| 1 | $\Delta^4$-pregnene-3,11,20-trione-17$\alpha$,21-diol | 28 | $\Delta^{1,4}$-pregnadiene-3,11,20-trione-17$\alpha$,21-diol. |
| 2 | $\Delta^4$-pregnene-3,20-dione-11$\beta$,17$\alpha$,21-triol | 28 | $\Delta^{1,4}$-pregnadiene-3,20-dione-11$\beta$,17$\alpha$,21-triol. |
| 3 | $\Delta^4$-pregnene-3,20-dione-11$\beta$,17$\alpha$,21-triol 21-acetate | 28 | Do. |
| 4 | do | 36 | $\Delta^{1,4}$-pregnadiene-3,20-dione-11$\beta$,17$\alpha$,21-triol 21-acetate. |
| 5 | $\Delta^4$-pregnene-3,11,20-trione-17$\alpha$,21-diol 21-acetate | 28 | $\Delta^{1,4}$-pregnadiene-3,11,20-trione-17$\alpha$,21-diol. |
| 6 | do | 36 | $\Delta^{1,4}$-pregnadiene-3,11,20-trione-17$\alpha$,21-diol 21-acetate. |
| 7 | $\Delta^1$-pregnene-3,11,20-trione-17$\alpha$,21-diol 21-acetate | 28 | $\Delta^{1,4}$-pregnadiene-3,11,20-trione-17$\alpha$,21-diol. |
| 8 | do | 36-28 | $\Delta^{1,4}$-pregnadiene-3,11,20-trione-17$\alpha$,21-diol 21-acetate. |
| 9 | $\Delta^1$-allopregnene-3,11,20-trione-17$\alpha$,21-diol 21-acetate | 28 | $\Delta^{1,4}$-pregnadiene-3,11,20-trione-17$\alpha$,21-diol. |
| 10 | do | 36 | $\Delta^{1,4}$-pregnadiene-3,11,20-trione-17$\alpha$,21-diol 21-acetate. |
| 11 | $\Delta^{4,6}$-pregnadiene-3,11,20-trione-17$\alpha$,21-diol 21-acetate | 28 | $\Delta^{1,4,6}$-pregnatriene-3,11,20-trione-17$\alpha$,21-diol. |
| 12 | 9$\alpha$-fluoro-$\Delta^4$-pregnene-3,20-dione-11$\beta$,17$\alpha$,21-triol | 28-30 | 9$\alpha$-fluoro-$\Delta^{1,4}$-pregnadiene-3,20-dione-11$\beta$,17$\alpha$,21-triol. |

In accordance with the foregoing process, but substituting *Corynebacterium hoagii* for *Corynebacterium simplex* as the $\Delta^1$-dehydrogenating microorganism, there is likewise obtained the $\Delta^1$-dehydrogenated steroid compound corresponding to the 1:2 saturated starting material.

EXAMPLE 60

Fifty milliliters of a nutrient medium are prepared having the following composition:

Cerelose—1 g.
Edamin—1 g.
Cornsteep liquor—0.25 ml.
Distilled water to make—50 ml.

This medium is adjusted to pH 6.5 with KOH, sterilized and inoculated with about 2.5 to 5 ml. of a culture of *Mycobacterium lacticola* (MB 466; ATCC 12297) microorganisms, and the inoculated culture is then incubated at a temperature of 28° C., with agitation, for a 24-hour period. To the resulting culture is added a solution containing 10 mg. of pregnane-11$\beta$,17$\alpha$,21-triol-3,20-dione dissolved in 0.1 ml. of dimethylformamide. The culture containing the steriod compound is incubated, with agitation, for an additional period of baout 24 hours at 28° C.

The fermentation broth is extracted with three 50 ml.-portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and chloroform as the mobile liquid phase, and the paper chromatogram is dried. Two bands are secured, one of which (corresponding to the more mobile component) shows the ultra-violet absorption maximum characteristic of $\Delta^4$-pregnene-11$\beta$,17$\alpha$,21-triol-3,20-dione; this band is cut off, extracted with methanol, and the material extracted with methanol again subjected to streak-paper chromatography using the chloroform-formamide system; this paper chromatogram is dried, the band showing the absorption maximum characteristic of $\Delta^4$-pregnene-11$\beta$,17$\alpha$,21-triol-3,20-dione is cut off; extracted with methanol, and the methanol extract evaporated to give substantially pure $\Delta^4$-pregnene-11$\beta$,17$\alpha$,21-triol-3,20-dione. The band corresponding to the less mobile component in the initial chromatogram, which shows an ultra-violet absorption maximum at about 242 m$\mu$, is cut off and extracted methanol. The material extracted with methanol is again subjected to streak-paper chromatography, using paper which has been extracted for 48 hours with methanol, and employing the chloroform-formamide system previously employed. The paper chromatogram is thoroughly dried, and the band corresponding to the 242 m$\mu$ absorption maximum is cut off and extracted with methanol. The methanol extract is evaporated to dryness in vacuo to give $\Delta^{1,4}$-pregnadiene-11$\alpha$,17$\beta$,21-triol-3,20-dione.

EXAMPLE 61

Thirteen 50 ml.-portions of the edamin medium described in Example 8 hereinabove are adjusted to pH 7, sterilized by heating for 15 minutes in an autoclave at about 120° C., and each of the sterilized mediums is inoculated with a culture of *Bacillus subtilis* microorganisms. The inoculated cultures are incubated at a temperature of 28° C., with agitation, for a period of about 24 hours, and to each of the thirteen resulting cultures is added a solution of 10 mg. of a different 3-hydroxy- or 3-keto-steroid compound in 0.1 ml. of dimethylformamide. The cultures containing the 3-keto-steroid compounds are then incubated, with agitation, for an additional period of about 10 hours.

Each of the fermentation broths thus obtained is individually extracted with three 50 ml.-portions of ethyl acetate, and the ethyl acetate extracts corresponding to each broth and derived from a particular 3-keto-steriod substrate are combined and evaporated to dryness in vacuo. Each of the thirteen residual products thus obtained is dissolved in acetone and streaked on paper chromatograms each of which is developed using the solvent system indicated for the particular substrate starting material in the table hereinbelow. The upper bands for each chromatogram, corresponding to the $\Delta^1$-dehydro derivatives, are cut off, individually extracted with methanol and the methanol-extracted material is again subjected to streak-paper chromatography. The upper band is again cut off then dried, extracted with methanol, and the methanol extract is evaporated to dryness in vacuo to give, for each substrate used as starting material, the particular $\Delta^{1,4}$-3-keto-steroid compound indicated in the following table:

SOLVENT SYSTEM USED FOR STREAK PAPER CHROMATOGRAPHY

| Experiment Number | Substrate | Stationary phase | Mobile phase | $\Delta^{1,4}$-3-keto-steroid obtained |
|---|---|---|---|---|
| 1 | $\Delta^4$-pregnene-21-ol-3,20-dione | 1:1 methanol-formamide | 1:1 benzene-cyclohexane | $\Delta^{1,4}$-pregnadiene-21-ol-3,20-dione. |
| 2 | $\Delta^4$-pregnene-3,20-dione | do | do | $\Delta^{1,4}$-pregnadiene-3,20-dione. |
| 3 | $\Delta^5$-pregnene-3-ol-20-one | do | do | Do. |
| 4 | $\Delta^4$-pregnene-17$\alpha$,21-diol-3,20-dione | Formamide | Benzene | $\Delta^{1,4}$-pregnadiene-17$\alpha$,21-diol-3,20-dione. |
| 5 | $\Delta^4$-pregnene-17$\alpha$,21-diol-3,20-dione-21-acetate | do | do | Do. |
| 6 | $\Delta^4$-pregnene-17$\alpha$,21-diol-3,11,20-trione | do | do | $\Delta^{1,4}$-pregnadiene-17$\alpha$,21-diol-3,11,20-trione. |
| 7 | $\Delta^4$-pregnene-11$\beta$,17$\alpha$,21-triol-3,20-dione | do | Chloroform | $\Delta^{1,4}$-pregnadiene-11$\beta$,17$\alpha$,21-triol-3,20-dione. |
| 8 | 9$\alpha$-fluoro-$\Delta^4$-pregnene-11$\beta$,17$\alpha$,21-triol-3,20-dione | do | do | 9$\alpha$-fluoro-$\Delta^{1,4}$-pregnadiene-11$\beta$,17$\alpha$,21-triol-3,20-dione. |
| 9 | $\Delta^4$-androstane-3,17-dione | 1:1 methanol-formamide | 1:1 benzene-cyclohexane | $\Delta^{1,4}$-androstadiene-3,17-dione. |
| 10 | Pregnane-3,17$\alpha$,21-triol-11,20-dione 21-acetate | Formamide | Benzene | $\Delta^{1,4}$-pregnadiene-17$\alpha$,21-diol-3,11,20-trione. |
| 11 | Pregnane-17$\alpha$,21-diol-3,11,20-trione-21-acetate | do | do | Do. |
| 12 | Pregnane-3,17$\alpha$,21-triol-20-one-21-acetate | do | do | $\Delta^{1,4}$-pregnadiene-17$\alpha$,21-diol-3,20-dione. |
| 13 | Pregnane-17$\alpha$,21-diol-3,20-dione-21-acetate | do | do | Do. |

EXAMPLE 62

Thirteen 50 ml.-portions of the edamin medium described in Example 8 hereinabove are adjusted to pH 7, sterilized by heating for 15 minutes in an autoclave at about 120° C., and each of the sterilized mediums is inoculated with a culture of *Bacillus pulvifaciens* microorganisms. The inoculated cultures are incubated at a temperature of 28° C., with agitation, for a period of about 24 hours, and to each of the thirteen resulting cultures is added a solution of 10 mg. of a different 3-hydroxy- or 3-keto-steroid compound in 0.1 ml. of dimethylformamide. The cultures containing the 3-keto-steroid compounds are then incubated, with agitation, for an additional period of about 10 hours.

Each of the fermentation broths thus obtained is individually extracted with three 50 ml.-portions of ethyl acetate, and the ethyl acetate extracts corresponding to each broth and derived from a particular 3-keto-steroid substrate are combined and evaporated to dryness in vacuo. Each of the thirteen residual products thus obtained is dissolved in acetone and streaked on paper chromatograms each of which is developed using the solvent system indicated for the particular substrate starting material in the table hereinbelow. The upper bands for each chromatogram, corresponding to the $\Delta^1$-dehydro derivatives, are cut off, individually extracted with methanol and the methanol-extracted material is again subjected to streak-paper chromatography. The upper band is again cut off, then dried, extracted with methanol, and the methanol extract is evaporated to dryness in vacuo to give, for each substrate used as starting material, the particular $\Delta^{1,4}$-3-keto-steroid compound indicated in the following table:

mum characteristic of hydrocortisone; the paper chromatogram is dried, and this band is cut off and extracted with methanol. The material extracted with methanol is again subjected to streak-paper chromatography, using paper which has been extracted for 48 hours with methanol, and employing the chloroform-formamide system previously employed. The resulting chromatogram is thoroughly dried, and the band showing the ultra-violet absorption maximum characteristic of hydrocortisone is again cut off and extracted with methanol. The methanol extract is evaporated to dryness in vacuo to give hydrocortisone ($\Delta^4$-pregnene-11$\beta$,17$\alpha$,21-triol-3,20-dione).

The foregoing procedure is repeated using the same edamin medium, the pregnane-11$\beta$,17$\alpha$,21-triol-3,20-dione as the substrate, and an incubation period of 12 hours, but employing, in place of the *Nocardia asteroides* MA 272 microorganisms, the following:

*Nocardia minima*—(MA 292; ATCC 8674)
*Nocardia globerula*—(MA 280; ATCC 9356)
*Nocardia leishmanii*—(MA 281; ATCC 6855)
*Nocardia formica*—(MA 143; NRLL 2470)
*Nocardia asteroides*—(MA 289; ATCC 10904)

Extraction of the resulting fermentation broths and paper chromatography of the dried extracts in a formamide-chloroform system gives, in each case, a band on the chromatogram corresponding to hydrocortisone. Elution of this band in the manner previously described gives hydrocortisone, identified by its ultra-violet absorption spectrum as the principal steroid product obtained.

SOLVENT SYSTEM USED FOR STREAK PAPER CHROMATOGRAPHY

| Experiment Number | Substrate | Stationary phase | Mobile phase | $\Delta^{1,4}$-3-ketosteroid obtained |
|---|---|---|---|---|
| 1 | $\Delta^4$-pregnene-21-ol-3,20-dione | 1:1 methanol-formamide. | 1:1 benzene-cyclohexane. | $\Delta^{1,4}$-pregnadiene-21-ol-3,20-dione. |
| 2 | $\Delta^4$-pregnene-3,20-dione | do | do | $\Delta^{1,4}$-pregnadiene-3,20-dione. |
| 3 | $\Delta^5$-pregnene-3-ol-20-one | do | do | Do. |
| 4 | $\Delta^4$-pregnene-17$\alpha$-21-diol-3,20-dione | Formamide | Benzene | $\Delta^{1,4}$-pregnadiene-17$\alpha$,21-diol-3,20-dione. |
| 5 | $\Delta^4$-pregnene-17$\alpha$-21-diol-3,20-dione-21-acetate | do | do | Do. |
| 6 | $\Delta^4$-pregnene-17$\alpha$,21-diol-3,11,20-trione | do | do | $\Delta^{1,4}$-pregnadiene-17$\alpha$,21-diol-3,11,20-trione. |
| 7 | $\Delta^4$-pregnene-11$\beta$-17$\alpha$,21-triol-3,20-dione | do | Chloroform | $\Delta^{1,4}$-pregnadiene-11$\beta$,17$\alpha$,21-triol-3,20-dione. |
| 8 | 9$\alpha$-fluoro-$\Delta^4$-pregnene-11$\beta$,17$\alpha$,21-triol-3,20-dione | do | do | 9$\alpha$-fluoro-$\Delta^{1,4}$-pregnadiene-11$\beta$,17$\alpha$,21-triol-3,20-dione. |
| 9 | $\Delta^4$-androstane-3,17-dione | 1:1 methanol-formamide. | 1:1 benzene-cyclohexane. | $\Delta^{1,4}$-androstadiene-3,17-dione. |
| 10 | Pregnane-3,17$\alpha$,21-triol-11,20-dione 21-acetate | Formamide | Benzene | $\Delta^{1,4}$-pregnadiene-17$\alpha$,21-diol-3,11,20-trione. |
| 11 | Pregnane-17$\alpha$,21-diol-3,11,20-trione-21-acetate | do | do | Do. |
| 12 | Pregnane-3,17$\alpha$,21-triol-20-one-21-acetate | do | do | $\Delta^{1,4}$-pregnadiene-17$\alpha$,21-diol-3,20-dione. |
| 13 | Pregnane-17$\alpha$,21-diol-3,20-dione-21-acetate | do | do | Do. |

EXAMPLE 63

Fifty milliliters of a nutrient medium are prepared having the following composition:

Cerelose—1 g.
Edamin—1 g.
Cornsteep liquor—0.25 ml.
Distilled water to make 50 ml.

This medium is adjusted to pH 6.5 with KOH, sterilized and inoculated with about 2.5 to 5 ml. of a culture of *Nocardia asteroides* (MA 272; ATCC 9970) microorganisms, and the inoculated culture is then incubated at a temperature of 28° C., with agitation, for a 48-hour period. To the resulting culture is added a solution containing 10 mg. of pregnane-11$\beta$,17$\alpha$,21-triol-3,20-dione dissolved in 0.1 ml. of dimethylformamide. The culture containing the steroid compound is incubated, with agitation, for an additional period of about 12 hours at 28° C.

The fermentation broth is extracted with four 50 ml.-portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and chloroform as the mobile liquid phase. The principal band thus secured shows the ultra-violet absorption maxi-

EXAMPLE 64

A nutrient medium is prepared having the following composition:

Cerelose—68 g.
Edamin—68 g.
Cornsteep liquor—17 ml.
Distilled water to make 3400 ml.

This medium is adjusted to pH 6.5 with KOH, sterilized and inoculated with about 200 ml. of a vegetative growth of a culture of *Nocardia blackwellii* (MA 273; ATCC 6846) microorganisms, and the inoculated culture is then incubated at a temperature of 28° C., with agitation and aeration, for a 48-hour period. To the resulting culture is added a solution containing 0.64 g. of pregnane-3$\beta$, 17$\alpha$,21-triol-11,20-dione 21-acetate dissolved in dimethylformamide. The culture containing the steroid compound is incubated, with agitation and aeration, for an additional period of about 24 hours at 28° C.

The fermentation broth is extracted with ethyl acetate and the extract separated and evaporated to dryness. The residual dried product is partitioned between petroleum ether and 70% aqueous methanol, the petroleum ether layer being discarded. The aqueous methanol containing the product is evaporated under reduced pressure to remove the methanol. The resulting water layer is extracted with ethyl acetate several times and the ethyl acetate layer evaporated to dryness to yield partially purified $\Delta^{1,4}$-pregnadiene-17α,21-diol-3,11,20-trione. This material is dissolved in pyridine and reacted in an excess of acetic anhydride to form $\Delta^{1,4}$-pregnadiene-17α,21-diol-3,11,20-trione 21-acetate, which is recovered from the acetylation mixture by adding water and recovering the precipitated material by filtration. The $\Delta^{1,4}$-pregnadiene-17α,21-diol-3,11,20-trione 21-acetate is dissolved in ether and chromatogramed on activated alumina. The alumina column is developed using, as developing solvents, ether and a mixture of ether/chloroform. The desired product is eluted from the column with chloroform, and the chloroform eluate is evaporated to give a high yield of substantially pure, crystalline $\Delta^{1,4}$ - pregnadiene-17α,21-diol-3,11,20-trione 21-acetate.

EXAMPLE 65

Two 50 ml.-portions of the edamin medium described in Examples 1 to 8 hereinabove are adjusted to pH 6.5 with KOH, sterilized by heating for 15 minutes in an autoclave at 120° C., and each of the sterilized mediums is inoculated with a culture of *Nocardia blackwellii* (ATCC 6846) microorganisms. The inoculated cultures are incubated at a temperature of 28° C., with agitation, for a period of about 48 hours. At the end of the incubation period, the culture growths are centrifuged, the cells being retained and the supernatant liquid discarded. The retained cells are washed with distilled water and reconstituted to a volume of 25 ml. using water buffered at pH 7.0. To one of the cell suspensions is added a solution of 5 mg. of pregnane-3,17α,21-triol-11,20-dione 21-acetate in 0.1 ml. of dimethylformamide; to the other cell suspension is added a solution of 5 mg. of pregnane-17α,21-diol-3,11,20-trione 21-acetate in 0.1 ml. of dimethylformamide. The cell suspensions containing the pregnane compounds are then incubated, with agitation, for a period of approximately 12–15 hours.

Each of the fermentation broths thus obtained is individually extracted with four 50 ml.-portions of ethyl acetate. The ethyl acetate extracts corresponding to each of the two broths are combined and evaporated to dryness in vacuo to give, in each case, relatively pure $\Delta^{1,4}$-pregnadiene-17α,21-diol-3,11,20-trione; yield in both instances, as shown by polographic analysis of the products, in excess of 85% of theory.

Various changes and modifications may be made in the present invention without departing from the spirit and scope thereof; insofar as these changes and modifications are within the scope of the appended claims, they are to be considered a part of this invention.

What is claimed is:

1. The process for the production of a 3-oxygenated-$\Delta^1$-steroid compound which comprises fermenting an aqueous nutrient medium containing a 3-oxygenated-steroid compound, having a single bond connecting the C–1 and C–2 carbon atoms, by means of a $\Delta^1$-dehydrogenating strain of Schizomycetes selected from Eubacteriales, Mycobacterium and Norcardia, thereby removing hydrogen attached to the C–1 and C–2 carbon atoms to form a 3-oxygenated-$\Delta^1$-steroid, and recovering said 3-oxygenated-$\Delta^1$-steroid from the fermentation mixture; said $\Delta^1$-dehydrogenating strain being characterized in that, when an established 24-hour culture of said strain containing approximately 0.02% hydrocortisone is incubated for about 10 hours at approximately 28° C., and the ethyl acetate-extractible components of the resulting fermentation broth are subjected to paper chromatographic analysis using a formamide-chloroform system, there is obtained a band corresponding to the $\Delta^1$-dehydro derivative of hydrocortisone and having an ultra-violet absorption maximum of 242 mµ.

2. The process for the production of a 3-oxygenated-$\Delta^1$-steroid compound which comprises contacting a 3-oxygenated steroid compound, having a single bond connecting the C–1 and C–2 carbon atoms, with the dehydrogenating activity of a $\Delta^1$-dehydrogenating strain of Schizomycetes selected from the group consisting of Eubacteriales, Mycobacterium and Nocardia, and recovering the 3-oxygenated $\Delta^1$-steroid thus produced from the dehydrogenation mixture; said $\Delta^1$-dehydrogenating strain being characterized in that, when an established 24-hour culture of said strain containing approximately 0.02% hydrocortisone is incubated for about 10 hours at approximately 28° C., and the ethyl acetate-extractible components of the resulting fermentation broth are subjected to paper chromatographic analysis using a formamide-chloroform system, there is obtained a band corresponding to the $\Delta^1$-dehydro derivative of hydrocortisone and having an ultra-violet absorption maximum of 242 mµ.

3. The process for the production of a 3-keto-$\Delta^{1,4}$-steroid compound which comprises contacting a 3-oxygenated steroid compound which is saturated in Ring A and at C–5 with dehydrogenating activity of a $\Delta^1$-dehydrogenating strain of Schizomycetes from Eubacteriales, Mycobacterium and Nocardia, and recovering the 3-keto-$\Delta^{1,4}$-steroid thus produced from the dehydrogenation mixture; said $\Delta^1$-dehydrogenating strain being characterized in that, when an established 24-hour culture of said strain containing approximately 0.02% hydrocortisone is incubated for about 10 hours at approximately 28° C., and the ethyl acetate-extractible components of the resulting fermentation broth are subjected to paper chromatographic analysis using a formamide-chloroform system, there is obtained a band corresponding to the $\Delta^1$-dehydro derivative of hydrocortisone and having an ultra-violet absorption maximum of 242 mµ.

4. The process which comprises contacting a 3-oxygenated-steroid compound of a series selected from the group consisting of the androstane series and the pregnane series, having a single bond connecting the C–1 and C–2 carbon atoms and a double bond attached to the C–5 carbon atom, with the dehydrogenating activity of a $\Delta^1$-dehydrogenating strain of Schizomycetes selected from Eubacteriales, Mycobacterium and Norcardia, thereby forming a $\Delta^{1,4}$-3-keto-steroid compound, and recovering said $\Delta^{1,4}$-keto-steroid compound from the dehydrogenation mixture; said $\Delta^1$-dehydrogenating strain being characterized in that, when an established 24-hour culture of said strain containing approximately 0.02% hydrocortisone is incubated for about 10 hours at approximately 28° C., and the ethyl acetate-extractible components of the resulting fermentation broth are subjected to paper chromatographic analysis using a formamide-chloroform system, there is obtained a band corresponding to the $\Delta^1$-dehydro derivative of hydrocortisone and having an ultra-violet absorption maximum of 242 mµ.

5. The process which comprises contacting a 3-oxygenated-steroid compound of a series selected from the group consisting of the androstane series and the pregnane series, having a single bond connecting the C–1 and C–2 carbon atoms and a double bond attached to the C–5 carbon atom, with the dehydrogenating activity of a $\Delta^1$-dehydrogenating strain of Eubacteriales microorganisms, thereby forming a $\Delta^{1,4}$-3-keto-steroid compound, and recovering said $\Delta^{1,4}$-3-keto-steroid compound from the dehydrogenation mixture; said $\Delta^1$-dehydrogenating strain being characterized in that, when an established 24-hour culture of said strain containing approximately 0.02% hydrocortisone is incubated for about 10 hours at approximately 28° C., and the ethyl acetate-extractible components of the resulting fermentation broth are subjected to paper chromatographic analysis using a formamide-chloroform system, there is obtained a band corresponding to the $\Delta^1$-dehydro derivative of hydrocortisone and having an ultra-violet absorption maximum of 242 mµ.

6. The process as defined in claim 2 in which the 3-oxygenated-steroid compound used as starting material is a 3-hydroxy-Δ⁵-steroid compound and the product is a 3-keto-Δ¹,⁴-steroid.

7. The process as defined in claim 2 in which the 3-oxygenated-steroid compound used as starting material is a 3-keto-Δ⁴-pregnene compound and the product is a 3-keto-Δ¹,⁴-pregnadiene.

8. The process as defined in claim 2 in which the 3-oxygenated-steroid compound used as starting material is pregnane-11β,17α,21-triol-3,20-dione and the product is Δ¹,⁴-pregnadiene-11β,17α,21-triol-3,20-dione.

9. The process as defined in claim 2 wherein the Δ¹-dehydrogenating strain of Schizomycetes employed belongs to the order Eubacteriales.

10. The process as defined in claim 1 wherein the Δ¹-dehydrogenating strain of Schizomycetes employed belongs to the genus Bacillus.

11. The process as defined in claim 1 in which the 3-oxygenated-steroid used as starting material is a 3-hydroxy-Δ⁵-steroid compound and the product is the corresponding 3-keto-Δ¹,⁴-steroid compound.

12. The process of claim 4 in which the Schizomycetes employed belongs to genus Mycobacterium.

13. The process as defined in claim 2 which comprises contacting a 3-oxygenated-steroid compound of the pregnane series, having a single bond connecting the C–1 and C–2 carbon atoms and a double bond attached to the C–5 carbon atom, with the dehydrogenating activity of a Δ¹-dehydrogenating strain of Acetobacter microorganisms, thereby forming a Δ¹,⁴-3-keto-steroid compound, and recovering said Δ¹,⁴-3-keto-steroid compound from the dehydrogenation mixture.

14. The process as defined in claim 2 which comprises contacting a 3-oxygenated-steroid compound of the pregnane series, having a single bond connecting the C–1 and C–2 carbon atoms and a double bond attached to the C–5 carbon atom, with the dehydrogenating activity of a Δ¹-dehydrogenating strain of Aerobacter microorganisms, thereby forming a Δ¹,⁴-3-keto-steroid compound, and recovering said Δ¹,⁴-3-keto-steroid compound from the dehydrogenation mixture.

15. The process as defined in claim 2 for the production of a 3-oxygenated Δ¹-steroid compound which comprises contacting a 3-oxygenated steroid compound which has a single bond connecting the C–1 and C–2 carbon atoms with dehydrogenating enzymes produced by Bacillus sphaericus microorganisms.

16. The process which comprises contacting a 3-oxygenated-steroid compound of the pregnane series, having a single bond connecting the C–1 and C–2 carbon atoms, with the dehydrogenating activity of Bacillus sphaericus microorganisms.

17. The process as defined in claim 4 which comprises contacting a 3-oxygenated-steroid compound of the pregnane series, having a single bond connecting the C–1 and C–2 carbon atoms and a double bond attached to the C–5 carbon atom, with the dehydrogenating activity of Bacillus sphaericus microorganisms, thereby forming a Δ¹,⁴-3-keto-steroid compound.

18. A process for the production of Δ¹,⁴-steroids which comprises contacting a steroid compound containing a member of a group consisting of 3-keto-Δ⁴, 3-hydroxy-Δ⁵ and 3-lower acyloxy-Δ⁵ with the microbiological activity of an organism of the species Bacillus sphaericus.

19. The process as defined in claim 18 which comprises contacting a Δ⁴-3-keto-pregnene compound with the dehydrogenating activity of Bacillus sphaericus microorganisms, thereby forming a Δ¹,⁴-keto pregnadiene compound.

20. The process as defined in claim 18 which comprises contacting a Δ⁵-3-hydroxy-pregnene compound with the dehydrogenating activity of Bacillus sphaericus microorganisms, thereby forming a Δ¹,⁴-3-keto pregnadiene compound.

21. The process as defined in claim 18 which comprises aerobically cultivating Bacillus sphaericus microorganisms in an aqueous nutrient medium in the presence of a Δ⁵-3-alkanoyloxypregnene compound, thereby forming a Δ¹,⁴-3-keto pregnadiene compound.

22. The process as defined in claim 18 which comprises aerobically cultivating Bacillus sphaericus microorganisms in an aqueous nutrient medium in the presence of a Δ⁴-3-keto-pregnene compound, thereby forming a Δ¹,⁴-3-keto-pregnadiene compound.

23. The process as defined in claim 18 which comprises contacting Δ⁵-pregnene-3-ol-20-one with the dehydrogenating activity of Bacillus sphaericus microorganisms, thereby forming Δ¹,⁴-pregnadiene-3,20-dione.

24. The process as defined in claim 18 which comprises contacting Δ⁴-pregnene-17α-ol-3,11,20-trione with the dehydrogenating activity of Bacillus sphaericus microoganisms, thereby forming Δ¹,⁴-pregnadiene-17α-ol-3,11,20-trione.

25. The process as defined in claim 18 which comprises contacting Δ⁴-pregnene-11β,17α,21-triol-3,20-dione with the dehydrogenating activity of Bacillus sphaericus microorganisms, thereby forming Δ¹,⁴-pregnadiene-11β,17α,21-triol-3,20-dione.

26. The process as defined in claim 18 which comprises contacting Δ⁴-pregnene - 17α,21 - diol-3,20-dione 21-acetate with the dehydrogenating activity of Bacillus sphaericus microorganisms, thereby forming Δ¹,⁴-pregnadiene-17α,21-diol-3,20-dione.

27. The process as defined in claim 18 which comprises contacting Δ⁴-pregnene-17α,21-diol-3,11,20-trione with the dehydrogenating activity of Bacillus sphaericus microorganisms, thereby forming Δ¹,⁴-pregnadiene-17α, 21-diol-3,11,20-trione.

28. The process as defined in claim 3 which comprises contacting pregnane-17α,21-diol-3,11,20-trione 21-acetate with the dehydrogenating activity of Bacillus sphaericus microorganisms, thereby forming Δ¹,⁴-pregnadiene-17α, 21-diol-3,11,20-trione.

29. The process as defined in claim 3 which comprises contacting pregnane-3,17α,21-triol-11,20-dione 21-acetate with the dehydrogenating activtiy of Bacillus sphaericus microorganisms, thereby forming Δ¹,⁴-pregnadiene-17α, 21-diol-3,11,20-trione.

30. The process as defined in claim 18 which comprises contacting 9α-fluoro-Δ⁴-pregnene-11β,17α,21-triol-3,20-dione with the dehydrogenating activity of Bacillus sphaericus microorganisms to produce 9α-fluoro-Δ¹,⁴-pregnadiene-11β,17α,21-triol-3,20-dione.

31. The process as defined in claim 18 which comprises aerobically cultivating Bacillus sphaericus microorganisms in an aqueous nutrient medium in the presence of 9α-fluoro-Δ⁴-pregnene-11β,17α,21-triol-3,20-dione, thereby forming 9α - fluoro - Δ¹,⁴ - pregnadiene-11β,17α,21-triol-3,20-dione.

32. The process as defined in claim 18 which comprises contacting Δ⁴-pregnene-11β,17α,21-triol-3,20-dione, having attached to the C–9 carbon atom a substituent selected from the group consisting of hydrogen and fluoro, with the dehydrogenating activity of Bacillus sphaericus microorganisms, thereby forming the corresponding 9-substituted Δ¹,⁴-pregnadiene-11β,17α,21-triol-3,20-dione.

33. The process as defined in claim 18 which comprises contacting Δ⁴-pregnene-21-ol-3,20-dione with the dehydrogenating activity of Bacillus sphaericus microorganisms thereby forming Δ¹,⁴-pregnadiene-21-ol-3,20-dione.

34. The process as defined in claim 18 which comprises contacting Δ⁴-pregnene-11β,21-diol-3,20-dione with the dehydrogenating activity of Bacillus sphaericus microorganisms thereby forming Δ¹,⁴-pregnadiene-11β,21-diol-3,20-dione.

35. The process for the Δ¹-dehydrogenating of a 3-oxygenated steroid compound which comprises contacting said 3-oxygenated steroid compound with the dehydrogenating activity of Nocardia microorganisms.

36. The process as defined in claim 2 which comprises contacting a 3-oxygenated-steroid compound of the pregnane series, having a single bond connecting the C–1 and C-2 carbon atoms and a double bond attached to the C-5 carbon atom, with the dehydrogenating activity of Nocardia microorganisms, thereby forming a $\Delta^{1,4}$-3-keto-steroid compound.

37. The process as defined in claim 2 which comprises contacting a 3-oxygenated-steroid compound of the pregnane series, having a single bond connecting the C-1 and C-2 carbon atoms and a double bond attached to the C-5 carbon atom, with the dehydrogenating activity of Nocardia blackwellii microorganisms, thereby forming $\Delta^{1,4}$-3-keto-steroid compound.

38. The process as defined in claim 2 which comprises contacting a 3-oxygenated-steroid compound of the pregnane series, having a single bond connecting the C-1 and C-2 carbon atoms and a double bond attached to the C-5 carbon atom, with the dehydrogenating activity of Nocardia asteroides microorganisms, thereby forming a $\Delta^{1,4}$-3-keto-steroid compound.

39. The process as defined in claim 2 which comprises contacting a 3-oxygenated-steroid compound of the pregnane series, having a single bond connecting the C-1 and C-2 carbon atoms and a double bond attached to the C-5 carbon atom, with the dehydrogenating activity of Nocardia minima microorganisms, thereby forming a $\Delta^{1,4}$-keto-steroid compound.

40. The process as defined in claim 2 which comprises contacting a 3-oxygenated-steroid compound of the pregnane series, having a single bond connecting the C-1 and C-2 carbon atoms and a double bond attached to the C-5 carbon atom, with the dehydrogenating activity of Nocardia globerula microorganisms, thereby forming a $\Delta^{1,4}$-3-keto-steroid compound.

41. The process as defined in claim 2 which comprises contacting a 3-oxygenated-steroid compound of the pregnane series, having a single bond connecting the C-1 and C-2 carbon atoms and a double bond attached to the C-5 carbon atom, with the dehydrogenating activity of Nocardia leishmanii microorganisms, thereby forming a $\Delta^{1,4}$-3-keto-steroid compound.

42. The process as defined in claim 2 which comprises contacting a 3-oxygenated-steroid compound of the pregnane series, having a single bond connecting the C-1 and C-2 carbon atoms and a double bond attached to the C-5 carbon atom, with the dehydrogenating activity of Nocardia formica microorganisms, thereby forming a $\Delta^{1,4}$-3-keto-steroid compound.

43. The process as defined in claim 2 which comprises contacting a 3-oxygenated-steroid compound of the pregnane series, having a single bond connecting the C-1 and C-2 carbon atoms and a double bond attached to the C-5 carbon atom, with the dehydrogenating activity of Nocardia convoluta microorganisms, thereby forming a $\Delta^{1,4}$-3-keto-steroid compound.

44. The process as defined in claim 2 which comprises contacting a 3-oxygenated-steroid compound of the pregnane series, having a single bond connecting the C-1 and C-2 carbon atoms and a double bond attached to the C-5 carbon atom, with the dehydrogenating activity of Nocardia corallina microorganisms, thereby forming a $\Delta^{1,4}$-3-keto-steroid compound.

45. The process which comprises contacting a 3-keto pregnane compound with the dehydrogenating activity of Nocardia microorganisms, thereby forming the corresponding $\Delta^{1,4}$-3-keto-pregnadiene.

46. The process as defined in claim 45 which comprises contacting a 3-keto-pregnane compound with the dehydrogenating activity of Nocardia blackwellii microorganisms, thereby forming the corresponding $\Delta^{1,4}$-3-keto pregnadiene.

47. The process which comprises aerobically cultivating Nocardia microorganisms, in an aqueous nutrient medium in the presence of a $\Delta^4$-3-keto-pregnene compound, thereby forming a $\Delta^{1,4}$-3-keto-pregnadiene compound.

48. The process as defined in claim 47 which comprises aerobically cultivating Nocardia blackwellii microorganisms in an aqueous nutrient medium in the presence of a $\Delta^4$-3-keto-pregnene compound, thereby forming a $\Delta^{1,4}$-3-keto-pregnadiene compound.

49. The process as defined in claim 47 which comprises contacting $\Delta^4$-pregnene-11$\beta$,17$\alpha$,21-triol-3,20-dione with the dehydrogenating activity of Nocardia microorganisms, thereby forming $\Delta^{1,4}$-pregnadiene-11$\beta$,17$\alpha$,21-triol-3,20-dione.

50. The process as defined in claim 45 which comprises contacting pregnane - 11$\beta$,17$\alpha$,21-triol-3,20-dione with the dehydrogenating activity of Nocardia microorganisms, thereby forming $\Delta^{1,4}$-pregnadiene-11$\beta$,17$\alpha$,21-triol-3,20-dione.

51. The process as defined in claim 45 which comprises contacting pregnane - 17$\alpha$,21 - diol-3,11,20-trione 21-acetate with the dehydrogenating activity of Nocardia microorganisms, thereby forming $\Delta^{1,4}$-pregnadiene-17$\alpha$,21-diol-3,11-20-trione.

52. The process as defined in claim 45 which comprises contacting allopregnane-17$\alpha$,21-diol-3,11,20-trione 21-acetate with the dehydrogenating activity of Nocardia microorganisms, thereby forming $\Delta^{1,4}$-pregnadiene-17$\alpha$,21-diol-3,11,20-trione.

53. The process as defined in claim 45 which comprises contacting pregnane - 17$\alpha$,21-diol-3,20-dione with the dehydrogenating activity of Nocardia microorganisms, thereby forming $\Delta^{1,4}$-pregnadiene-17$\alpha$,21-diol-3,20-dione.

54. The process as defined in claim 45 which comprises contacting allopregnane-17$\alpha$,21-diol-3,11-dione 21-acetate with the dehydrogenating activity of Nocardia microorganisms, thereby forming $\Delta^{1,4}$-pregnadiene-17$\alpha$,21-diol-3,20-dione.

55. The process as defined in claim 35 which comprises contacting a 3-hydroxy-pregnane compound with the dehydrogenating activity of Nocardia microorganisms, thereby forming the corresponding $\Delta^{1,4}$-3-keto-pregnadiene.

56. The process as defined in claim 35 which comprises cultivating Nocardia microorganisms in an aqueous nutrient medium in the presence of a 3-oxygenated-steroid compound of the pregnane series, having a single bond connecting the C-1 and C-2 carbon atoms, thereby selectively removing hydrogen attached to the C-1 and C-2 carbon atoms to form a $\Delta^1$-3-oxygenated-steroid compound.

57. The process as defined in claim 4 which comprises contacting a compound selected from the group consisting of the 3-oxygenated-pregnanes and the $\Delta^5$-3-oxygenated-pregnenes with the dehydrogenating activity of a $\Delta^1$-dehydrogenating strain of Mycobacterium microorganisms, thereby forming a $\Delta^{1,4}$-3-keto-pregnadiene compound.

58. The process which comprises contacting a 3-keto-pregnane compound with the dehydrogenating activity of a $\Delta^1$-dehydrogenating strain of Mycobacterium microorganisms, thereby forming the corresponding $\Delta^{1,4}$-3-keto-pregnadiene.

59. The process as defined in claim 58 which comcomprises aerobically cultivating Mycobacterium microorganisms in an aqueous nutrient medium in the presence of a 3-keto-pregnane compound, thereby forming the corresponding $\Delta^{1,4}$-3-keto-pregnadiene compound.

60. The process as defined in claim 58 which comprises contacting pregnane - 11$\beta$,17$\alpha$,21 - triol-3,20-dione with the dehydrogenating activity of a $\Delta^1$-dehydrogenating strain of Mycobacterium microorganisms, thereby forming $\Delta^{1,4}$-pregnadiene-11$\beta$,17$\alpha$,21-triol-3,20-dione.

61. The process as defined in claim 58 which comprises contacting a 3-keto-pregnane compound with the dehydrogenating activity of Mycobacterium smegmatis microorganisms, thereby forming the corresponding $\Delta^{1,4}$-3-keto-pregnadiene.

62. The process as defined in claim 58 which comprises contacting a 3-keto-pregnane compound with the dehydrogenating activity of Mycobacterium phlei microorganisms, thereby forming the corresponding $\Delta^{1,4}$-3-keto-pregnadiene.

63. The process as defined in claim 58 which comprises contacting a 3-keto-pregnane compound with the dehydrogenating activity of Mycobacterium lacticola microorganisms, thereby forming the corresponding $\Delta^{1,4}$-3-keto-pregnadiene.

64. The process as defined in claim 4 which comprises contacting a $\Delta^5$-3-hydroxy-pregnene compound with the dehydrogenating activity of a $\Delta^1$-dehydrogenating strain of Mycobacterium microorganisms, thereby forming a $\Delta^{1,4}$-3-keto-pregnadiene compound.

65. The process as defined in claim 4 which comprises aerobically cultivating Mycobacterium microorganisms in an aqueous nutrient medium in the presence of a $\Delta^5$-3-alkanoyloxy-pregnene compound, thereby forming a $\Delta^{1,4}$-3-keto-pregnadiene.

66. The process as defined in claim 58 which comprises aerobically cultivating *Mycobacterium smegmatis* microorganisms in an aqueous nutrient medium in the presence of a 3-keto-pregnane compound, thereby forming the corresponding $\Delta^{1,4}$-3-keto-pregnadiene compound.

67. The process as defined in claim 58 which comprises aerobically cultivating *Mycobacterium phlei* microorganisms in an aqueous nutrient medium in the presence of a 3-keto-pregnane compound, thereby forming the corresponding $\Delta^{1,4}$-3-keto-pregnadiene compound.

68. The process as defined in claim 58 which comprises aerobically cultivating *Mycobacterium lacticola* microorganisms in an aqueous nutrient medium in the presence of a 3-keto-pregnane compound, thereby forming the corresponding $\Delta^{1,4}$-3-keto-pregnadiene compound.

69. The process as defined in claim 58 which comprises contacting pregnane-11$\beta$,17$\alpha$,21-triol-3,20-dione with the dehydrogenating activity of *Mycobacterium smegmatis* microorganisms, thereby forming $\Delta^{1,4}$-pregnadiene-11$\beta$,17$\alpha$,21-triol-3,20-dione.

70. The process as defined in claim 58 which comprises contacting pregnane-11$\beta$,17$\alpha$,21-triol-3,20-dione with the dehydrogenating activity of *Mycobacterium phlei* microorganisms, thereby forming $\Delta^{1,4}$-pregnadiene-11$\beta$,17$\alpha$,21-triol-3,20-dione.

71. The process as defined in claim 58 which comprises contacting pregnane-11$\beta$,17$\alpha$,21-triol-3,20-dione with the dehydrogenating activity of *Mycobacterium lacticola* microorganisms, thereby forming $\Delta^{1,4}$-pregnadiene-11$\beta$,17$\alpha$,21-triol-3,20-dione.

72. The process which comprises contacting a 3-keto pregnane compound with the dehydrogenating activity of Mycobacterium microorganisms, thereby forming the corresponding $\Delta^4$-3-keto-pregnene.

73. The process as defined in claim 35 which comprises contacting a 3-oxygenated-steroid compound of the pregnane series, having a single bond connecting the C–1 and C–2 carbon atoms, with the dehydrogenating activity of Nocardia microorganisms thereby selectively removing hydrogen attached to the C–1 and C–2 carbon atoms to form the corresponding $\Delta^1$-3-oxygenated-steroid of the pregnane series.

74. The process as defined in claim 35 which comprises cultivating Nocardia microorganisms in an aqueous nutrient medium in the presence of a 3-oxygenated-steroid compound, the C–1 and C–2 carbon atoms of which are connected by a single bond, thereby forming the corresponding 3-oxygenated $\Delta^1$-steroid compound.

75. The process as defined in claim 35 which comprises contacting a 3-oxygenated-steroid compound of the pregnane series, having a single bond connecting the C–1 and C–2 carbon atoms, with the dehydrogenating activity of Nocardia microorganisms, thereby forming a $\Delta^{1,4}$-3-keto pregnadiene compound.

References Cited

UNITED STATES PATENTS

| | | | |
|---|---|---|---|
| 2,756,179 | 7/1956 | Fried et al. | 195—51(A31) |
| 2,837,464 | 6/1958 | Nobile | 195—51(A31) |

ALVIN E. TANENHOLTZ, Primary Examiner